US012617884B2

(12) United States Patent
Shiotani et al.

(10) Patent No.: US 12,617,884 B2
(45) Date of Patent: May 5, 2026

(54) ORGANIC FINE PARTICLE

(71) Applicant: DAIKIN INDUSTRIES, LTD., Osaka (JP)

(72) Inventors: Yuko Shiotani, Osaka (JP); Shouta Shibutani, Osaka (JP); Rena Inamasu, Osaka (JP); Yoshito Tanaka, Osaka (JP); Ryou Akuta, Osaka (JP); Mayumi Iida, Osaka (JP); Marina Nakano, Osaka (JP); Masahiro Higashi, Osaka (JP); Tomohiro Yoshida, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 710 days.

(21) Appl. No.: 17/707,001

(22) Filed: Mar. 29, 2022

(65) Prior Publication Data

US 2022/0227907 A1 Jul. 21, 2022

Related U.S. Application Data

(63) Continuation of application No. PCT/JP2020/037266, filed on Sep. 30, 2020.

(30) Foreign Application Priority Data

Sep. 30, 2019 (JP) ................................ 2019-180579
Jul. 9, 2020 (JP) ................................ 2020-118767

(51) Int. Cl.
*C08F 212/12* (2006.01)
*D06N 3/04* (2006.01)

(52) U.S. Cl.
CPC .......... *C08F 212/12* (2013.01); *D06N 3/045* (2013.01); *D06N 2209/142* (2013.01)

(58) Field of Classification Search
CPC .. C08F 212/12; D06N 3/045; D06N 2209/142
(Continued)

(56) References Cited

U.S. PATENT DOCUMENTS

2014/0045992 A1 2/2014 Hirono et al.
2018/0215848 A1 8/2018 Hosoda et al.
(Continued)

FOREIGN PATENT DOCUMENTS

CN 107435245 A 12/2017
CN 107849187 A 3/2018
(Continued)

OTHER PUBLICATIONS

International Search Report of PCT/JP2020/037266 dated Nov. 24, 2020 [PCT/ISA/210].
(Continued)

*Primary Examiner* — Kelechi C Egwim
(74) *Attorney, Agent, or Firm* — Sughrue Mion, PLLC

(57) ABSTRACT

An organic fine particle capable of adhering to a substrate under a state having a particle shape, wherein the organic fine particle, when adhered to a substrate, exhibits water-repellency on the substrate, and the organic fine particle is formed of a fluorine-free polymer. Also disclosed is an organic fine particle containing: (1) a hydrophobic monomer which has one ethylenically unsaturated double bond and at least one hydrocarbon group having 3-40 carbon atoms; or (2) a polymer which has a repeating unit formed from a (meth)acrylic monomer having a polydimethylsiloxane group. Also disclosed is a method for producing the organic fine particle and a water-repellent composition which is an aqueous dispersion of the organic fine particle. Also disclosed is a textile product and method for treating the same which includes applying a treatment liquid containing the water-repellent composition to the textile product.

23 Claims, 2 Drawing Sheets

(58) Field of Classification Search
USPC .......................................................... 524/547
See application file for complete search history.

(56) References Cited

U.S. PATENT DOCUMENTS

| | | | | |
|---|---|---|---|---|
| 2020/0291257 | A1 * | 9/2020 | Yamaguchi | C09D 133/10 |
| 2020/0299441 | A1 | 9/2020 | Kawabe et al. | |
| 2021/0130668 | A1 | 5/2021 | Hara et al. | |

FOREIGN PATENT DOCUMENTS

| | | | | |
|---|---|---|---|---|
| CN | 108603096 | A | | 9/2018 |
| CN | 108884189 | A | | 11/2018 |
| CN | 110114435 | A | | 8/2019 |
| JP | 09-003774 | A | | 1/1997 |
| JP | 2003-268675 | A | | 9/2003 |
| JP | 2009084468 | A | * | 4/2009 |
| JP | 2009-191236 | A | | 8/2009 |
| JP | 2012-020248 | A | | 2/2012 |
| JP | 2014193972 | A | * | 10/2014 |
| JP | 2016-199712 | A | | 12/2016 |
| JP | 2016-222910 | A | | 12/2016 |
| JP | 2019-147870 | A | | 9/2019 |
| KR | 10-1498223 | B1 | | 3/2015 |
| WO | 2012/147573 | A1 | | 11/2012 |
| WO | 2019/078115 | A1 | | 4/2019 |

OTHER PUBLICATIONS

International Preliminary Report of Patentability (with translation of Written Opinion) issued Apr. 14, 2022 in International Application No. PCT/JP2020/037266.

Extended European Search Report issued Sep. 19, 2023 in European Application No. 20872335.3.

* cited by examiner

ORGANIC FINE PARTICLE

CROSS-REFERENCE TO RELATED APPLICATIONS

This application is a Rule 53(b) Continuation of International Application No. PCT/JP2020/037266 filed Sep. 30, 2020, which claims priority based on Japanese Patent Application No. 2019-180579 filed Sep. 30, 2019 and Japanese Patent Application No. 2020-118767 filed Jul. 9, 2020, the respective disclosures of which are incorporated herein by reference in their entireties.

TECHNICAL FIELD

The present disclosure relates to an organic fine particle and more particularly to a fluorine-free organic fine particle.

BACKGROUND ART

Conventionally, water-repellency is imparted to the surface of a substrate such as metal, glass, paper, fabric, and plastic by a chemical treatment in which coating is performed using a fluororesin, a silicone resin, or the like. For example, it is known that a water-repellent substrate surface having a water contact angle of about 1200 can be obtained by coating with a fluororesin.

In addition, by a method of forming a fine uneven structure on a surface of a substrate or a method of combining the formation of such a fine uneven structure on a surface of a substrate and the coating treatment, ultra-water-repellency is imparted to the surface of the substrate such that the water contact angle becomes 150° or more. The fine uneven structure can be formed mainly by a method using fine particles or a patterning method such as etching. Patterning methods such as etching are limited in the range and substrates that can be used.

When hydrophobic inorganic fine particles are used as the fine particles, a large amount of a dispersant such as an emulsifier is required to obtain an aqueous dispersion of the hydrophobic inorganic fine particles. When the degree of hydrophobicity of the hydrophobic inorganic fine particles is reduced, that is, hydrophobic inorganic fine particles having hydrophilic groups are used, the dispersion in water becomes a little easier, but the hydrophobicity of the fine particles themselves is reduced, and the performance as a water-repellent is reduced.

On the other hand, there are soap-free polymerization and an organic fine particle synthesis method using a small amount of an emulsifier. Since these are dispersed in water without an emulsifier or with a small amount of emulsifier, a hydrophilic monomer is generally used, and most of the fine particles thereof also exhibit hydrophilicity. Since it is difficult to use a monomer having high hydrophobicity, it has been difficult to synthesize organic fine particles exhibiting water-repellency by using soap-free polymerization or an organic fine particle synthesis method using a small amount of emulsifier.

Previous publications (particularly patent publications) have disclosed imparting water-repellency with organic fine particles, but examples have been limited to inorganic fine particles.

Patent Literature 1 discloses a method for producing a water-repellent coating film comprising a first step of forming a friction-resistant base film using fine particles (A) having an average particle size of 15 to 500 μm, a resin composition (B) and a solvent (C), and a second step of forming an ultra-water-repellent finishing film using fine particles (a) having an average particle size of 5 to 500 nm and being hydrophobic, a resin composition (b), and a solvent (c). The fine particles (a) used for forming the ultra-water-repellent finishing film in the examples of Patent Literature 1 are silica and inorganic fine particles.

Patent Literature 2 discloses a fluorine-free polymer containing a constituent unit derived from a (meth)acrylate monomer and a constituent unit derived from a silicone oil having a (meth)acryloyl group.

Conventionally, there has been a problem of color deepening. In general, among textile products, synthetic fibers, particularly polyester fibers, are widely used in various applications, but they are inferior to natural fibers such as wool and silk in characteristics such as color density, depth, and clearness in dyed products, and therefore tend to be evaluated as having a low commercial value in the market.

In order to solve these problems, various proposals have been made for improving characteristics such as color density, depth, and clearness of dyed products obtained from synthetic fibers such as polyester fibers. For example, there has been proposed a color deepening agent comprising an aqueous dispersion of a polymer obtained by polymerizing an ethylenically unsaturated monomer in the presence of a cationic surfactant, and comprising a polymer having a refractive index of 1.50 or less and a glass transition point of more than 110° C. and a polymer having a refractive index of 1.50 or less and a glass transition point of less than 20° C. (see, for example, Patent Literature 3), and such a color deepening agent is said to provide a good color deepening effect to a textile product. However, in a fiber requiring water-repellency, a color deepening agent tends to lower the water-repellency.

CITATION LIST

Patent Literature

Patent Literature 1: JP 2012-20248 A

Patent Literature 2: JP 2016-199712 A

Patent Literature 3: JP H9-3774 A

SUMMARY OF INVENTION

Technical Problem

The present disclosure provides organic fine particles capable of imparting excellent water-repellency to a substrate.

Solution to Problem

The present disclosure relates to organic fine particles exhibiting water-repellency on a substrate when adhered to the substrate. The organic fine particles can adhere to the substrate under a state having a particle shape.

In the present disclosure, the expression of water-repellency means at least any one of:

(i) when the particle is adhered to a glass substrate, a contact angle of water is 100 degrees or more, (ii) when the particle is adhered to a fabric, a contact angle of water is 120 degrees or more, or (iii) when the particle is adhered to a fabric, a falling speed is 100 mm/s or more.

The polymer constituting the organic fine particles preferably has a repeating unit formed from:

(1) a hydrophobic monomer having one ethylenically unsaturated double bond and at least one hydrocarbon group having 3 to 40 carbon atoms; or (2) a (meth)acrylic monomer having a polydimethylsiloxane group.

The present disclosure relates to a water-repellent composition comprising:

(A) organic fine particles; and (B) an aqueous medium.

The present disclosure further relates to an organic fine particle comprising a polymer comprising a repeating unit formed from:

(1) a hydrophobic monomer having one ethylenically unsaturated double bond and at least one hydrocarbon group having 3 to 40 carbon atoms; or (2) a (meth)acrylic monomer having a polydimethylsiloxane group.

The present disclosure further relates to an organic fine particle comprising a polymer comprising a repeating unit formed from:

(1) a hydrophobic monomer having one ethylenically unsaturated double bond and at least one hydrocarbon group having 3 to 40 carbon atoms;

(3) a reactive or hydrophilic monomer having one ethylenically unsaturated double bond and at least one reactive group and/or hydrophilic group; and (4) a crosslinkable monomer having at least two ethylenically unsaturated double bonds.

Preferred embodiments of the present disclosure are as follows:

Embodiment 1

An organic fine particle capable of adhering to a substrate under a state having a particle shape, wherein the organic fine particle, when adhered to a substrate, exhibits water-repellency on the substrate.

Embodiment 2

The organic fine particle according to embodiment 1, satisfying at least one of:

(i) when the particle is adhered to a glass substrate, a static contact angle of water on the glass substrate is 100 degrees or more;

(ii) when the particle is adhered to a fabric, a static contact angle of water on the fabric is 120 degrees or more; and (iii) when the particle is adhered to a fabric, a falling speed of water on a fabric is 100 mm/s or more.

Embodiment 3

The organic fine particle according to Embodiment 1 or 2, wherein when a heat treatment is performed at 170° C. for 1 minute after the particle is adhered to a substrate, an average diameter of the organic fine particle after the heat treatment is 50% or more of an average diameter of the organic fine particle before the heat treatment, or an average particle size of the fine particles observable on the fabric is 50 to 700 nm.

Embodiment 4

An organic fine particle comprising a polymer comprising a repeating unit formed from:

(1) a hydrophobic monomer having one ethylenically unsaturated double bond and at least one hydrocarbon group having 3 to 40 carbon atoms; or (2) a (meth)acrylic monomer having a polydimethylsiloxane group.

Embodiment 5

The organic fine particle according to Embodiment 4, wherein the polymer further comprises a repeating unit formed from:

(4) a crosslinkable monomer having at least two ethylenically unsaturated double bonds.

Embodiment 6

The organic fine particle according to Embodiment 4 or 5, wherein the polymer further comprises a repeating unit formed from at least one monomer selected from the group consisting of (3) a reactive or hydrophilic monomer having one ethylenically unsaturated double bond and at least one reactive group and/or hydrophilic group, and (5) a high glass transition point monomer of which a homopolymer has a glass transition point of 100° C. or more.

Embodiment 7

The organic fine particle according to any one of Embodiments 4 to 6, wherein a combination of a (meth)acrylic monomer having a hydrocarbon group having 12 to 24 carbon atoms in a side chain among the hydrophobic monomer (1) and the (meth)acrylic monomer (2) is used in an amount such that a total weight of both monomers is less than 80% by weight of a total amount of monomer components.

Embodiment 8

The organic fine particle according to any one of Embodiments 4 to 7, which is obtained by polymerizing a monomer containing the monomer (4) and then polymerizing a monomer not containing the monomer (4), and in which a part of the particle is meltable.

Embodiment 9

The organic fine particle according to any one of Embodiments 4 to 8, wherein a static contact angle of water on a silicon substrate treated with a homopolymer of the hydrophobic monomer (1) is 70 to 120 degrees.

Embodiment 10

The organic fine particle according to any one of Embodiments 4 to 9, wherein the hydrophobic monomer (1) is a monomer represented by the formula:

$$CH_2{=}C(-R^{12})-C(=O)-Y^{11}(R^{11})_k$$

or $$CH_2{=}C(-R^{22})-Y^{21}(H)_{5-l}(R^{21})_l$$

wherein $R^{11}$ and $R^{21}$ are each independently a hydrocarbon group having 3 to 40 carbon atoms;

$R^{12}$ and $R^{22}$ are a hydrogen atom, a monovalent organic group, or a halogen atom;

$Y^{11}$ is a divalent to tetravalent group composed of at least one selected from a divalent to tetravalent hydrocarbon group having 1 carbon atom, $—C_6H_4—$, —O—, —C(=O)—, $—S(=O)_2—$, or —NR'—, wherein R' is H or a hydrocarbon group having 1 to 4 carbon atoms, provided that the case of only a divalent hydrocarbon group is excluded;

$Y^{21}$ is a benzene ring;

H is a hydrogen atom;

H and $R^{21}$ are each directly bonded to $Y^{21}$; and k and l are each 1 to 3, the (meth)acrylic monomer (2) is a monomer represented by the formula:

$CH_2=C(—R^{92})—C(=O)—Y^{91}—R^{91}$ wherein $R^{91}$ is a group having a polydimethylsiloxane group;

$R^{92}$ is a hydrogen atom, a monovalent organic group, or a halogen atom; and $Y^{91}$ is a divalent to tetravalent group composed of at least one selected from a divalent to tetravalent hydrocarbon group having 1 carbon atom, $—C_6H_4—$, —O—, —C(=O)—, $—S(=O)_2—$, or —NR'—, wherein R' is H or a hydrocarbon group having 1 to 4 carbon atoms, the reactive or hydrophilic monomer (3) is a monomer represented by the formula:

$CH_2=C(—R^{32})—C(=O)—Y^{31}—(R^{33})_o(R^{31})_m$ or $CH_2=C(—R^{42})—Y^{41}(H)_{5-n}(R^{41})_n$ wherein $R^{31}$ and $R^{41}$ are each independently a reactive group or a hydrophilic group;

$R^{32}$ and $R^{42}$ are a hydrogen atom, a monovalent organic group, or a halogen atom;

$Y^{31}$ is a direct bond, —O—, or —NR'—, wherein R' is H or a hydrocarbon group having 1 to 4 carbon atoms;

$R^{33}$ is a divalent to tetravalent hydrocarbon group having 1 to 10 carbon atoms;

$Y^{41}$ is a benzene ring;

H is a hydrogen atom;

H and $R^{41}$ are each directly bonded to $Y^{41}$;

m and n are each 1 to 3; and o is 0 or 1, the crosslinkable monomer (4) is a monomer represented by the formula:

[Formula 1]

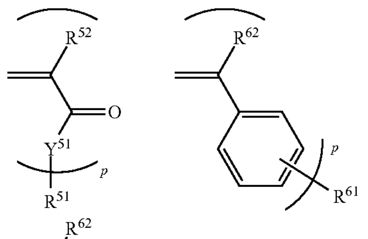

or

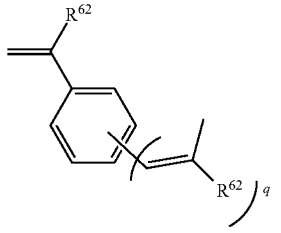

wherein $R^{51}$ and $R^{61}$ are each independently a direct bond or a divalent to tetravalent group composed of at least one selected from a hydrocarbon group having 1 to 20 carbon atoms, $—(CH_2CH_2O)_r—$, wherein r is an integer of 1 to 10, $—C_6H_4—$, —O—, or —NR'—, wherein R' is, H, or a hydrocarbon group having 1 to 4 carbon atoms;

$R^{52}$ and $R^{62}$ are each independently a hydrogen atom, a monovalent organic group, or a halogen atom;

$Y^{51}$ is —O—, or —NR'—, wherein R' is H or a hydrocarbon group having 1 to 4 carbon atoms;

p is 2 to 4; and q is 1 to 5, and the high glass transition point monomer (5) is a monomer represented by the formula:

[Formula 2]

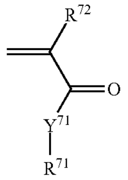

or

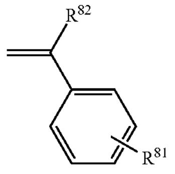

wherein $R^{71}$ and $R^{81}$ are a group composed of at least one selected from a hydrocarbon group having 1 to 30 carbon atoms, $—C_6H_4—$, —O—, or —NR'—, wherein R' is, H, or a hydrocarbon group having 1 to 4 carbon atoms;

$R^{72}$ and $R^{82}$ are a hydrogen atom, a monovalent organic group, or a halogen atom; and $Y^{71}$ is —O—, or —NR'—, wherein R' is H or a hydrocarbon group having 1 to 4 carbon atoms.

Embodiment 11

The organic fine particle according to any one of Embodiments 4 to 10, wherein in the reactive monomer (3), the reactive group is an epoxy group, a chloromethyl group, a bromomethyl group, an iodomethyl group, or a blocked isocyanate group, and the hydrophilic group is at least one group selected from the group consisting of a hydroxyl group, an amino group, a carboxylic acid group, a sulfonic acid group, a phosphoric acid group, an alkali metal or alkaline earth metal salt group of a carboxylic acid, a sulfonic acid, or a phosphoric acid, and an ammonium salt group with a chlorine, bromine or iodine ion as a counter anion.

Embodiment 12

The organic fine particle according to any one of Embodiments 4 to 11, wherein the hydrophobic monomer (1) is at least one monomer selected from the group consisting of t-butyl (meth)acrylate, N-t-butyl (meth)acrylamide, t-butylstyrene, stearyl (meth)acrylate, isopropyl (meth)acrylate, 2,6,8-trimethylnonan-4-yl acrylate, 2,4-di-t-butylstyrene, 2,4,6-trimethylstyrene, stearic acid amidoethyl (meth)acrylate, and $CH_2=CHC(=O)OC_2H_4NHSO_2C_{18}H_{37}$, the (meth)acrylic monomer (2) is at least one monomer selected from the group consisting of the formulas:

[Formula 3]

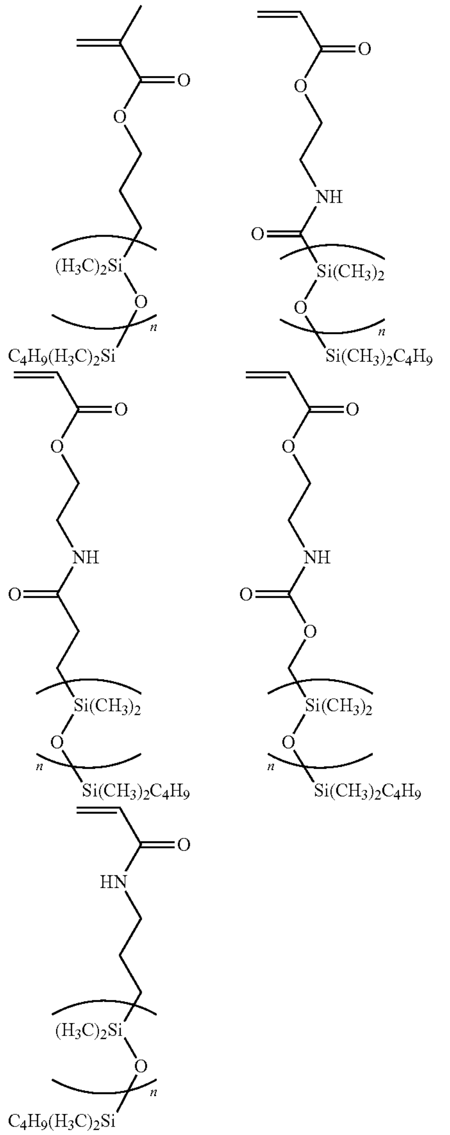

and wherein n is a number of 1 to 500, the reactive or hydrophilic monomer (3) is at least one monomer selected from the group consisting of glycidyl (meth)acrylate, glycerol (meth)acrylate, hydroxymethyl (meth)acrylate, hydroxyethyl (meth) acrylate, 3-hydroxypropyl (meth)acrylate, 2-hydroxypropyl (meth)acrylate, 2,3-dihydroxypropyl (meth) acrylate, 3-chloro-2-hydroxypropyl (meth)acrylate, 3-hydroxybutyl (meth)acrylate, 4-hydroxybutyl (meth) acrylate, 2-hydroxybutyl (meth)acrylate, 2-acetoacetoxyethyl (meth)acrylate, 4-hydroxybutyl acrylate glycidyl ether, acrylic acid, methacrylic acid, trimethylsilyl (meth)acrylate, 2-(trimethylsilyloxy) ethyl (meth)acrylate, 2-(dimethylamino) ethyl (meth)acrylate, 2-(tert-butylamino) ethyl (meth)acrylate, dimethylaminoethyl methacrylate quaternary compound, and tetrahydrofurfuryl (meth)acrylate, the crosslinkable monomer (4) is at least one monomer selected from the group consisting of divinylbenzene, 1,4-butanediol di(meth)acrylate, 1,6-hexanediol di(meth)acrylate, 1,9-nonanediol di(meth)acrylate, neopentyl glycol di(meth)acrylate, polyethylene glycol di(meth) acrylate, triethylene glycol di(meth)acrylate, ethylene glycol di(meth)acrylate, methylene glycol di(meth) acrylate, polytetramethylene glycol di(meth)acrylate, dimethyloltricyclodecane di(meth)acrylate, trimethylolpropane tri(meth)acrylate, adamantyl di(meth)acrylate, glycerin di(meth)acrylate, tricyclodecane dimethanol di(meth)acrylate, dicyclopentanyl di(meth) acrylate, and 5-hydroxy-1,3-adamantane di(meth) acrylate, and the high glass transition point monomer (5) is at least one monomer selected from the group consisting of isobornyl (meth)acrylate, bornyl (meth)acrylate, adamantyl (meth)acrylate, dicyclopentanyl (meth)acrylate, dicyclopentenyl (meth)acrylate, phenyl (meth)acrylate, naphthyl acrylate, and benzyl acrylate.

Embodiment 13

The organic fine particle according to any one of Embodiments 3 to 12, wherein a molar ratio of the hydrophobic monomer (1) or the (meth)acrylic monomer (2)/the reactive or hydrophilic monomer (3)/the high glass transition point monomer (5) is 20 to 100/0 to 50/0 to 70, the crosslinkable monomer (4) is 0.1 to 30 parts by mole, based on 100 parts by mole of a total of the hydrophobic monomer (1) and the reactive or hydrophilic monomer (3), and the (meth)acrylic monomer (2) is 0 to 30 parts by mole, based on 100 parts by mole of a total of the hydrophobic monomer (1), the (meth)acrylic monomer (2), and the reactive or hydrophilic monomer (3).

Embodiment 14

The organic fine particle according to any one of Embodiments 1 to 13, having a falling speed of 150 mm/second or more when treated on a fabric.

Embodiment 15

The organic fine particle according to any one of Embodiments 1 to 14, having an average particle size of 30 nm to 1000 nm.

Embodiment 16

A method for producing the organic fine particle according to any one of Embodiments 3 to 14, the method comprising obtaining the organic fine particle by polymerizing a monomer containing the monomer (4) and then polymerizing a monomer not containing the monomer (4).

Embodiment 17

A water-repellent composition which is an aqueous dispersion of an organic fine particle, the composition comprising:

(A) the organic fine particle according to any one of Embodiments 1 to 15; and (B) an aqueous medium.

Embodiment 18

The water-repellent composition according to Embodiment 17, further comprising any one or more of (C) a binder resin, (D) a surfactant, and (E) a cross-linking agent.

Embodiment 19

The water-repellent composition according to Embodiment 18, wherein the binder resin (C) is at least one polymer selected from a fluorine-free polymer having a hydrocarbon group having 3 to 40 carbon atoms in a side chain and a fluorine-containing polymer having a fluoroalkyl group having 1 to 20 carbon atoms in a side chain.

Embodiment 20

The water-repellent composition according to Embodiment 18 or 19, wherein an amount of the surfactant (D) is 15 parts by weight or less, based on 100 parts by weight of the organic fine particle (A).

Embodiment 21

The water-repellent composition according to any one of Embodiments 18 to 20, wherein the binder resin (C) is an acrylic polymer, a urethane polymer, a polyolefin, a polyester, a polyether, a polyamide, a polyimide, a polystyrene, a silicone polymer, or a combination thereof.

Embodiment 22

The water-repellent composition according to any one of Embodiments 17 to 21, which is capable of preventing frost formation.

Embodiment 23

A method for producing the water-repellent composition according to any one of Embodiments 17 to 22, the method comprising:

polymerizing a monomer in an aqueous medium in the presence of a surfactant in an amount of 15 parts by weight or less, based on 100 parts by weight of the monomer to obtain an aqueous dispersion of an organic fine particle (A).

Embodiment 24

The production method according to Embodiment 23, further comprising:

adding an aqueous dispersion of the binder resin (C) to an aqueous dispersion of the organic fine particle (A), or polymerizing a monomer for the binder resin in the aqueous dispersion of the organic fine particle (A) to obtain the binder resin (C), or polymerizing a monomer for the organic fine particles in the aqueous dispersion of the binder resin to obtain the aqueous dispersion in which the organic fine particle (A) and the binder resin (C) are dispersed.

Embodiment 25

A method for treating a textile product comprising: applying a treatment liquid containing the water-repellent composition according to any one of Embodiments 17 to 22 to the textile product.

Embodiment 26

A textile product comprising the organic fine particle and/or the binder resin in the water-repellent composition according to any one of Embodiments 17 to 22 adhered a surface thereof.

Embodiment 27

A textile product comprising the organic fine particles and/or the binder resin in the water-repellent composition according to any one of Embodiments 17 to 22 adhered a surface thereof, wherein the textile product satisfies at least one of a static contact angle of water on a fabric of 120 degrees or more, or a falling speed of water on the fabric of 200 mm/sec or more.

Advantageous Effects of Invention

The organic fine particle and the water-repellent composition of the present disclosure are capable of imparting excellent water-repellency (particularly, high strong water-repellency) to a substrate such as a textile product. The textile product treated with the water-repellent composition of the present disclosure has excellent water droplet falling property. Further, since the falling speed is particularly high, it is suitable for applications requiring high water-repellency.

In the organic fine particle, by making the main chain flexible as compared with the inorganic fine particles, it becomes possible to impart mobility to the particles themselves by heating. Therefore, in water, the hydrophilic group is localized on the outermost surface to be stably dispersed, and after coating on a substrate and drying, the hydrophobic portion having a small surface free energy can be localized on the outermost surface. The fine particles imparted with hydrophilicity also become fine particles exhibiting high water-repellency due to surface segregation of the hydrophobic portion after coating.

Although the color deepening agent tends to reduce the water-repellency, the organic fine particles of the present disclosure can exhibit the color deepening effect without impairing the water-repellency.

DESCRIPTION OF EMBODIMENTS

Figure 1:
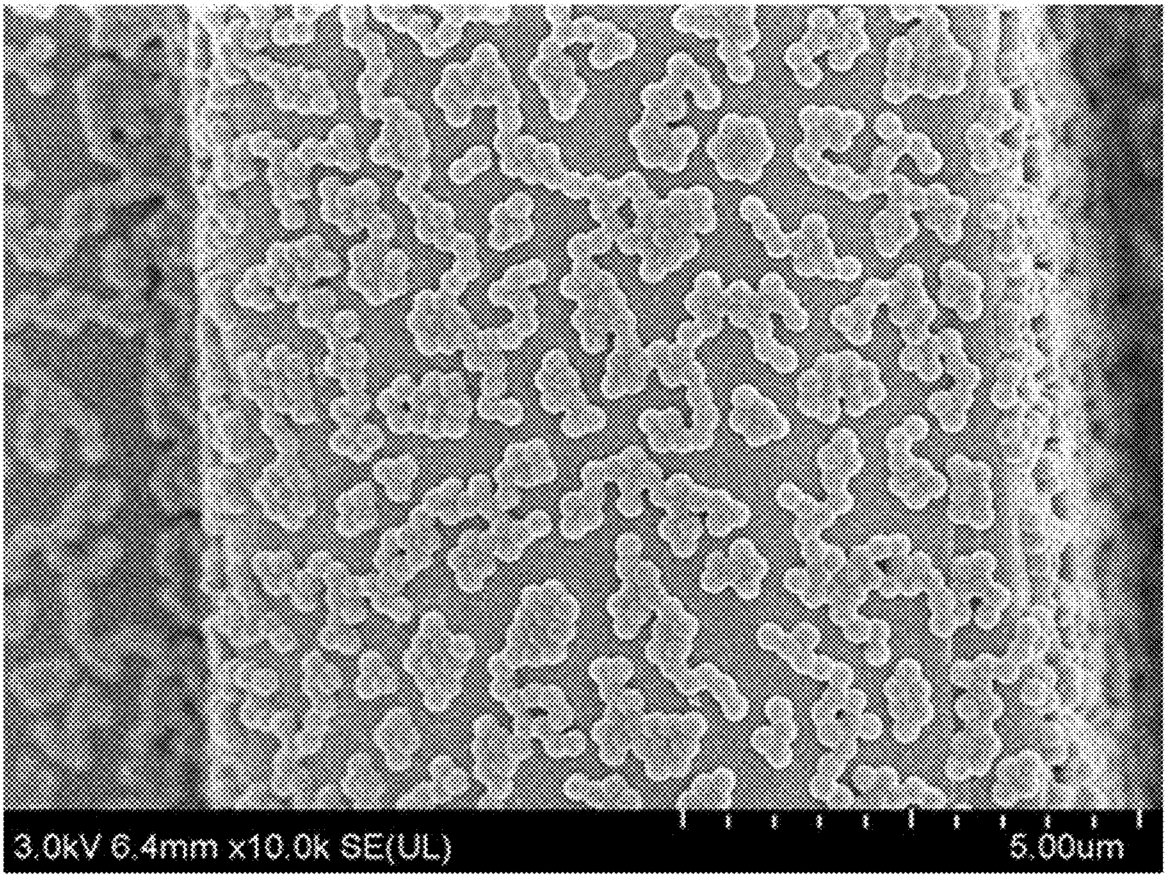
FIG. 1 is a scanning electron microscope (SEM) photograph of a PET fabric (Example 1) to which organic fine particles of Synthesis Example 1 are adhered.

A water-repellent composition comprises (A) an organic fine particle, and (B) an aqueous medium.

The water-repellent composition may further contain (C) a binder resin and/or (D) a surfactant.

By including the binder resin (C), higher water-repellency can be obtained.

In preferred embodiments, the water-repellent composition contains the following components.

an organic fine particle (A), an organic fine particle (A)+aqueous medium (B), an organic fine particle (A)+aqueous medium (B)+binder resin (C), an organic fine particle (A)+aqueous medium (B)+surfactant (D), an organic fine particle (A)+aqueous medium (B)+binder resin (C)+surfactant (D)

an organic fine particle (A)+aqueous medium (B)+binder resin (C)+cross-linking agent (E), or an organic fine particle (A)+aqueous medium (B)+binder resin (C)+surfactant (D)+cross-linking agent (E)

(A) Organic Fine Particles

Organic fine particles act as an active ingredient that exhibits water-repellency. The organic fine particles are preferably formed of a fluorine-free polymer.

The average particle size of the organic fine particles may be 30 to 1000 nm, preferably 50 to 700 nm or 200 to 600 nm from the viewpoint of water-repellency and stability of the aqueous dispersion. The average particle size means the average particle size of particles measured by a dynamic light scattering (DLS).

The organic fine particles have a particle shape on the substrate and exhibit water repellency.

The expression of water-repellency means at least one of (i) a contact angle of water of 100 degrees or more when adhered to a glass substrate, (ii) a contact angle of water of 120 degrees or more when adhered to a fabric, or (iii) a falling speed of 100 mm/s or more when adhered to a fabric.

The contact angle of water on a glass substrate to which the composition containing the organic fine particles is adhered (that is, the contact angle of water on the glass substrate to which the organic fine particles are adhered or the contact angle of water on the glass substrate to which the organic fine particles and the binder (and other components) are adhered) may be 1000 or more, for example, 110° or more, particularly 118° or more and 180° or less. Specifically, the contact angle of water on a glass substrate to which a composition containing organic fine particles is adhered is determined by dropcasting the composition containing organic fine particles onto a glass substrate (made of slide glass soda lime glass), heating at 150° C. for 3 minutes to produce a substrate to which the organic fine particles are adhered, dropping 2 μL of water onto the glass substrate to which the organic fine particles are adhered, and measuring the static contact angle 1 second after the dropping by using a fully automatic contact angle meter (DropMaster 701, manufactured by Kyowa Interface Science Co., Ltd.).

The contact angle of water on a fabric to which the composition containing the organic fine particles is adhered (the contact angle of water on the fabric to which the organic fine particles are adhered or the contact angle of water on the fabric to which the organic fine particles and the binder (and other components) are adhered) is preferably 120 degrees or more, more preferably 130 degrees or more, and still more preferably 140 degrees or more. Specifically, the contact angle of water on a fabric is determined by immersing a PET fabric (weight: 88 g/$m^2$, 70 denier, gray) in a composition containing organic fine particles, passing the PET fabric through a mangle and then a pin tenter at 170° C. for 1 minute to prepare a PET fabric to which the organic fine particles are adhered, dropping 2 μL of water onto the PET fabric, and measuring the static contact angle 1 second after the dropping using a fully automatic contact angle meter (DropMaster 701, manufactured by Kyowa Interface Science Co., Ltd.).

In the fabric (PET fabric), the falling speed of water is preferably 100 mm/s or more, for example, 130 mm/sec or more, and still more preferably 150 mm/sec or more or 200 mm/sec or more. The falling speed is the average falling speed at a distance of about 40 mm in which 20 μL of water is dropped from a microsyringe onto a substrate having an inclination of 30 degrees. Specifically, the average falling speed at a distance of about 40 mm is determined by immersing a PET fabric (weight: 88 g/$m^2$, 70 denier, gray) in a composition containing organic fine particles, passing the PET fabric through a mangle and then a pin tenter at 170° C. for 1 minute to prepare a PET fabric to which the organic fine particles are adhered, dropping 20 μL of water from a microsyringe onto the PET fabric having an inclination of 30 degrees using a fully automatic contact angle meter (DropMaster 701, manufactured by Kyowa Interface Science Co., Ltd.), and measuring the falling of the dropped water using a high-speed camera (VW-9000 manufactured by Keyence Co., Ltd.).

The unevenness of the fine particles on the substrate can be observed with a laser microscope or a scanning electron microscope. Before and after heating at 170° C. for 1 minute after coating the particles on the substrate, the average diameter (average particle size) of the particles after heating is preferably 50% or more, and more preferably 60% or more of that before heating. Alternatively, the average particle size of the fine particles observable on the fabric is preferably 30 to 1000 nm, more preferably 50 to 700 nm or 40 to 500 nm. In general, the average particle size is preferably an average particle size after heating at 170° C. for 1 minute after coating the particles on the substrate.

In some embodiments, the organic fine particles comprise a polymer having a repeating unit formed from:

(1) a hydrophobic monomer having one ethylenically unsaturated double bond and at least one hydrocarbon group having 3 to 40 carbon atoms; and/or (2) a (meth)acrylic monomer having a polydimethylsiloxane group.

In some embodiments, the organic fine particles comprises a polymer having a repeating unit formed from:

(1) a hydrophobic monomer having one ethylenically unsaturated double bond and at least one hydrocarbon group having 3 to 40 carbon atoms;

(3) a reactive or hydrophilic monomer having one ethylenically unsaturated double bond and at least one reactive group and/or hydrophilic group; and (4) a crosslinkable monomer having at least two ethylenically unsaturated double bonds.

The polymer constituting the organic fine particles is preferably a fluorine-free polymer.

(1) Hydrophobic Monomer

The hydrophobic monomer (1) has at least one ethylenically unsaturated double bond and at least one hydrocarbon group having 3 to 40 carbon atoms.

The static contact angle of water of the homopolymer of the hydrophobic monomer (1) is preferably 70 to 120 degrees, for example, 75 to 115 degrees. For example, when the glass transition temperature of the homopolymer of the hydrophobic monomer (1) is 80° C. or more, the static contact angle of water of the homopolymer is preferably 90° C. or more, and more preferably 97° C. or more. Furthermore, when the hydrophobic monomer (1) has a branched hydrocarbon group (for example, a branched alkyl group), particularly a t-butyl group or an isopropyl group, or a group having a multi-branched structure as shown in the following formula, the static contact angle of water of the homopolymer is preferably 75 to 115 degrees.

[Formula 4]

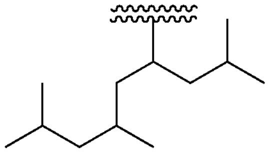

The static contact angle of the homopolymer is a value of a static contact angle measured with a water droplet of 2 μl after a solution obtained by dissolving the homopolymer in a good solvent (in particular, chloroform) is applied to a silicon substrate and heated at 80° C. Specifically, a chloroform solution (solid content concentration 1.0%) of the homopolymer is spin-coated on a silicon wafer substrate (high-purity silicon wafer AS ONE 2-960-55 for research use) and heated at 80° C. for 15 minutes to form a coating film, 2 μL of water is dropped onto the coating film, and the static contact angle 1 second after dropping is measured using a fully automatic contact angle meter (DropMaster 701, manufactured by Kyowa Interface Science Co., Ltd.).

The hydrophobic monomer (1) is preferably an acrylate compound, an acrylamide compound or a styrene compound containing a hydrocarbon group having 3 to 40 carbon atoms. That is, the hydrophobic monomer (1) is preferably an acrylate compound containing a hydrocarbon group having 3 to 40 carbon atoms, an acrylamide compound containing a hydrocarbon group having 3 to 40 carbon atoms, or a styrene compound containing a hydrocarbon group having 3 to 40 carbon atoms (excluding a benzene ring). The hydrophobic monomer (1) is preferably a fluorine-free monomer.

The hydrophobic monomer (1) is preferably a monomer represented by the formula:

$CH_2{=}C({-}R^{12}){-}C({=}O){-}Y^{11}(R^{11})_k$ or $CH_2{=}C({-}R^{22}){-}Y^{21}(H)_{5-l}(R^{21})_l$ wherein $R^{11}$ and $R^{21}$ are each independently a hydrocarbon group having 3 to 40 carbon atoms;

$R^{12}$ and $R^{22}$ are a hydrogen atom, a monovalent organic group, or a halogen atom;

$Y^{11}$ is a divalent to tetravalent group composed of at least one selected from a divalent to tetravalent hydrocarbon group having 1 carbon atom (in particular $—CH_2—$, $—CH=$, and $—C\equiv$), $—C_6H_4—$, —O—, —C(=O)—, $—S(=O)_2—$, or —NR'—, wherein R' is H or a hydrocarbon group having 1 to 4 carbon atoms, except for the case of only a divalent hydrocarbon group;

$Y^{21}$ is a benzene ring;

H is a hydrogen atom;

H and $R^{21}$ are each directly bonded to $Y^{21}$; and k and l are each 1 to 3.

$R^{11}$ and $R^{21}$ are preferably a branched or long-chain (or long-chain linear) hydrocarbon group. The hydrocarbon group is preferably an aliphatic hydrocarbon group, particularly a saturated aliphatic hydrocarbon group, particularly an alkyl group. The $—CH_3$ group has a lower surface free energy than the $—CH_2—$ group and tends to exhibit water-repellency. Therefore, a structure having many branches and many $—CH_3$ groups is preferred. In the branched hydrocarbon group, the number of $—CH_3$ groups is preferably 2 to 15, for example, 3 to 10 or 4 to 9. On the other hand, a long-chain alkyl group having a certain length (preferably 16 to 40 carbon atoms) exhibits high water-repellency due to its crystallinity. Therefore, a branched hydrocarbon group (for example, a branched alkyl group), particularly a t-butyl group or an isopropyl group, or a hydrocarbon group having a multi-branched structure having 5 to 30 carbon atoms, for example, a group having a multi-branched structure represented by the following formula, or a long-chain hydrocarbon group (or long-chain linear hydrocarbon group), for example, an alkyl group having 16 to 40 or 16 to 26, particularly 18 to 22 carbon atoms is preferable. The long-chain hydrocarbon group is preferably a stearyl group, an icosyl group, or a behenyl group.

[Formula 5]

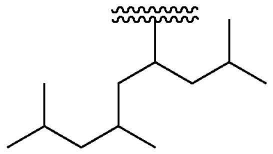

k is 1, 2 or 3. When $Y^{11}$ has a tetravalent hydrocarbon group having 1 carbon atom (specifically, $—C\equiv$ having a branched structure), k is 3. When $Y^{11}$ has a trivalent hydrocarbon group having 1 carbon atom (for example, —CH=having a branched structure), k is 2. When $Y^{11}$ does not have a trivalent and tetravalent hydrocarbon group having 1 carbon atom (for example, when $Y^{11}$ has a divalent hydrocarbon group having 1 carbon atom ($—CH_2—$) (for example, 1 to 6)), k is 1.

$R^{12}$ and $R^{22}$ may be a hydrogen atom, a methyl group, a halogen atom, a substituted or unsubstituted benzyl group, a substituted or unsubstituted phenyl group, or a $—CF_3$ group. Examples of $R^{12}$ and $R^{22}$ include a hydrogen atom, a methyl group, a chlorine atom, a bromine atom, an iodine atom, a fluorine atom, $—CF_3$ group, and a cyano group. $R^{12}$ and $R^{22}$ are preferably a hydrogen atom, a methyl group, or a chlorine atom. $R^{12}$ is more preferably a methyl group. Since $R^{12}$ is a methyl group, higher water-repellency can be obtained. $R^{22}$ is preferably a hydrogen atom, particularly from the viewpoint of reactivity.

$Y^{11}$ is preferably a divalent group or a trivalent group, particularly preferably a divalent group.

Examples of the divalent to tetravalent hydrocarbon group having 1 carbon atom include $—CH_2—$, —CH=having a branched structure, and $—C\equiv$ having a branched structure.

When $Y^{11}$ is a divalent group, $Y^{11}$ may have or may not have $—CH_2—$. When $Y^{11}$ is a trivalent group, $Y^{11}$ preferably has —CH=which is a branched structure, and particularly preferably has $—CH_2—(-H(C—)—)—CH_2—,$ that is,

[Formula 6]

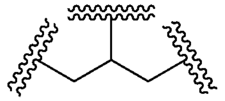

$Y^{11}$ may be —Y'—, —Y'—Y'—, —Y'—C(=O)—, —C(=O)—Y'—, —Y'—C(=O)—Y'—, —Y'—X'—, —Y'—X'—Y'—, —Y'—X'—Y'—C(=O)—, —Y'—X'—C(=O)—Y'—, —Y'—X'—Y'—C(=O)—Y'—, or —Y'—X'—Y'—X'—, wherein Y' is each independently a direct bond, —O—, —NR'—, wherein R' is H or a hydrocarbon group having 1 to 4 carbon atoms, or —S(═O)$_2$—;

X' is —$(CH_2)_m$—, wherein m is an integer of 1 to 5, a linear hydrocarbon group having 1 to 5 carbon atoms and an unsaturated bond, a hydrocarbon group having 1 to 5 or 3 to 5 carbon atoms and a branched structure, or —$(CH_2)_l$—$C_6H_4$—$(CH_2)_l$—, wherein 1 is each independently an integer of 0 to 5, and —$C_6H_4$— is a phenylene group.

The hydrocarbon group having a branched structure having 3 to 5 carbon atoms may be divalent, trivalent, or tetravalent. Specific examples of the hydrocarbon group having a branched structure having 3 to 5 carbon atoms include:

—$CH(CH_3)$—$CH_2$— (divalent),

[Formula 7]

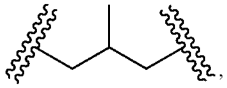

(divalent)

—$CH_2$—(—H(C—)—)—$CH_2$— (trivalent), that is,

[Formula 8]

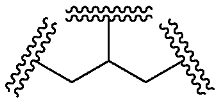

Specific examples of $Y^{11}$ which is a divalent group include —O—, —NH—, —O—C(═O)—, —NH—C(═O)—, —O—C(═O)—NH—, —NH—C(═O)—O—, —NH—C(═O)—NH—, —O—$C_6H_4$—, —NH—$C_6H_4$—, —O—$(CH_2)_m$—O—, —NH—$(CH_2)_m$—NH—, —O—$(CH_2)_m$—NH—, —NH—$(CH_2)_m$—O—, —O—$(CH_2)_m$O—C(═O)—, —O—$(CH_2)_m$—C(═O)—O—, —NH—$(CH_2)_m$—O—C(═O)—, —NH—$(CH_2)_m$—C(═O)—O—, —O—$(CH_2)_m$—O—C(═O)—NH—, —O—$(CH_2)_m$—NH—C(═O)—O—, —O—$(CH_2)_m$—C(═O)—NH—, —O—$(CH_2)_m$NH—C(═O)—, —O—$(CH_2)_m$NH—C(═O)—NH—, —O—$(CH_2)_m$O—$C_6H_4$—, —O—$(CH_2)_m$—NH—S(═O)$_2$—, —O—$(CH_2)_m$ (═O)$_2$—NH—, —NH—$(CH_2)_m$—NH—S(═O)$_2$—, —NH—$(CH_2)_m$—S(═O)$_2$—NH—, —NH—$(CH_2)_m$—O—C(═O)—NH—, —NH—$(CH_2)_m$—NH—C(═O)—O—, —NH—$(CH_2)_m$—C(═O)—NH—, —NH—$(CH_2)_m$—NH—C(═O)—, —NH—$(CH_2)_m$NH—C(═O)—NH—, —NH—$(CH_2)_m$—O—$C_6H_4$—, or —NH—$(CH_2)_m$—NH—$C_6H_4$—, wherein m is an integer of 1 to 5, in particular 2 or 4.

$Y^{11}$ which is a divalent group is preferably —O—, —NH—, —O—$(CH_2)_m$—O—C(═O)—, —O—$(CH_2)_m$—NH—C(═O)—, —O—$(CH_2)_m$—O—C(═O)—NH—, —O—$(CH_2)_m$—NH—C(═O)—O—, —O—$(CH_2)_m$—NH—C(═O)—NH—, —O—$(CH_2)_m$—NH—S(═O)$_2$— or —O—$(CH_2)_m$S(═O)$_2$—NH—, —NH—$(CH_2)_m$—O—C(═O)—, —NH—$(CH_2)_m$—NH—C(═O)—, —NH—$(CH_2)_m$O—C(═O)—NH—, —NH—$(CH_2)_m$NH—C(═O)—O—, —NH—$(CH_2)_m$NH—C(═O)—NH—, wherein m is an integer of 1 to 5, in particular 2 or 4.

$Y^{11}$ which is a divalent group is more preferably —O—, —O—$(CH_2)_m$—O—C(═O)—NH—, —O—$(CH_2)_m$—NH—C(═O)—O—, or —O—$(CH_2)_m$NH—C(═O)—, —O—$(CH_2)_m$—NH—S(═O)$_2$—, or —O—$(CH_2)_m$—S(═O)$_2$—NH—, in particular —O—$(CH_2)_m$—NH—C(═O)—, wherein m is an integer of 1 to 5, in particular 2 or 4.

$Y^{11}$ which is a trivalent group is preferably

[Formula 9]

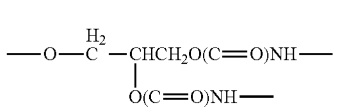

$Y^{21}$ is a benzene ring. The monomer having $Y^{21}$ has a styryl group. In the monomer having $Y^{21}$, one to three $R^{21}$ groups and 2 to 4 hydrogen atoms are bonded to the benzene ring.

Specific examples of the hydrophobic monomer are as follows. Although compounds of the following chemical formulas are acryl compounds having a hydrogen atom at the α-position, specific examples may include methacrylic compounds having a methyl group at the α-position and α-chloracrylic compounds having a chlorine atom at the α-position, and preferred are methacrylic compounds having a methyl group at the α-position. Also in the styrene derivative, although compounds of the following chemical formulas are acryl compounds having a hydrogen atom at the α-position, specific examples may include α-methylstyrene compounds having a methyl group at the α-position and α-chlorostyrene compounds having a chlorine atom at the α-position, and preferred are styrene compounds having a hydrogen atom at the α-position.

[Formula 10]

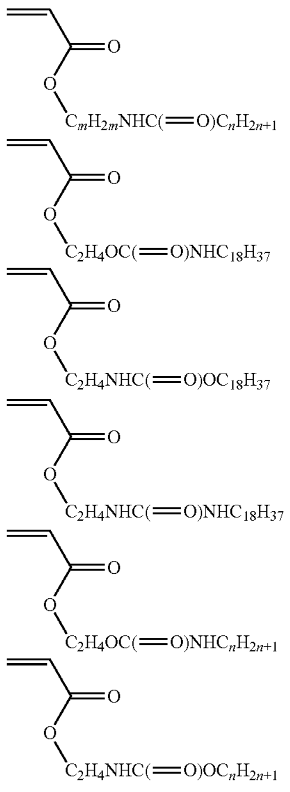

-continued

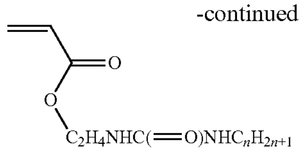

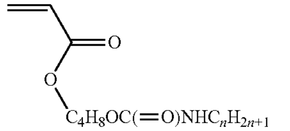

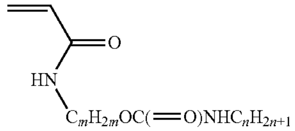

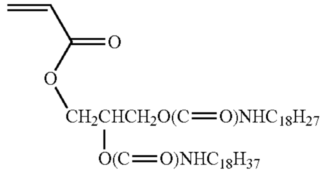

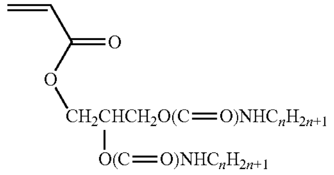

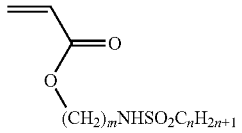

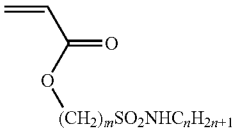

wherein n is a number of 3 to 40 and m is a number of 1 to 5.

[Formula 11]

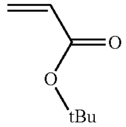

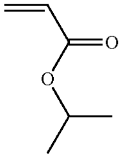

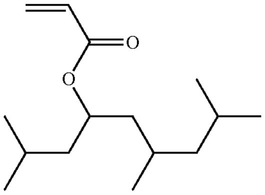

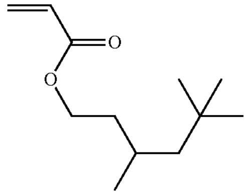

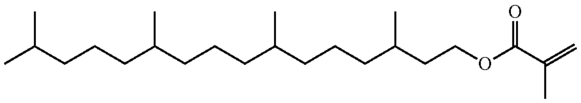

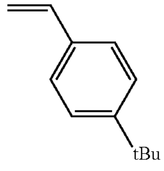

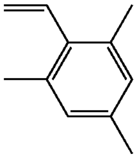

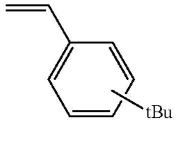

-continued

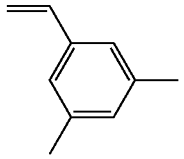

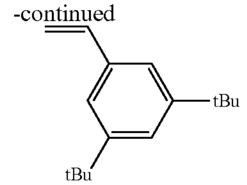

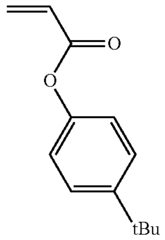

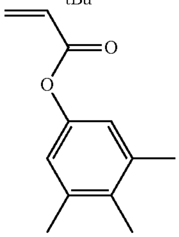

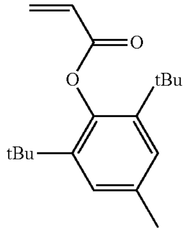

wherein tBu is t-butyl.

Preferred specific examples of the hydrophobic monomer (1) include t-butyl (meth)acrylate, N-t-butyl (meth)acrylamide, t-butylstyrene, stearyl (meth)acrylate, isopropyl (meth) acrylate, 2,6,8-trimethylnonan-4-yl acrylate, 2,4-di-t-butylstyrene, 2,4,6-trimethylstyrene, stearic acid amidoethyl (meth)acrylate, $CH_2{=}CHC({=}O)OC_2H_4NHSO_2C_{18}H_{37}$, 4-t-butylphenyl (meth)acrylate, 2,3,4-methylphenyl (meth) acrylate.

(2) A (Meth)Acrylic Monomer Having a Polydimethylsiloxane Group

The (meth)acrylic monomer (2) has a polydimethylsiloxane group in the side chain.

The (meth)acrylic monomer (2) is at least one monomer selected from the group consisting of the formulas:

$$CH_2{=}C({-}R^{92}){-}C({=}O){-}Y^{91}{-}R^{91}$$

wherein $R^{91}$ is a group having a polydimethylsiloxane group;

$R^{92}$ is a hydrogen atom, a monovalent organic group, or a halogen atom; and $Y^{91}$ is a divalent to tetravalent group composed of at least one selected from a divalent to tetravalent hydrocarbon group having 1 carbon atom, $-C_6H_4-$, $-O-$, $-C({=}O)-$, $-S({=}O)_2-$, or $-NR'-$, wherein R' is H or a hydrocarbon group having 1 to 4 carbon atoms.

$R^{91}$ is a group having a polydimethylsiloxane group, and is preferably a group represented by the average formula:

$$(SiR_2O)_aSiR_3$$

wherein a is 2 to 4000, for example 3 to 400; and each R is independently a monovalent alkyl group having 1 to 12 carbon atoms, and at least two R are methyl groups, $R^{92}$ is preferably a hydrogen atom, a methyl group, or a chlorine atom.

$Y^{91}$ is preferably a hydrocarbon group having 1 to 8 carbon atoms (for example, alkylene groups having 1 to 8 or 2 to 4 carbon atoms, particularly $-C_3H_6-$), $-O-(CH_2)_p-$, $-O-(CH_2)_p-NHC({=}O)-(CH_2)_q-$, or $-NH-(CH_2)_q-$, wherein p is a number of 1 to 5 and q is a number of 1 to 5.

Specific examples of the (meth)acrylic monomer (2) include:

[Formula 12]

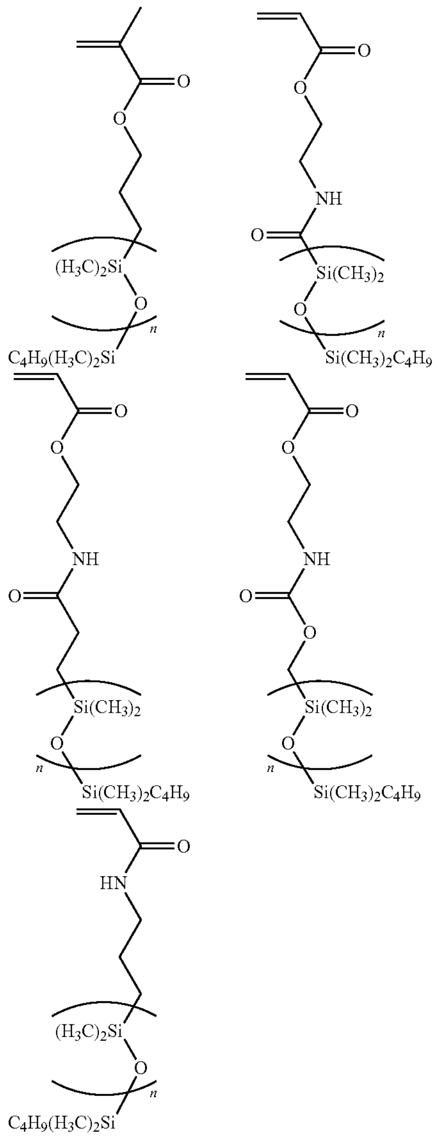

wherein n is a number of 1 to 500.

When the (meth)acrylic monomer (2) is used together with a (meth)acrylic monomer having a hydrocarbon group having 3 to 40 or 3 to 30 carbon atoms (particularly 12 to 24) (or any hydrophobic monomer (1)) among the hydrophobic monomer (1), it is preferable that the total weight of the (meth)acrylic monomer (2) and the hydrophobic monomer (1) is less than 80% by weight, particularly less than 50% by weight or less than 40% by weight of the total amount of the monomer components. That is, a combination of a repeating unit formed from a (meth)acrylic monomer having a hydrocarbon group having 3 to 40 or 12 to 24 carbon atoms in the hydrophobic monomer (1) and a repeating unit formed from a (meth)acrylic monomer (2) is preferably used in an amount of less than 80% by weight, particularly less than 50% by weight or less than 40% by weight, of the total amount of the monomer components.

In some embodiments, the constituent monomer does not consist of only a combination of the hydrophobic monomer (1), which is a (meth)acrylic monomer having a hydrocarbon group having 3 to 40 or 3 to 30 (particularly 12 to 24) carbon atoms, and the (meth)acrylic monomer (2). In some embodiments, a combination of the hydrophobic monomer (1), which is a (meth)acrylic monomer having a hydrocarbon group having 3 to 40 or 3 to 30 (particularly 12 to 24) carbon atoms, and the (meth)acrylic monomer (2) may not be used.

(3) Reactive or Hydrophilic Monomer

The reactive or hydrophilic monomer (3) has one ethylenically unsaturated double bond and at least one reactive and/or hydrophilic group.

Examples of the reactive group include an epoxy group (for example, glycidyl group), a chloromethyl group, a bromomethyl group, an iodomethyl group, and a blocked isocyanate group.

Examples of hydrophilic groups include a hydroxyl group, an amino group, a carboxylic acid group, a sulfonic acid group, a phosphoric acid group, an alkali metal or alkaline earth metal salt group of a carboxylic acid, a sulfonic acid, or a phosphoric acid, and an ammonium salt group with a chlorine, bromine or iodine ion as a counter anion.

The reactive or hydrophilic monomer (3) is preferably a fluorine-free monomer.

The reactive or hydrophilic monomer (3) is preferably a monomer represented by the formula:

$$CH_2{=}C(—R^{32})—C({=}O)—Y^{31}—(R^{33})_o(R^{31})_m$$

or $$CH_2{=}C(—R^{42})—Y^{41}(H)_{5-n}(R^{41})_n$$

wherein $R^{31}$ and $R^{41}$ are each independently a reactive group or a hydrophilic group;

$R^{32}$ and $R^{42}$ are a hydrogen atom, a monovalent organic group, or a halogen atom;

$Y^{31}$ is a direct bond, —O—, or —NR'—, wherein R' is H or a hydrocarbon group having 1 to 4 carbon atoms;

$R^{33}$ is a group having a direct bond or a divalent to tetravalent hydrocarbon group having 1 to 10 carbon atoms;

$Y^{41}$ is a benzene ring;

H is a hydrogen atom;

H and $R^{41}$ are each directly bonded to $Y^{41}$;

m and n are each 1 to 3; and o is 0 or 1.

$R^{31}$ and $R^{41}$ are monovalent groups. Examples of the reactive group or hydrophilic group in $R^{31}$ and $R^{41}$ are as described above.

$R^{32}$ and $R^{42}$ may be a hydrogen atom, a methyl group, a halogen atom, a substituted or unsubstituted benzyl group, a substituted or unsubstituted phenyl group, or a —$CF_3$ group. Examples of $R^{32}$ and $R^{42}$ include a hydrogen atom, a methyl group, a chlorine atom, a bromine atom, an iodine atom, a fluorine atom, —$CF_3$ group, and a cyano group. $R^{32}$ and $R^{42}$ are preferably a hydrogen atom, a methyl group, or a chlorine atom. $R^{32}$ is more preferably a methyl group. Since $R^{32}$ is a methyl group, higher water-repellency can be obtained. $R^{42}$ is preferably a hydrogen atom, particularly from the viewpoint of reactivity.

$Y^{31}$ is preferably —O— or —NH—.

$R^{33}$ is preferably a divalent to tetravalent hydrocarbon group having 1 to 10 carbon atoms. Examples of the divalent to tetravalent hydrocarbon group having 1 carbon atom include —$CH_2$—, —CH=having a branched structure, and —C≡ having a branched structure. $R^{33}$ is a divalent alkylene group, for example, $—(CH_2)_r—$, wherein r is a number of 1 to 5, or a divalent, trivalent, or tetravalent alkyl group, for example, $—(CH_2)_r—(CH—)_s—H$, wherein r is a number of 1 to 5, and s is 1, 2 or 3. Position of the $CH_2$ group and CH— group may not be in the order described.

$Y^{41}$ is a benzene ring. The monomer having $Y^{41}$ has a styryl group. In the monomer having $Y^{41}$, one to three $R^{41}$ groups and 2 to 4 hydrogen atoms are bonded to the benzene ring.

Specific examples of the reactive or hydrophilic monomer (3) include glycidyl (meth)acrylate, glycerol (meth)acrylate, hydroxymethyl (meth)acrylate, hydroxyethyl (meth)acrylate, 3-hydroxypropyl (meth)acrylate, 2-hydroxypropyl (meth)acrylate, 2,3-dihydroxypropyl (meth)acrylate, 3-chloro-2-hydroxypropyl (meth)acrylate, 3-hydroxybutyl (meth)acrylate, 4-hydroxybutyl (meth)acrylate, 2-hydroxybutyl (meth)acrylate, 2-acetoacetoxyethyl (meth)acrylate, 4-hydroxybutyl acrylate glycidyl ether, acrylic acid, methacrylic acid, trimethylsilyl (meth)acrylate, 2-(trimethylsilyloxy) ethyl (meth)acrylate, 2-(dimethylamino) ethyl (meth) acrylate, 2-(tert-butylamino) ethyl (meth)acrylate, dimethylaminoethyl methacrylate quaternary compound, and tetrahydrofurfuryl (meth)acrylate; and 4-hydroxymethylstyrene, 4-hydroxyethylstyrene, 4-aminomethylstyrene, 4-aminoethylstyrene, 2-(4-vinylphenyl) oxylane, and 2-(4-vinylbenzoyl) oxylane.

(4) Crosslinkable Monomer

The crosslinkable monomer (4) is a compound having at least two (particularly two, three or four) ethylenically unsaturated double bonds. The crosslinkable monomer (4) is preferably a fluorine-free monomer.

The crosslinkable monomer (4) is preferably a monomer represented by the formula:

[Formula 13]

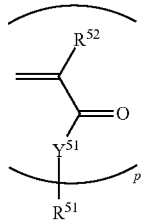

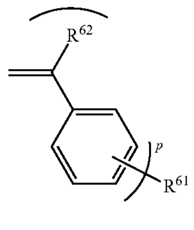

or

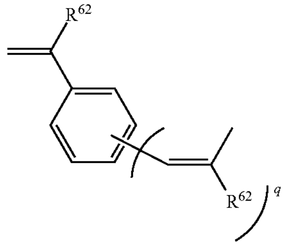

wherein $R^{51}$ and $R^{61}$ are each independently a direct bond or a divalent to tetravalent group composed of at least one selected from a hydrocarbon group having 1 to 20 carbon atoms, $—(CH_2CH_2O)_r—$, wherein r is an integer of 1 to 10, $—C_6H_4—$, —O—, or —NR'—, wherein R' is, H, or a hydrocarbon group having 1 to 4 carbon atoms;

$R^{52}$ and $R^{62}$ are a hydrogen atom, a monovalent organic group, or a halogen atom;

$Y^{51}$ is —O—, or —NR'—, wherein R' is H or a hydrocarbon group having 1 to 4 carbon atoms;

p is 2 to 4; and q is 1 to 5.

Examples of $R^{51}$ and $R^{61}$ are a direct bond, a divalent to tetravalent (for examples, divalent to trivalent) hydrocarbon group having 1 to 20 (or 2 to 10) carbon atoms which may be interrupted by an oxygen atom and/or whose hydrogen atom may be substituted by an OH group, an ethylene glycol group, a propylene glycol group, a glycerol group, a cyclohexyl group, a dicyclopentanyl group, an adamantyl group, an isobornyl group, a naphthalene group, a bornyl group, a tricyclodecanyl group, and a phenyl group, or a group containing any of these groups. $R^{51}$ and $R^{61}$ may be a polymer group, and the constituent unit constituting the polymer group may be the group exemplified above (for example, an ethylene glycol group).

$R^{52}$ and $R^{62}$ may each independently be a hydrogen atom, a methyl group, a halogen atom, a substituted or unsubstituted benzyl group, a substituted or unsubstituted phenyl group, or a $—CF_3$ group. Examples of $R^{52}$ and $R^{62}$ include a hydrogen atom, a methyl group, a chlorine atom, a bromine atom, an iodine atom, a fluorine atom, $—CF_3$ group, and a cyano group. $R^{52}$ and $R^{62}$ are preferably a hydrogen atom, a methyl group, or a chlorine atom. $R^{52}$ is more preferably a methyl group. Since $R^{52}$ is a methyl group, higher water-repellency can be obtained.

$R^{62}$ is preferably a hydrogen atom particularly from the viewpoint of reactivity, but is preferably a methyl group from the viewpoint of water repellency, and $R^{62}$ is preferably selected so as to satisfy both the reactivity and water-repellency.

The crosslinkable monomer (4) is preferably di(meth) acrylate or divinylbenzene.

Specific examples of the crosslinkable monomer (4) include divinylbenzene, 1,4-butanediol di(meth)acrylate, 1,6-hexanediol di(meth)acrylate, 1,9-nonanediol di(meth) acrylate, neopentyl glycol di(meth)acrylate, polyethylene glycol di(meth)acrylate, triethylene glycol di(meth)acrylate, ethylene glycol di(meth)acrylate, methylene glycol di(meth) acrylate, polytetramethylene glycol di(meth)acrylate, dimethyloltricyclodecane di(meth)acrylate, trimethylolpropane tri(meth)acrylate, adamantyl di(meth)acrylate, glycerin di(meth)acrylate, tricyclodecane dimethanol di(meth)acrylate, dicyclopentanyl di(meth)acrylate, and 5-hydroxy-1,3-adamantane di(meth)acrylate.

(5) High Glass Transition Point Monomer

The polymer may have a repeating unit formed from a high glass transition point monomer.

The glass transition point of the homopolymer of the high glass transition point monomer (5) is 50° C. or more, preferably 100° C. or more. The glass transition point of the homopolymer may be, for example, 120° C. or more, particularly 150° C. or more, and may be 250° C. or less.

The glass transition point (glass transition temperature) of the homopolymer was calculated by differential scanning calorimetry (DSC). The glass transition point can be determined by obtaining a DSC curve by raising the temperature of a sample 10 mg at 10° C./min, and determining the temperature indicated by the midpoint of the intersection between the extension of the baseline before and after the second order transition of the DSC curve and the tangent at the inflection point of the DSC curve.

The high glass transition point monomer (5) is preferably a fluorine-free monomer.

The high glass transition point monomer (5) is preferably a monomer represented by the formula:

[Formula 14]

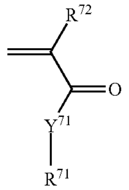

or

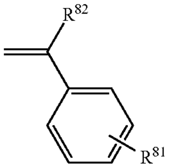

wherein $R^{71}$ and $R^{81}$ are a group composed of at least one selected from a hydrocarbon group having 1 to 30 carbon atoms, —$C_6H_4$—, —O—, or —NR'—, wherein R' is, H, or a hydrocarbon group having 1 to 4 carbon atoms;

$R^{72}$ and $R^{82}$ are a hydrogen atom, a monovalent organic group, or a halogen atom; and $Y^{71}$ is —O—, or —NR'—, wherein R' is H or a hydrocarbon group having 1 to 4 carbon atoms.

Examples of $R^{71}$ and $R^{81}$ include a cyclohexyl group, a dicyclopentanyl group, a dicyclopentenyl group, an adamantyl group, an isobornyl group, a naphthalene group, a bornyl group, a tricyclodecanyl group, and a phenyl group.

$R^{72}$ and $R^{82}$ may be a hydrogen atom, a methyl group, a halogen atom excluding a fluorine atom, a substituted or unsubstituted benzyl group, a substituted or unsubstituted phenyl group, or a —$CF_3$ group. Examples of $R^{72}$ and $R^{82}$ include a hydrogen atom, a methyl group, a chlorine atom, a bromine atom, an iodine atom, a fluorine atom, —$CF_3$ group, and a cyano group. $R^{72}$ and $R^{82}$ are preferably a hydrogen atom, a methyl group, or a chlorine atom. $R^{72}$ is more preferably a methyl group. Since $R^{72}$ is a methyl group, higher water-repellency can be obtained. On the other hand, $R^{82}$ is preferably a hydrogen atom particularly from the viewpoint of reactivity, but is preferably a methyl group from the viewpoint of water repellency, and $R^{82}$ is preferably selected so as to satisfy both the reactivity and water-repellency.

$Y^{71}$ is preferably —O— or —NH—.

Specific examples of the high glass transition point monomer (5) include:

acrylate esters such as cyclohexyl acrylate, isobornyl acrylate, bornyl acrylate, adamantyl acrylate, dicyclopentanyl acrylate, dicyclopentenyl acrylate, tricyclodecanyl acrylate, phenyl acrylate, naphthyl acrylate, benzyl acrylate, 2-t-butylphenyl acrylate, and naphthyl acrylate;

methacrylate esters such as methyl methacrylate, ethyl methacrylate, isopropyl methacrylate, t-butyl methacrylate, cyclohexyl methacrylate, isobornyl methacrylate, bornyl methacrylate, adamantyl methacrylate, dicyclopentanyl methacrylate, dicyclopentenyl methacrylate, tricyclodecanyl methacrylate, phenyl methacrylate, naphthyl methacrylate, benzyl methacrylate, (2-dimethylamino)ethyl methacrylate, aziridinyl methacrylate, aziridinylethyl methacrylate, and dicyclopentenyl methacrylate;

chloroacrylate esters such as methylchloroacrylate; and tert-butyl (meth)acrylamide, butyl (meth)acrylamide, phenyl (meth)acrylamide, isopropyl (meth)acrylamide, stearyl (meth)acrylamide, cyclohexyl (meth)acrylamide, isoboronyl (meth)acrylamide, bornyl (meth)acrylamide, adamantyl (meth)acrylamide, dicyclopentanyl (meth)acrylamide, dicyclopentenyl (meth)acrylamide, tricyclodecanyl (meth)acrylamide, benzyl (meth)acrylamide, naphthyl (meth)acrylamide, and 2-t-butylphenyl (meth)acrylamide.

The high glass transition point monomer (5) is preferably isoboronyl (meth)acrylate, bornyl (meth)acrylate, adamantyl (meth)acrylate, dicyclopentanyl (meth)acrylate, dicyclopentenyl (meth)acrylate, phenyl (meth)acrylate, naphthyl acrylate, or benzyl acrylate, and particularly preferably isoboronyl (meth)acrylate.

(6) Further Monomers

Further monomers (6) other than the monomers (1) and (2) may also be used.

Examples of the further monomers (6) include ethylene, vinyl acetate, acrylonitrile, vinyl chloride, styrene, polyethylene glycol (meth)acrylate, polypropylene glycol (meth) acrylate, methoxypolyethylene glycol (meth)acrylate, methoxypolypropylene glycol (meth)acrylate, and vinyl alkyl ether. The further monomer (6) is preferably a fluorine-free monomer. Further monomers are not limited to these examples.

As used herein, "(meth)acrylate" means acrylate or methacrylate, and "(meth)acrylamide" means acrylamide or methacrylamide.

Each of the monomers (1) to (6) may be made of a single compound or a mixture of two or more types.

In the present disclosure, preferred combinations of monomers in the polymer are as follows.

Monomer (1)+Monomer (4)
Monomer (1)+Monomer (5)
Monomer (1)+Monomer (3)+Monomer (4)
Monomer (1)+Monomer (3)+Monomer (5)
Monomer (1)+Monomer (4)+Monomer (5)
Monomer (1)+Monomer (3)+Monomer (4)+Monomer (5)
Monomer (2)+Monomer (4)
Monomer (4)+Monomer (5)
Monomer (2)+Monomer (5)
Monomer (2)+Monomer (3)+Monomer (4)
Monomer (2)+Monomer (3)+Monomer (5)
Monomer (2)+Monomer (4)+Monomer (5)
Monomer (2)+Monomer (3)+Monomer (4)+Monomer (5)
Monomer (1)+Monomer (2)+Monomer (3)+Monomer (4)
Monomer (1)+Monomer (2)+Monomer (4)+Monomer (5)
Monomer (1)+Monomer (2)+Monomer (3)+Monomer (4)+Monomer (5)
Monomer (1)+Monomer (2)+Monomer (3)+Monomer (4)+Monomer (5)+Monomer (6)

Particularly preferred combinations are as follows.

Monomer (1)+Monomer (3)+Monomer (4)
Monomer (1)+Monomer (4)+Monomer (5)
Monomer (2)+Monomer (3)+Monomer (4)
Monomer (2)+Monomer (3)+Monomer (5)
Monomer (1)+Monomer (2)+Monomer (3)+Monomer (4)
Monomer (1)+Monomer (2)+Monomer (4)+Monomer (5)
Monomer (1)+Monomer (3)+Monomer (4)+Monomer (5)
Monomer (1)+Monomer (2)+Monomer (3)+Monomer (4)+Monomer (5)

In the polymer, the molar ratio of the hydrophobic monomer (1) or the (meth)acrylic monomer (2)/the reactive or hydrophilic monomer (3)/the high glass transition point monomer (5) may be 20 to 100/0 to 50/0 to 70. Alternatively, the molar ratio of the hydrophobic monomer (1) or the (meth)acrylic monomer (2)/the reactive or hydrophilic monomer (3)/the high glass transition point monomer (5) may be 20 to 99.9/0.1 to 50/0 to 70, preferably 20 to 99.5/0.5 to 50/0 to 68. The molar ratio of the hydrophobic monomer (1) or the (meth)acrylic monomer (2)/the reactive or hydrophilic monomer (3) may be 50 to 99/1 to 50, preferably 55 to 98/2 to 45. The molar ratio of the hydrophobic monomer (1) or the (meth)acrylic monomer (2)/the high glass transition point monomer (5) may be 50 to 99/1 to 50, preferably 55 to 98/2 to 45. The amount of the crosslinkable monomer (4) may be 0.1 to 30 parts by mole, for example, 0.1 to 25 parts by mole, based on 100 parts by mole of the total of the hydrophobic monomer (1), the (meth)acrylic monomer (2), the high glass transition point monomer (5), and the reactive or hydrophilic monomer (3).

Alternatively, the molar ratio of one or both of the hydrophobic monomer (1) or the (meth)acrylic monomer (2)/the reactive or hydrophilic monomer (3)/the high glass transition point monomer (5) may be 50 to 95/0 to 30/0 to 30, 60 to 95/0 to 30, 1 to 20/0 to 30, 1 to 20, 80 to 95/0 to 15, 1 to 10/0 to 15, 1 to 10, 85 to 95/0 to 15, 1 to 10/0 to 15, or 1 to 10. The amount of the crosslinkable monomer (4) may be 0 to 20 parts by weight, 1 to 15 parts by weight, or 2 to 10 parts by weight, based on 100 parts by weight of the polymer.

The amount of the further monomer (6) may be 0 to 10% by weight, for example 0.1 to 5% by weight, based on the polymer.

The water-repellent polymer may be a random polymer or a block copolymer, but is preferably a random polymer.

(B) Aqueous Medium

The water-repellent composition comprises an aqueous medium. The aqueous medium is water, or a mixture of water and an organic solvent.

The water-repellent composition is generally an aqueous dispersion in which the polymer is dispersed in an aqueous medium (water or mixture of water and organic solvent).

The aqueous medium may be water alone or a mixture of water and a (water-miscible) organic solvent. The amount of the organic solvent may be 30% by weight or less, for example, 10% by weight or less, based on the liquid medium. The aqueous medium is preferably water alone.

The amount of the aqueous medium may be 50 to 99.5 parts by weight, particularly 70 to 99.5 parts by weight, when the total amount of the water-repellent polymer and the aqueous medium is 100 parts by weight.

(C) Binder Resin

The binder resin acts as a binder for binding the organic fine particles to the substrate. The binder resin is preferably a water-repellent resin. The water-repellent resin also acts as an active ingredient that exhibits water-repellency. Examples of the binder resin (C) include an acrylic polymer, a urethane polymer, a polyolefin, a polyester, a polyether, a polyamide, a polyimide, a polystyrene, and a silicone polymer.

The water-repellent resin is a fluorine-free polymer having a hydrocarbon group having 3 to 40 carbon atoms in a side chain or a fluorine-containing polymer having a fluoroalkyl group having 1 to 20 carbon atoms in a side chain. The water-repellent resin is preferably a fluorine-free polymer.

In the fluorine-free polymer having a hydrocarbon group having 3 to 40 carbon atoms, the hydrocarbon group is preferably a branched hydrocarbon group or a long-chain (or long-chain linear) hydrocarbon group. The $-CH_3$ group has a lower surface free energy than the $-CH_2-$ group and exhibits water-repellency. For this reason, a branched hydrocarbon group (for example, branched alkyl group), especially a structure having many $-CH_3$ groups, such as a t-butyl group, an isopropyl group, and a 2,6,8-trimethylnonan-4-yl group, is preferable. In the branched hydrocarbon group, the number of $-CH_3$ groups is preferably 2 to 15, for example, 3 to 10 or 4 to 8. The long-chain hydrocarbon group (or long-chain linear hydrocarbon group) may have 7 to 40 or 12 to 30 carbon atoms, such as 16 to 26, particularly 18 to 22.

Examples of the water-repellent resins include urethane polymers, silicone polymers, acrylic polymers, and polystyrene.

An example of the fluorine-free polymer is an amidoamine dendrimer having a long-chain hydrocarbon group, which is described in U.S. Pat. No. 8,703,894 B. The disclosure of this document is incorporated herein by reference.

A polymer having a hydrocarbon group having 3 to 40 carbon atoms in the side chain can be produced, for example, by reacting an isocyanate group-containing compound (for example, a monoisocyanate or a polyisocyanate, specifically a diisocyanate or triisocyanate) with a hydroxyl group-containing compound having a hydrocarbon group having 3 to 40 carbon atoms.

A polyurethane having a branched structure such as a t-butyl group, an isopropyl group, and a 2,6,8-trimethylnonan-4-yl group in a side chain can be produced, for example, by reacting an isocyanate group-containing compound (for example, monoisocyanate or polyisocyanate, specifically diisocyanate or triisocyanate) with a hydroxyl group-containing compound having a branched structure such as a t-butyl group, an isopropyl group, and a 2,6,8-trimethylnonan-4-yl group.

Examples of the urethane polymer include urethane compounds having long-chain hydrocarbon groups comprising sorbitan tristearate, sorbitan monostearate, and polyfunctional isocyanurates, which is described in US 2014/0295724 A. The disclosure of this document is incorporated herein by reference. An example of the urethane polymer is polyurethane having a long-chain hydrocarbon group, which is described in JP 2019-519653 T (WO 2018/007549 A). The disclosure of this document is incorporated herein by reference.

A silicone polymer having a hydrocarbon group having 3 to 40 carbon atoms in a side chain can be produced, for example, by reacting a dichlorosilane compound containing dichlorosilane having a hydrocarbon group having 3 to 40 carbon atoms.

A polysilicone having a branched structure such as a t-butyl group, an isopropyl group, and a 2,6,8-trimethylnonan-4-yl group in a side chain can be produced, for example, by reacting a dichlorosilane compound containing dichlorosilane having a branched structure such as a t-butyl group, an isopropyl group, and a 2,6,8-trimethylnonan-4-yl group.

Examples of silicone polymers include long-chain alkyl-modified polydimethylsiloxane.

An acrylic polymer having a hydrocarbon group having 3 to 40 carbon atoms in a side chain can be produced by polymerizing a monomer containing an acrylic monomer having a hydrocarbon group having 3 to 40 carbon atoms in a side chain. Examples of the acrylic monomer are the same as those described in the above-mentioned hydrophobic monomer (1). Specific examples of the acrylic monomer include, for example:

stearyl (meth)acrylate, behenyl (meth)acrylate

[Formula 15]

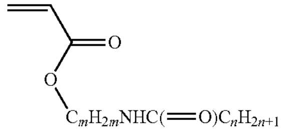

(in particular, stearic acid amidoethyl (meth)acrylate), wherein n is a number of 7 to 40 and m is a number of 1 to 5.

An acrylic polymer having a branched structure such as a t-butyl group, an isopropyl group, and a 2,6,8-trimethylnonan-4-yl group in a side chain can be produced by reacting a monomer containing an acrylic monomer having a branched structure such as a t-butyl group, an isopropyl group, and a 2,6,8-trimethylnonan-4-yl group in a side chain. Examples of the acrylic monomer are the same as those described in the above-mentioned hydrophobic monomer (1). Specific examples of the acrylic monomer include t-butyl (meth)acrylate, isopropyl (meth)acrylate, and 2,6,8-trimethylnonan-4-yl acrylate.

Examples of the acrylic polymer include a polymer containing a repeating unit derived from an acrylic monomer having a long-chain hydrocarbon group such as behenyl (meth)acrylate or stearyl (meth)acrylate, and a repeating unit derived from vinylidene chloride and/or vinyl chloride.

Examples of the acrylic polymer include a polymer containing a repeating unit derived from an acrylic monomer having a long-chain hydrocarbon group such as behenyl (meth)acrylate or stearyl (meth)acrylate, a repeating unit derived from vinylidene chloride and/or vinyl chloride, and a repeating unit derived from styrene or α-methylstyrene, and this acrylic polymer may be mixed with paraffin wax and used. An example thereof is described in JP 2012-522062 T (WO 2010/115496 A). The disclosure of this document is incorporated herein by reference.

Examples of the acrylic polymer include a polymer containing a repeating unit derived from an acrylic monomer having a long-chain hydrocarbon group such as stearyl (meth)acrylate, a repeating unit derived from vinylidene chloride and/or vinyl chloride, and a repeating unit derived from a reactive emulsifier such as polyoxyalkylene alkenyl ether, which is described in JP 2017/25440 A (WO 2017/014131 A). The disclosure of this document is incorporated herein by reference.

In the fluorine-containing polymer having a fluoroalkyl group having 1 to 20 carbon atoms in a side chain, the fluoroalkyl group is preferably a perfluoroalkyl group.

Examples of the fluorine-containing water-repellent resin include a fluorine-containing acrylic polymer containing a repeating unit formed from a (meth)acrylate having a perfluoroalkyl group having 4 to 8 carbon atoms in a side chain and a long-chain alkyl (meth)acrylate such as behenyl (meth)acrylate or stearyl (meth)acrylate.

Other monomers may be used for the urethane polymer, the silicone polymer, the acrylic polymer, and the polystyrene of the fluorine-free polymer and the fluorine-containing polymer.

Examples of the other monomers include ethylene, vinyl acetate, acrylonitrile, vinyl chloride, polyethylene glycol (meth)acrylate, polypropylene glycol (meth)acrylate, methoxypolyethylene glycol (meth)acrylate, methoxypolypropylene glycol (meth)acrylate, (meth)acrylates with polydimethylsiloxane in the side chain, and vinyl alkyl ether. Further monomers are not limited to these examples.

(D) Surfactant

The water-repellent composition may contain or may not contain a surfactant (emulsifier). In general, in order to stabilize the particles during polymerization and stabilize the aqueous dispersion after polymerization, a surfactant may be added in a small amount (for example, 0.01 to 15 parts by weight, based on 100 parts by weight of the monomer) during or after the polymerization.

Especially when the object to be treated is a textile product, it is preferable that the surfactant contains a nonionic surfactant in the water-repellent composition. Further, the surfactant preferably contains one or more surfactants selected from a cationic surfactant, an anionic surfactant, and an amphoteric surfactant. A combination of a nonionic surfactant and a cationic surfactant is preferably used.

Each of the nonionic surfactant, the cationic surfactant and the amphoteric surfactant may be one or a combination of two or more.

The amount of the surfactant may be 15 parts by weight or less (for example, 0 to 15 parts by weight or 0.01 to 15 parts by weight), and preferably 8 parts by weight or less, based on 100 parts by weight of the organic fine particle (A). In general, when a surfactant is added, the stability of the aqueous dispersion and the permeability into fabric are improved, but the water-repellency is lowered. It is preferable to select the type and amount of the surfactant so as to achieve both of these effects.

(E) Cross-Linking Agent

The cross-linking agent (E) is preferably one which crosslinks the aqueous dispersion of organic fine particles when heated after treating the fabric. Further, the cross-linking agent itself is preferably dispersed in water.

A preferred example of the cross-linking agent (E) is a blocked isocyanate compound. The blocked isocyanate compounds can be prepared by reacting [$A(NCO)_m$, wherein A is a group remaining after the isocyanate group is removed from the polyisocyanate, and m is an integer of 2 to 8] isocyanate with [RH, wherein R may be a hydrocarbon group which may be substituted by a heteroatom such as a nitrogen atom or an oxygen atom, and H is a hydrogen atom] a blocking agent.

$A(NCO)_m$ is, for example, tolylene diisocyanate (TDI), diphenylmethane diisocyanate (MDI), hexamethylene diisocyanate (HDI), or the like.

Examples of the blocking agent which forms the R group include oximes, phenols, alcohols, mercaptans, amides, imides, imidazoles, ureas, amines, imines, pyrazoles and active methylene compounds.

The cross-linking agent (E) is preferably a blocked isocyanate such as oxime-blocked toluene diisocyanate, blocked hexamethylene diisocyanate, or blocked diphenylmethane diisocyanate.

The amount of the cross-linking agent (E) may be 0 to 30 parts by weight or 0.01 to 20 parts by weight, for example 0.1 to 15 parts by weight, based on 100 parts by weight of the total of the organic fine particle (A) and the binder resin (C).

(F) Additives

The water-repellent composition may contain an additive (F) in addition to the organic fine particle (A) and the aqueous medium (B), and if necessary, the binder resin (C), the surfactant (D), and/or the cross-linking agent (E).

Examples of the additives include other water-repellents, oil-repellents, drying rate adjusters, film formation agents, compatibilizers, antifreezing agents, viscosity regulators, UV absorbers, antioxidants, pH adjusters, antifoaming agents, texture modifiers, slippage modifiers, antistatic agents, hydrophilizing agents, antibacterial agents, preservatives, insect repellents, fragrant agents, and flame retarders.

The amount of the additive may be 0 to 20 parts by weight or 0.05 to 20 parts by weight, for example 0.1 to 10 parts by weight, based on 100 parts by weight of the total of the organic fine particle (A) and the binder resin (C).

The polymers (polymer constituting the organic fine particles and polymer constituting the binder resin) can be produced by any ordinary polymerization method, and the conditions of the polymerization reaction can be arbitrarily selected. Examples of such a polymerization method include solution polymerization, suspension polymerization, and emulsion polymerization. Emulsion polymerization is preferred.

The method for producing the polymer is not limited as long as the water-repellent composition in the form of an aqueous dispersion can be obtained. For example, the polymer (organic fine particles) may be produced by polymerizing a monomer for organic fine particles in an aqueous medium in the presence or absence of a surfactant. Alternatively, an aqueous dispersion can be obtained by producing a polymer by solution polymerization, adding a surfactant and water, and removing the solvent.

When the water-repellent composition comprises organic fine particles and a binder resin, the water-repellent composition containing organic fine particles and a binder resin can be produced by separately producing an aqueous dispersion of organic fine particles and an aqueous dispersion of a binder resin, and mixing the aqueous dispersion of organic fine particles and the aqueous dispersion of a binder resin. Alternatively, the water-repellent composition containing organic fine particles and a binder resin can be produced by polymerizing a monomer for the binder resin in an aqueous dispersion of the organic fine particles. Alternatively, the water-repellent composition containing organic fine particles and a binder resin can be produced by polymerizing a monomer for the organic fine particles in an aqueous dispersion of the binder resin.

In emulsion polymerization without using a surfactant, it is preferable to polymerize the monomer in an aqueous medium at a low concentration (for example, a monomer concentration of 1 to 30% by weight, particularly 1 to 15% by weight).

In the emulsion polymerization using a surfactant or a reactive emulsifier, it is preferable to add a small amount (30 parts by mole or less, for example, 0.1 to 20 parts by mole, based on 100 parts by mole of the total monomers) of a monomer which forms a homopolymer having a static contact angle of water of 95 degrees or more, among the monomers (1), or the monomer (2). As a result, polymerization is performed at a high concentration, and the water-repellency of the polymer is increased.

Examples of the monomers to be added include t-butylstyrene, stearyl (meth)acrylate, behenyl (meth)acrylate, 2,6,8-trimethylnonan-4-yl acrylate, 2,4-di-t-butylstyrene, 2,4,6-trimethylstyrene, stearic acid amidoethyl (meth)acrylate, $CH_2{=}CHC({=}O)OC_2H_4NHSO_2C_{18}H_{37}$, 4-t-butylphenyl (meth)acrylate, 2,3,4-methylphenyl (meth)acrylate, and a (meth)acrylic monomer having a polydimethylsiloxane group represented by $$CH_2{=}C(—R^{92})—C({=}O)—Y^{91}—R^{91}$$

wherein $R^{91}$ is a group having a polydimethylsiloxane group;

$R^{92}$ is a hydrogen atom, a monovalent organic group, or a halogen atom; and $Y^{91}$ is a divalent to tetravalent group composed of at least one selected from a divalent to tetravalent hydrocarbon group having 1 carbon atom, $—C_6H_4—$, $—O—$, $—C({=}O)—$, $—S({=}O)_2—$, or $—NR'—$, wherein R' is H or a hydrocarbon group having 1 to 4 carbon atoms.

When the proportion of the monomer (5) and the monomer (3) is 35 parts by mole or more, based on all the monomers constituting the organic fine particles, the monomer which forms a homopolymer having a static contact angle of water of 95 degrees or more, among the monomers (1), is preferably 1 to 70 parts by mole, for example, 1 to 60 parts by mole.

In the solution polymerization, a method is employed in which the monomer is dissolved in an organic solvent in the presence of a polymerization initiator, nitrogen substitution is performed, and then heating and stirring are performed in the range of 30 to 120° C. for 1 to 10 hours. Examples of the polymerization initiator include azobisisobutyronitrile, benzoyl peroxide, di-t-butyl peroxide, lauryl peroxide, cumene hydroperoxide, t-butyl peroxypivalate, and diisopropyl peroxydicarbonate. The polymerization initiator is used in the range of 0.01 to 20 parts by mole, for example, 0.01 to 10 parts by mole, based on 100 parts by mole of the monomer.

The organic solvent is inert to the monomers and dissolves or homogeneously disperses them, and may be, for example, an ester (for example, an ester having 2 to 30 carbon atoms, specifically ethyl acetate or butyl acetate), a ketone (for example, a ketone having 2 to 30 carbon atoms, specifically methyl ethyl ketone or diisobutyl ketone), or an alcohol (for example, an alcohol having 1 to 30 carbon atoms, specifically isopropyl alcohol, ethanol or methanol). Specific examples of organic solvents include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, diisobutyl ketone, ethyl acetate, butyl acetate, 1,1,2,2-tetrachloroethane, 1,1,1-trichloroethane, trichloroethylene, perchloroethylene, tetrachlorodifluoroethane, and trichlorotrifluoroethane. The organic solvent is used in an amount of 50 to 99.5 parts by weight, for example, 70 to 99 parts by weight, based on 100 parts by weight of the total of the monomer and the organic solvent.

In the emulsion polymerization, a method is employed in which the monomer is emulsified in water in the presence of a polymerization initiator and an emulsifier, nitrogen substitution is performed, and then stirring and polymerization are performed in the range of 30 to 80° C. for 1 to 10 hours. Examples of the polymerization initiator include water-soluble compounds such as benzoyl peroxide, lauroyl peroxide, tert-butyl perbenzoate, 1-hydroxycyclohexyl hydroperoxide, 3-carboxypropionyl peroxide, acetyl peroxide, azobisisobutylamidine-dihydrochloride, 2,2'-azobis(2-methylpropionamidine) dihydrochloride, 4,4'-azobis(4-cyanovaleric acid), 2,2'-azobis[2-methyl-N-(2-hydroxyethyl)propionamide], 2,2'-azobis[2-(2-imidazolin-2-yl)propane] dihydrochloride, 2,2'-azobis[2-(2-imidazolin-2-yl)propane], sodium peroxide, potassium persulfate, and ammonium persulfate, and oil-soluble compounds such as azobisisobutyronitrile, benzoyl peroxide, di-t-butyl peroxide, lauryl peroxide, cumene hydroperoxide, t-butyl peroxypivalate and diisopropyl peroxydicarbonate. The polymerization initiator is used in the range of 0.01 to 10 parts by mole, based on 100 parts by mole of the monomer. If necessary, a reducing agent such as rongalite, ascorbic acid, tartaric acid, sodium disulfite, isoascorbic acid and ferrous sulfate may also be used in combination.

As the emulsifier, various anionic, cationic or nonionic emulsifiers can be used, and the emulsifier is used in the range of 0.5 to 20 parts by weight, based on 100 parts by weight of the monomer. Anionic and/or nonionic and/or cationic emulsifiers are preferably used. When the monomers are not completely compatible with each other, it is also preferable to add a compatibilizer, for example, a water-soluble organic solvent, which is sufficiently compatible with these monomers. By adding the compatibilizer, it is possible to improve the emulsifiability and copolymerizability.

Examples of the water-soluble organic solvent include acetone, methyl ethyl ketone, ethyl acetate, propylene glycol, dipropylene glycol monomethyl ether, dipropylene glycol, tripropylene glycol, ethanol, and methanol, and the water-soluble organic solvent may be used in the range of 0.1 to 50 parts by weight, for example 1 to 40 parts by weight, based on 100 parts by weight of water.

A chain transfer agent may be used in the polymerization. The molecular weight of the polymer can be changed according to the amount of the chain transfer agent used. Examples of chain transfer agents are mercaptan group-containing compounds such as lauryl mercaptan, thioglycol, and thioglycerol (particularly alkyl mercaptan (having 1 to 30 carbon atoms, for example)), and inorganic salts such as sodium hypophosphite and sodium bisulfite. The amount of the chain transfer agent used may be in the range of 0.01 to 10 parts by weight, for example, 0.1 to 5 parts by weight, based on 100 parts by weight of the total amount of the monomers.

The water-repellent composition is generally preferably an aqueous dispersion. The water-repellent composition comprises a polymer (active ingredient of the water repellent composition) and an aqueous medium. The amount of the aqueous medium may be, for example, 50 to 99.9% by weight, particularly 70 to 99.5% by weight, based on the water-repellent composition.

In the water-repellent composition, the concentration of the polymer may be 0.1 to 50% by weight, for example 0.5 to 40% by weight.

The water-repellent composition (and the aqueous dispersion of organic fine particles) can be used as an external treatment agent (surface-treatment agent) or an internal treatment agent. The water-repellent composition (and the aqueous dispersion of organic fine particles) can be used as an oil-repellent, a soil resistant agent, a soil release agent, a release agent, or a mold release agent.

When the water-repellent composition is an external treatment agent, it can be applied to an object to be treated by a conventionally known method. Usually, the water-repellent composition is diluted by dispersing it in an organic solvent or water, and is adhered to the surface of the object to be treated by a known method such as immersion coating, spray coating, or foam coating, and then dried. If necessary, the water-repellent composition may be applied together with a suitable cross-linking agent (for example, blocked isocyanate) for curing. Further, it is also possible to add an insect repellent, a softening agent, an antibacterial agent, a flame retarder, an antistatic agent, a coating material fixing agent, a wrinkle-resistant agent to the water-repellent composition and use in combination. The concentration of the polymer in the treatment liquid to be brought into contact with the substrate may be 0.01 to 10% by weight (particularly in the case of dip coating), for example, 0.05 to 10% by weight.

Examples of the object to be treated with the water-repellent composition (and the aqueous dispersion of organic fine particles) include textile products, stone materials, filters (for example, electrostatic filters), antidust masks, components of fuel cells (for example, gas diffusion electrodes and gas diffusion supports), glass, paper, wood, leather, fur, asbestos, bricks, cement, metals and oxides, ceramic products, plastics, coated surfaces and plasters. Various examples can be given as textile products. Examples of the textile products include various products such as animal and plant natural fibers such as cotton, hemp, wool and silk fibers, synthetic fibers such as polyamide, polyester, polyvinyl alcohol, polyacrylonitrile, polyvinyl chloride and polypropylene fibers, semisynthetic fibers such as rayon and acetate fibers, inorganic fibers such as glass fibers, carbon fibers and asbestos fibers, and mixtures of any of these fibers.

The textile product may be in any form such as fiber or fabric.

The water-repellent composition can also be used as a soil resistant agent, a release agent, and a mold release agent (for example, an internal mold release agent or an external mold release agent). For example, a surface of a substrate can be easily peeled from another surface (another surface on the substrate or a surface on another substrate).

The organic fine particles can be applied to fibrous substrates (for example, textile products) by any of the methods known for treating textile products with liquids. When the textile product is a fabric, the fabric may be immersed in a solution, or a solution may be adhered or sprayed to the fabric. The treated textile product is dried, preferably heated at, for example, 100° C. to 200° C., for developing water-repellency.

Alternatively, the organic fine particles may be applied to a textile product through a cleaning method, and may be, for example, applied to a textile product in washing application or a dry cleaning method.

When the heat treatment is performed at 170° C. for 1 minute after adhering to the substrate, the average diameter of the organic fine particles after the heat treatment is preferably 50% or more of the average diameter of the organic fine particles before the heat treatment. The average diameter (average particle size) of the organic fine particles after the heat treatment is preferably 60% or more, for example, 70% or more of the average diameter (average particle size) of the organic fine particles before the heat treatment. Alternatively, the average particle size of the fine particles observable on the substrate after the particles are coated on the substrate (including fabric) is preferably 50 to 700 nm.

The average diameter of the organic fine particles before the heat treatment is the particle size of the fine particles measured by dynamic light scattering (DLS) from an aqueous dispersion of the organic fine particles (when two or more peaks are observed in DLS measurement, the average particle size calculated from only the peak having a smaller particle size is used instead of the average particle sizes of all peaks), or the average diameter of the organic fine particles before the heat treatment adhered to the substrate. When the two values are different, the smaller is used.

The average diameter of the organic fine particles on the substrate means the average of the ten independent smallest unit particle diameters observed by a scanning electron microscope (SEM) at random after the organic fine particles have been adhered on the substrate. In general, the average diameter of the organic fine particles after the heat treatment means the ten independent smallest unit particle diameters observed on a substrate by a scanning electron microscope (SEM) at random after a dispersion of the organic fine particles is applied to the substrate (for example, fabric) and subjected to a heat treatment at 170° C. for 1 minute. For example, when the substrate is a fabric, the fabric is immersed in an aqueous dispersion containing organic fine particles, passed through a mangle, and passed through a pin tenter at 170° C. for 1 minute, whereby a fabric having organic fine particles adhered thereto can be produced. The average diameter of the organic fine particles before the heat treatment means the ten independent smallest unit particle diameters observed on a substrate by a scanning electron microscope (SEM) at random after a dispersion of the organic fine particles is applied to the substrate (for example, fabric) and air-dried for 1 hour or more.

The textile product to be treated is typically a fabric, and examples of the fabric include woven fabrics, knitted fabrics, nonwoven fabrics, clothing fabrics and carpets, or the textile product may also be a fiber, a yarn or an intermediate textile product (for example, a sliver or a rove). The textile product material may be a natural fiber (for example, cotton or wool fiber), a chemical fiber (for example, viscose rayon or lyocell), a synthetic fiber (for example, polyester, polyamide or acrylic fiber), or a mixture of fibers (for example, mixture of natural fibers and synthetic fibers).

Alternatively, the fibrous substrate may be leather. For making the leather hydrophobic and lipophobic, the organic fine particles may be applied to the leather in various stages of leather processing, for example in a leather wetting processing period or a leather finishing period.

Alternatively, the fibrous substrate may be paper. The organic fine particles may be applied to paper molded in advance, or applied in various stages of papermaking, for example in a paper drying period.

The "treatment" means that by immersion, spraying, coating or the like, the treatment agent is applied to the object to be treated. The treatment causes the organic fine particles as an active ingredient of the treatment agent to permeate the inside of the object to be treated and/or adhere to a surface of the object to be treated.

In the treated substrate (particularly textile products), the falling speed of water is preferably 100 mm/s or more, for example, 130 mm/sec or more, and still more preferably 150 mm/sec or more or 200 mm/sec or more.

The treated substrate exhibits the effect of preventing frost formation.

While certain embodiments have been described, it will be understood that various changes in form and details may be made therein without departing from the spirit and scope of the claims.

EXAMPLES

Hereinafter, the present disclosure will be described in detail with reference to Examples, but the present disclosure is not limited to these Examples.

In the following, parts or % or ratios represent parts by weight or % by weight or weight ratios unless otherwise specified.

The test procedure is as follows.

[Number Average Molecular Weight (Mn), Weight Average Molecular Weight (Mw), Molecular Weight Distribution (Mw/Mn)]

The number average molecular weight (Mn), weight average molecular weight (Mw), and molecular weight distribution (Mw/Mn) were determined by gel permeation chromatography (GPC). For GPC, tetrahydrofuran was used as a developing liquid, KF-606M, KF-601, and KF-800D manufactured by Shodex were used as columns, and the molecular weights and the like were calculated in terms of polystyrene.

[Measurement of Thermal Properties by Differential Scanning Calorimetry (DSC)]

The melting point of the polymer was calculated by differential scanning calorimetry (DSC). In the DSC measurement, under a nitrogen atmosphere, the copolymer was cooled to −20° C., then the temperature was raised at 10° C./minute to 200° C., and the polymer was cooled again to −20° C., and thereafter, the melting point observed in the temperature rising process at 10° C./minute to 200° C. was measured. In a polymer in which a plurality of melting peaks appear, the peak having the largest quantity of heat of melting, which was derived from melting of long-chain alkyl, was taken as the melting point. The glass transition point (glass transition temperature) was determined by obtaining a DSC curve by determining the temperature indicated by the midpoint of the intersection between the extension of the baseline before and after the second order transition of the DSC curve and the tangent at the inflection point of the DSC curve.

[Measurement of Particle Size of Dispersion]

For dynamic light scattering (DLS) measurement, ZEN1600 manufactured by MAVERN was used to determine the average diameter of particles in the dispersion. The aqueous dispersion of organic fine particles was diluted with pure water to a solid content concentration of 0.1% and measured at 25° C. The particle size distribution was analyzed, based on the scattering intensity.

Static Contact Angle Measurement

Synthesis Examples L1 to L5

A chloroform solution of a polymer (solid content concentration: 1.0%) was spin-coated on a silicon wafer substrate (high-purity silicon wafer AS ONE 2-960-55 for research use) and heated at 80° C. for 15 minutes to produce a coating film. Onto this coating film, 2 μL of water was dropped, and the static contact angle 1 second after the dropping was measured using a fully automatic contact angle meter (DropMaster701 manufactured by Kyowa Interface Science).

(Organic Fine Particles)

Specifically, the contact angle of the organic fine particles was measured by dropcasting the aqueous dispersion of the organic fine particles onto a glass substrate (made of slide glass soda lime glass), heating at 150° C. for 3 minutes to produce a substrate to which the organic fine particles are adhered, dropping 2 μL of water onto the glass substrate to which the organic fine particles are adhered, and measuring the static contact angle 1 second after the dropping by using a fully automatic contact angle meter (DropMaster 701, manufactured by Kyowa Interface Science Co., Ltd.). The contact angle of the organic fine particles on the glass substrate is preferably 1000 or more, more preferably 110° or more, and still more preferably 118° or more.

The static contact angle of water of a fabric (PET fabric) treated with an aqueous dispersion of organic fine particles or a composition containing organic fine particles and a binder resin was measured by immersing a PET fabric (weight: 88 g/m$^2$, 70 denier, gray) in an aqueous dispersion of organic fine particles or a composition containing organic fine particles and a binder, passing the PET fabric through a mangle and then a pin tenter at 170° C. for 1 minute to prepare a PET fabric to which the organic fine particles are adhered, dropping 2 μL of water onto the PET fabric, and measuring the static contact angle 1 second after the dropping using a fully automatic contact angle meter (DropMaster 701, manufactured by Kyowa Interface Science Co., Ltd.). The contact angle of the organic fine particles on the fabric (PET fabric) is preferably 1200 or more, more preferably 130° or more, and still more preferably 140° or more.

The contact angle of the aqueous dispersion of the binder resin was measured by dropcasting the aqueous dispersion of the binder resin onto a glass substrate (made of slide glass soda lime glass), heating at 150° C. for 3 minutes to produce a coating film, dropping 2 μL of water onto the coating film, and measuring the static contact angle 1 second after the dropping by using a fully automatic contact angle meter (DropMaster 701, manufactured by Kyowa Interface Science Co., Ltd.).

[Falling Speed Test]

In the falling speed test, the average falling speed at a distance of about 40 mm was measured by immersing a PET fabric (weight: 88 g/m$^2$, 70 denier, gray) in an aqueous dispersion of organic fine particles or a composition containing organic fine particles and a binder resin, passing the PET fabric through a mangle and then a pin tenter at 170° C. for 1 minute to prepare a PET fabric to which the organic fine particles are adhered, dropping 20 μL of water from a microsyringe onto the PET fabric having an inclination of 30° using a fully automatic contact angle meter (DropMaster 701, manufactured by Kyowa Interface Science Co., Ltd.), and measuring the falling of the dropped water using a high-speed camera (VW-9000 manufactured by Keyence Co., Ltd.), and was taken as the falling speed.

[Measurement of Solid Content]

The obtained aqueous dispersion of organic fine particles was put into an aluminum cup by 1 g and dried at 150° C. for 1 hour. The solid content was calculated from the weight before and after drying.

Solid content %=(weight before drying−weight after drying)/weight before drying×100

[Water-Repellency Test]

An aqueous dispersion of organic fine particles was prepared to a predetermined concentration, the fabric was dipped in this test solution, passed through a mangle, and the water-repellency was evaluated with the heat-treated test fabric. The water-repellency of the treated fabric was evaluated according to the spray method of JIS-L-1092 (AATCC-22). As shown in the table described below, the water-repellency is represented by a water-repellency number. The higher the score, the better the water-repellency. A "+" attached to a number means better than the number, and a "−" attached to a number means worse than the number. Evaluation was performed using a polyester fabric (PET) (weight: 88 g/m$^2$, 70 denier, gray).

| Water-repellency No. | State |
|---|---|
| 100 | The surface is not wet, and has no water droplets. |
| 90 | The surface is not wet, and has small water droplets. |

-continued

| Water-repellency No. | State |
|---|---|
| 80 | The surface has small individual wet parts like water droplets. |
| 70 | Half the surface is wet, and small individual wet parts permeate the fabric. |
| 50 | The entire surface is wet. |
| 0 | The entire surface and back surface are wet. |

[Strong Water-Repellency Test]

In the test conducted in accordance with the spray method specified in JIS-L-1092 (AATCC-22), ease of repelling water contacting the fabric and the speed of the water flowing down from the fabric were visually evaluated. The higher the score, the better the strong water-repellency.

| Strong water-repellency No. | State |
|---|---|
| 5 | Water contacting the fabric is repelled so as to move a long way away from the fabric, few droplets are generated on the fabric, and the water droplets immediately flow down. |
| 4 | Water contacting the fabric is repelled so as to move away from the fabric, and the speed of the water flowing down from the fabric is lower than that in the state "5". |
| 3 | Water contacting the fabric is repelled so as to slightly float from the fabric, and water droplets are generated on the fabric, and roll down without remaining on the fabric. |
| 2 | Water contacting the fabric does not substantially move away from the fabric, and while water droplets generated on the fabric roll down, a larger amount of water droplets remain on the fabric as compared to the state "3". |
| 1 | Water contacting the fabric rolls along the fabric, and a large amount of water droplets remain on the fabric. |

[Water-Repellency and Strong Water-Repellency Washing Durability (Water-Repellency (after Washing) and Strong Water-Repellency (after Washing))]

In accordance with JIS L-0217 103, the water-repellency of a test fabric washed 20 times, and the water-repellency and strong water-repellency are evaluated. After washing, it is preferable that the water-repellency is 80 points or more and the strong water-repellency is 2 points or more.

[Scanning Electron Microscope (SEM) Observation (Particle Size)]

The SEM observation was carried out at an acceleration voltage of 3.5 kV by ERA 9000 manufactured by ELIONIX INC., at a W.D. of 5.0 mm by Pt deposition, and at an acceleration voltage of 3.0 kV by SU 8020 manufactured by Hitachi High-Tech Corporation, at Pt deposition. The particle sizes determined by both devices were the same.

After immersing the fabric in the composition containing the organic fine particles, passing the fabric through a mangle and passing the fabric through a pin tenter at 170° C. for 1 minute to create a fabric to which the organic fine particles are adhered, and the average of the particle diameters of the ten independent smallest unit particle diameters observed on a substrate by a scanning electron microscope (SEM) at random.

The retention rate (%) of the particle diameter before and after heating was determined by the following equation using the average particle size of the organic fine particles on the substrate after heating determined by SEM observation (the average diameter of the particles on the fabric heated at 170° C. for 1 minute) and the average particle size of the organic fine particles before heating (the smaller of the average particle size of the fine particle dispersion determined by DLS measurement or the average particle size on the substrate before heating determined by SEM observation).

Retention rate (%) of average diameter before and after heating=(average particle size after heating)/(average particle size before heating)×100

[Color Deepening Measurement]

L was measured at three places of each treated fabric by a color difference meter (manufactured by Minolta Co., Ltd., color difference meter CR-200, detection part is circular with a diameter of 8 mm). A color difference (ΔL) was calculated from L of the fabric before treatment with the treatment liquid and L after treatment by the following equation.

$\Delta L$=($L$ value after fabric treatment)−($L$ value before fabric treatment)

In Examples and Comparative Examples, the meanings of the abbreviations are as follows.

tBuSty: 4-t-butyl styrene
tBuMA: t-butyl methacrylate
StMA: stearyl methacrylate
Sty: styrene
MeSty: 4-methylstyrene
C17AEA: $CH_2$=$CHCO_2$—$CH_2CH_2$—NH—C(=O)—$C_{17}H_{35}$
iBMA: isobornyl methacrylate
GMA: glycidyl methacrylate
DHMA: 2,3-dihydroxypropylmethacrylate
HEMA: hydroxyethyl Methacrylate
HBA: 4-hydroxybutyl acrylate
DQ: dimethylaminoethyl methacrylate quaternary compound
BCPMA: dicyclopentanyl methacrylate
CHMA: cyclohexyl methacrylate
DVB: divinylbenzene
NP-A: neopentyl glycol diacrylate
NP-MA: neopentyl glycol dimethacrylate
DMS-MA: polydimethylsiloxyethyl methacrylate
DMS-MA1: polydimethylsiloxyethyl methacrylate (molecular weight 1000)
DMS-MA2: polydimethylsiloxyethyl methacrylate (molecular weight 500)
DMS-MA3: polydimethylsiloxyethyl methacrylate (molecular weight 12000)
DCP: dicyclopentanyl diacrylate
DCP-M: dicyclopentanyl dimethacrylate
ADDA: adamantyl diacrylate
HADDM: 5-hydroxy-1,3-adamantyl dimethacrylate
EGDMA: ethylene glycol dimethacrylate
tBuMA: t-butyl methacrylate
MMA: methyl methacrylate
VAc: vinyl acetate
tBuAAm: t-butylacrylamide
StA: stearyl acrylate
Emulsifier 1: polyethylene glycol monooleyl ether (liquid)
Emulsifier 2: polyethylene glycol monooleyl ether (solid)
Emulsifier 3: glyceryl stearate
Emulsifier 4: laurtrimonium chloride
Emulsifier 5: cetrimonium chloride
Emulsifier 6: stearyltrimonium chloride
Emulsifier 7: polyoxyalkylene alkenyl ether (HLB16)
Emulsifier 8: polyoxyalkylene alkenyl ether (HLB14)
Emulsifier 9: polyoxyalkylene alkenyl ether (HLB13)
Emulsifier 10: tetraglyceryl monostearate
Emulsifier 11: diethanolamide laurate
Emulsifier 12: sorbitan tristearate
Cross-linking agent 1: oxime-blocked toluene diisocyanate
Cross-linking agent 2: oxime-blocked hexamethylene diisocyanate
PDMS-A: Long-chain alkyl-modified dimethylsiloxane
StOH: stearyl alcohol

Synthesis Example 1

In a nitrogen-substituted reaction vessel, 0.66 g of t-butylstyrene (tBuSty), 0.39 g of glycidyl methacrylate (GMA), 0.018 g of divinylbenzene (DVB) and 33 ml of pure water were added and dispersed. After nitrogen substitution, 18.6 mg of 2,2'-azobis(2-methylpropionamidine) dihydrochloride was added, and the mixture was heated and stirred at 65° C. for 8 hours to obtain an aqueous dispersion of organic fine particles. The solid content was 2.85%. The particle size (average particle size) of the aqueous dispersion was 250 nm. The contact angle of water on the glass substrate of the organic fine particles was 120°. The static contact angle of water of PET (fabric) (weight: 88 g/m$^2$, 70 denier, gray) treated with an aqueous dispersion of organic fine particles was 143.1°, and the falling speed was 265 mm/s. Further, an aqueous dispersion of the organic fine particles was cast on a glass substrate, air-dried, and then left in an environment of −30° C. for 2 days. Thereafter, when the substrate was taken out in an environment of 25° C., frost adhered to the glass, but frost formation was not confirmed on the organic fine particles. The retention rate of the particle diameter before and after heating at 170° C. for 1 minute was 80%.

Synthesis Examples 2 to 44

The same procedure as in Synthesis Example 1 was repeated except that the monomers shown in Table 1 were used. The results are shown in Table 1. In Synthesis Example 25 to 28, in addition to the monomers shown in the table, a cationic emulsifier (lauryltrimonium chloride) was added in a predetermined amount shown in the table with respect to the total amount of monomers, and polymerization was performed. In Synthesis Example 29, in addition to the monomers shown in the table, a cationic emulsifier (lauryltrimonium chloride) and polyethylene glycol monooleyl ether were added in an amount of 0.5%, based on the total amount of the monomers for polymerization. The aqueous dispersion of the organic fine particles synthesized in Synthesis Example 13 was cast on a glass substrate, air-dried, and then left in an environment of −30° C. for 2 days. Thereafter, when the substrate was taken out in an environment of 25° C., frost adhered to the glass, but frost formation was not confirmed on the coating film of the organic fine particles. In Synthesis Examples 2 to 44, the retention rate of the particle diameter before and after heating at 170° C. for 1 minute was 80%.

Comparative Synthesis Examples 1 to 3

The same procedure as in Synthesis Example 1 was repeated except that the monomers shown in Table 1 were used. The results are shown in Table 1. In Comparative Synthesis Example 1, the stability of the emulsion after polymerization was poor, and the fabric could not be uniformly treated. In Comparative Synthesis Examples 2 and 3, water droplets adhered to the fabric and did not fall in the falling speed test.

TABLE 1

| | Composition | Ratio mol % | Particle size [nm] | PET fabric CA. [°] | PET fabric Falling speed [mm/s] |
|---|---|---|---|---|---|
| Synthesis Example 2 | tBuSty/GMA/DVB | 60/40/2 | 382 | 150.4 | 240.1 |
| Synthesis Example 3 | tBuSty/GMA/DVB | 60/40/2 | 261 | 152.8 | 270.0 |
| Synthesis Example 4 | tBuSty/GMA/DVB | 60/40/2 | 399 | 149.6 | 246.4 |
| Synthesis Example 5 | tBuSty/HEMA/DVB | 60/40/10 | — | 151.9 | 270.6 |
| Synthesis Example 6 | tBuSty/HEMA/DVB | 80/20/10 | — | 149.9 | 217.2 |
| Synthesis Example 7 | tBuSty/DHMA/DVB | 92/8/10 | — | 147.0 | 247.6 |
| Synthesis Example 8 | tBuSty/GMA/DVB | 60/40/2 | 441 | 149.0 | 227.0 |
| Synthesis Example 9 | tBuMA/GMA/DVB | 80/20/10 | 452 | 150.9 | 204.8 |
| Synthesis Example 10 | tBuMA/HEMA/DVB | 98/2/10 | 546 | 132.1 | 144.2 |
| Synthesis Example 11 | tBuSty/GMA/DVB | 60/40/2 | 285 | 148.6 | 240.6 |
| Synthesis Example 12 | tBuSty/GMA/DVB | 60/40/2 | 405 | 148.2 | 268.5 |
| Synthesis Example 13 | tBuMA/iBMA/GMA/DVB | 50/30/20/10 | 389 | 156.2 | 227.0 |
| Synthesis Example 14 | tBuMA/iBMA/GMA/DVB | 40/40/20/10 | 575 | 141.7 | 193.4 |
| Synthesis Example 15 | tBuMA/iBMA/GMA/DVB | 30/50/20/10 | 493 | 140.3 | 174.2 |
| Synthesis Example 16 | tBuMA/iBMA/GMA/DVB/DMS-MA | 50/30/20/10/2 | 437 | 151.3 | 223.9 |
| Synthesis Example 17 | tBuMA/iBMA/DHMA/DVB | 56/34/10/10 | — | — | 227.0 |
| Synthesis Example 18 | tBuMA/iBMA/HBA/NP-A | 59/36/5/10 | — | — | 196.3 |
| Synthesis Example 19 | tBuSty/GMA/DQ/DVB | 60/40/1/2 | — | — | 168.0 |
| Synthesis Example 20 | tBuMA/iBMA/DHMA/DVB | 50/30/20/10 | — | — | 244.5 |
| Synthesis Example 21 | tBuSty/DHMA/DVB | 92/8/10 | 392 | — | 186.0 |
| Synthesis Example 22 | tBuSty/GMA/DVB | 60/40/2 | 256 | 145.6 | 227.9 |
| Synthesis Example 23 | tBuSty/GMA/DVB | 70/30/2 | 306 | 149.6 | 230.1 |
| Synthesis Example 24 | tBuSty/GMA/DVB | 85/15/2 | 237 | 142.6 | 208.4 |
| Synthesis Example 25 | tBuSty/GMA/DVB + Cation 1.0% | 60/40/2 | 252 | 148.7 | 249.5 |
| Synthesis Example 26 | tBuSty/GMA/DVB + Cation 1.0% | 70/30/2 | 311 | 149.0 | 239.7 |
| Synthesis Example 27 | tBuSty/GMA/DVB + Cation 1.0% | 85/15/2 | 329 | 153.2 | 246.4 |
| Synthesis Example 28 | tBuSty/GMA/DVB + Cation 0.5% | 60/40/2 | 440 | 147.7 | 198.2 |
| Synthesis Example 29 | tBuSty/GMA/DVB + Cation 0.1%** | 60/40/2 | 176 | 147.0 | 161.7 |
| Synthesis Example 30 | tBuMA/HEMA/DVB | 80/20/10 | — | 130.8 | 134.8 |
| Synthesis Example 31 | tBuSty/GMA/DCP | 60/40/2 | — | 151.5 | 198.0 |
| Synthesis Example 32 | BCPMA/GMA/DVB | 80/20/10 | — | — | 192.7 |
| Synthesis Example 33 | CHMA/GMA/DVB | 80/20/10 | — | — | 143.6 |
| Synthesis Example 34 | tBuSty/GMA/NP-MA | 60/40/2 | — | — | 153.7 |
| Synthesis Example 35 | tBuSty/GMA/DCP-M | 60/40/2 | — | — | 174.8 |
| Synthesis Example 36 | tBuSty/GMA/ADDA | 60/40/2 | — | — | 209.2 |
| Synthesis Example 37 | tBuSty/GMA/HADDM | 60/40/2 | — | — | 198.8 |
| Synthesis Example 38 | StMA/GMA/DVB | 60/40/2 | — | — | 202.0 |
| Synthesis Example 39 | tBuSty/GMA/DVB | 60/40/4 | 575 | — | 260.2 |
| Synthesis Example 40 | tBuSty/GMA/DVB | 60/40/1 | 475 | — | 264.9 |
| Synthesis Example 41 | tBuSty/DHMA/DVB | 92/8/20 | 203 | — | 253.5 |
| Synthesis Example 42 | tBuSty/DHMA/DVB | 92/8/5 | 301 | — | 181.4 |
| Synthesis Example 43 | tBuSty/GMA/DVB | 60/40/10 | 688 | — | 136.6 |
| Synthesis Example 44 | tBuSty/DHMA/DVB | 92/8/3 | 227 | 131.8 | 151.4 |
| Comparative Example 1 | iBMA/GMA/DVB | 60/40/2 | —* | —* | —* |
| Comparative Example 2 | MeSty/GMA/DVB | 60/40/2 | — | — | x |
| Comparative Example 3 | Sty/GMA/DVB | 60/40/2 | — | — | x |

*The emulsion state was poor and polymerization did not proceed uniformly.
**0.5% nonionic emulsifier was added in addition to the cationic emulsifier.
—: Unmeasured

Synthesis Example L1

In a nitrogen-substituted reaction vessel, 1.50 g of tBuSty, 0.015 g of azobisisobutyronitrile, and 10 ml of toluene were added, heated and stirred at 65° C. for 8 hours, and then re-precipitated in methanol to obtain PtBuSty. The molecular weight (Mw) was 21000 and the molecular weight distribution (Mw/Mn) was 2.0. The contact angle of water of the obtained polymer was 100°. The glass transition temperature (Tg) was 125° C.

Synthesis Example L2

In a nitrogen-substituted reaction vessel, 1.50 g of MeSty, 0.021 g of azobisisobutyronitrile, and 10 ml of toluene were added, heated and stirred at 65° C. for 8 hours, and then re-precipitated in methanol to obtain PMeSty. The molecular weight (Mw) was 15000 and the molecular weight distribution (Mw/Mn) was 2.0. The contact angle of water of the obtained polymer was 95°. The glass transition temperature (Tg) was 107° C.

Synthesis Example L3

In a nitrogen-substituted reaction vessel, 1.00 g of Sty, 0.015 g of azobisisobutyronitrile, and 3.4 ml of toluene were added, heated and stirred at 65° C. for 8 hours, and then re-precipitated in methanol to obtain PSty. The molecular weight (Mw) was 15000 and the molecular weight distribution (Mw/Mn) was 2.1. The contact angle of water of the obtained polymer was 89°. The glass transition temperature (Tg) was 100° C.

Synthesis Example L4

In a nitrogen-substituted reaction vessel, 2.00 g of tBuMA, 0.023 g of azobisisobutyronitrile, and 20 ml of toluene were added, heated and stirred at 65° C. for 8 hours, and then re-precipitated in a mixed solution of methanol and water to obtain PtBuMA. The molecular weight (Mw) was 18000 and the molecular weight distribution (Mw/Mn) was 2.0. The contact angle of water of the obtained polymer was 89°. The glass transition temperature (Tg) was 107° C.

Synthesis Example L5

In a nitrogen-substituted reaction vessel, 2.00 g of StMA, 0.0097 g of azobisisobutyronitrile, and 20 ml of toluene were added, heated and stirred at 65° C. for 8 hours, and then re-precipitated in methanol to obtain PStMA. The molecular weight (Mw) was 35000 and the molecular weight distribution (Mw/Mn) was 2.1. The contact angle of water of the obtained polymer was 109°. The melting point (Tm) was 50° C.

Synthesis Example B1

In a nitrogen-substituted reaction vessel, 3.00 g of StA, 0.149 g of polyethylene glycol monooleyl ether, 0.020 g of sorbitan tristearate, and 60 ml of pure water were added and emulsified. To the reaction vessel, 25 mg of 2,2'-azobis(2-methylpropionamidine) dihydrochloride was added, and the mixture was heated and stirred at 65° C. for 8 hours to obtain an aqueous dispersion of PStA. The solid content was 4.6%. The contact angle of water in the film obtained by applying the emulsified dispersion to the glass substrate was 110°.

Synthesis Example B2

In a nitrogen-substituted reaction vessel, 3.00 g of StA, 0.262 g of polyethylene glycol monooleyl ether, 0.037 g of sorbitan tristearate, and 60 ml of pure water were added and emulsified. To the reaction vessel, 25 mg of 2,2'-azobis(2-methylpropionamidine) dihydrochloride was added, and the mixture was heated and stirred at 65° C. for 8 hours to obtain an aqueous dispersion of PStA. The solid content was 4.7%. The contact angle of water in the film obtained by applying the emulsified dispersion to the glass substrate was 110°.

Synthesis Example B3

In a nitrogen-substituted reaction vessel, 3.00 g of StA, 0.131 g of polyethylene glycol monooleyl ether, 0.018 g of sorbitan tristearate, and 40 mg of 2-[(dodecylsulfanylthiocarbonyl)sulfanyl]propanoic acid, and 60 ml of pure water were added and emulsified. To the reaction vessel, 3 mg of 2,2'-azobis(2-methylpropionamidine) dihydrochloride was added, and the mixture was heated and stirred at 65° C. for 4 hours. Further, 0.296 g of HBA was added and the mixture was heated and stirred for 4 hours to obtain an aqueous dispersion of a block polymer of StA/HBA. The contact angle of water in the film obtained by applying the emulsified dispersion to the glass substrate was 109°.

Synthesis Example B4

In a nitrogen-substituted reaction vessel, 2.00 g of StA, 0.098 g of HBA, 0.087 g of polyethylene glycol monooleyl ether, 0.013 g of sorbitan tristearate, and 24 mg of 2-[(dodecylsulfanylthiocarbonyl)sulfanyl]propanoic acid, and 18 ml of pure water were added and emulsified. To the reaction vessel, 3 mg of 2,2'-azobis(2-methylpropionamidine) dihydrochloride was added, and the mixture was heated and stirred at 65° C. for 8 hours to obtain an aqueous dispersion of a random polymer of StA/HBA. The contact angle of water in the film obtained by applying the emulsified dispersion to the glass substrate was 107°.

Synthesis Example B5

In a nitrogen-substituted reaction vessel, 0.5 g of StA, 0.59 g of $CH_2{=}CHCO_2{-}CH_2CH_2{-}NH{-}C({=}O){-}C_{17}H_{35}$ ($C_{17}$AEA), 0.049 g of HBA, 0.096 g of polyethylene glycol monooleyl ether, 0.014 g of sorbitan tristearate, and 12 mg of 2-[(dodecylsulfanylthiocarbonyl)sulfanyl]propanoic acid, and 10 ml of pure water were added and emulsified. To the reaction vessel, 3 mg of 2,2'-azobis(2-methylpropionamidine) dihydrochloride was added, and the mixture was heated and stirred at 65° C. for 8 hours to obtain an aqueous dispersion of a random polymer of StA/C17AEA/HBA. The contact angle of water in the film obtained by applying the emulsified dispersion to the glass substrate was 108°.

Synthesis Example B6

In a nitrogen-substituted reaction vessel, 0.5 g of StA, 0.59 g of $C_{17}$AEA, 0.048 g of polyethylene glycol monooleyl ether, 0.007 g of sorbitan tristearate, and 12 mg of 2-[(dodecylsulfanylthiocarbonyl)sulfanyl]propanoic acid, and 10 ml of pure water were added and emulsified. To the reaction vessel, 1 mg of 2,2'-azobis(2-methylpropionamidine) dihydrochloride was added, and the mixture was heated and stirred at 65° C. for 4 hours. Further, 0.049 g of HBA was added and the mixture was heated and stirred for 4 hours to obtain an aqueous dispersion of a block polymer of StA/C17AEA/HBA. The contact angle of water in the film obtained by applying the emulsified dispersion to the glass substrate was 1090.

Synthesis Example B7

In a 200 ml poly container, 10 g of tripropylene glycol, 20 g of StA, 0.05 g of trialkylammonium chloride, 2.0 g of sorbitan monoalkylate, 1.0 g of polyoxyethylene alkyl ether, and 60 g of pure water were added, and stirred with a homomixer at 2000 rpm for 1 minute, and dispersed by ultrasonic waves for 15 minutes. The emulsified dispersion was transferred to an autoclave, 0.05 g of alkyl mercaptan and 8.6 g of vinyl chloride were added after nitrogen substitution, and 0.5 g of an azo initiator was added and heated and stirred at 60° C. for 20 hours to obtain a polymer aqueous dispersion. The contact angle of water in the film obtained by applying the emulsified dispersion to the glass substrate was 1080.

Synthesis Example B8

In a 500 ml container, 30 g of tripropylene glycol, 45 g of C17AEA, 34 g of StA, 1 g of N-alkylolacrylamide, 2 g of trialkylammonium chloride, 2 g of sorbitan monoalkylate, 2.5 g of polyoxyethylene trialkyl ether, 3.5 g of polyoxyethylene alkyl ether, and 180 g of pure water were added, and stirred at 80° C. with a homomixer at 2000 rpm for 1 minute, and dispersed by ultrasonic waves for 15 minutes. The emulsified dispersion was transferred to an autoclave, 0.2 g of alkyl mercaptan and 20 g of vinyl chloride were added after nitrogen substitution, and 1 g of an azo initiator was added and heated and stirred at 60° C. for 20 hours to obtain a polymer aqueous dispersion. The contact angle of water in the film obtained by applying the emulsified dispersion to the glass substrate was 109°.

Synthesis Example B9

In a nitrogen-substituted reaction vessel, 28.9 g of sorbitan tristearate, 0.31 g of sorbitan monostearate, 7.5 g of hexamethylene triisocyanate (biuret), 37.5 g of methyl isobutyl ketone, and 0.03 g of dibutyl tin laurate were added, and heated and stirred at 80° C. In this solution, 9 g of tripropylene glycol, 1.8 g of sorbitan tristearate, 0.75 g of polyethylene glycol monooleyl ether, 0.6 g of trimethyl octadecyl ammonium chloride, and 40 g of pure water were added and stirred. Methyl isobutyl ketone was removed by an evaporator to obtain an aqueous dispersion of a reaction product of sorbitan stearate and isocyanate. The contact angle of water in the film obtained by applying the dispersion to the glass substrate was 105°.

Synthesis Example S1

In a nitrogen-substituted reaction vessel, 0.5 g of tBuSty, 0.30 g of GMA, 0.014 g of DVB, and 25 ml of pure water were added. To the reaction vessel, 22.0 mg of 2,2'-azobis (2-methylpropionamidine) dihydrochloride was added, and the mixture was heated and stirred at 65° C. for 8 hours.

Further, 0.24 g of VAc and 11.0 mg of 2,2'-azobis(2-methylpropionamidine) dihydrochloride were added, and the mixture was further heated for 3 hours. The solid content was 3.0%. The retention rate of the particle diameter before and after heating at 170° C. for 1 minute was 70%.

Synthesis Example S2

In a nitrogen-substituted reaction vessel, 0.5 g of tBuSty, 0.30 g of GMA, 0.014 g of DVB, and 25 ml of pure water were added. To the reaction vessel, 22.0 mg of 2,2'-azobis (2-methylpropionamidine) dihydrochloride was added, and the mixture was heated and stirred at 65° C. for 8 hours.

Further, 0.24 g of MMA and 9.0 mg of 2,2'-azobis(2-methylpropionamidine) dihydrochloride were added, and the mixture was further heated for 3 hours. The solid content was 2.9%. The retention rate of the particle diameter before and after heating at 170° C. for 1 minute was 70%.

Synthesis Example S3

In a nitrogen-substituted reaction vessel, 0.5 g of tBuSty, 0.30 g of GMA, 0.014 g of DVB, and 25 ml of pure water were added. To the reaction vessel, 22.0 mg of 2,2'-azobis (2-methylpropionamidine) dihydrochloride was added, and the mixture was heated and stirred at 65° C. for 8 hours.

Further, 0.06 g of tBuAAm, 0.183 g of tBuA, and 7.7 mg of 2,2'-azobis(2-methylpropionamidine) dihydrochloride were added, and the mixture was further heated for 3 hours. The solid content was 2.5%. The retention rate of the particle diameter before and after heating at 170° C. for 1 minute was 70%.

Synthesis Example S4

In a nitrogen-substituted reaction vessel, 0.5 g of tBuSty, 0.30 g of GMA, 0.014 g of DVB, and 25 ml of pure water were added. To the reaction vessel, 22.0 mg of 2,2'-azobis (2-methylpropionamidine) dihydrochloride was added, and the mixture was heated and stirred at 65° C. for 8 hours.

Further, 0.12 g of StA, 0.12 g of tBuA, and 5.4 mg of 2,2'-azobis(2-methylpropionamidine) dihydrochloride were added, and the mixture was further heated for 3 hours. The solid content was 2.5%. The retention rate of the particle diameter before and after heating at 170° C. for 1 minute was 75%.

Synthesis Example S5

In a nitrogen-substituted reaction vessel, 0.24 g of VAc, 25 ml of pure water, and 11.0 mg of 2,2'-azobis(2-methylpropionamidine) dihydrochloride were added, and the mixture was heated and stirred for 3 hours. To the reaction vessel, 0.50 g of tBuSty, 0.30 g of GMA, 0.014 g of DVB, 22.0 mg of 2,2'-azobis(2-methylpropionamidine) dihydrochloride was added, and the mixture was heated and stirred at 65° C. for 8 hours. The solid content was 2.8%. The retention rate of the particle diameter before and after heating at 170° C. for 1 minute was 70%.

Examples 1 to 117

The aqueous dispersions of organic fine particles synthesized in Synthesis Examples 1 to 44, and the binder resins and emulsifiers synthesized in Synthesis Examples B1 to B9 were mixed in the proportions shown in Table 2 to prepare treatment solutions. The treatment solution was applied to a PET fabric (weight: 88 g/m$^2$, 70 denier, gray) and various measurements (falling speed test, contact angle measurement, water-repellency test, strong water-repellency test, washing durability) were performed. The results are shown in Table 2. Of the proportions (g) shown in Table 2, only the weight of the solid content, not the weight of the entire emulsion dispersion, is shown except for Synthesis Examples 1 to 44. The emulsifier, cross-linking agent and the like having a small amount of addition were separately added by preparing a diluted aqueous solution of 3 wt %.

FIG. 1 shows a scanning electron microscope (SEM) photograph of a PET fabric (Example 1) to which organic fine particles of Synthesis Example 1 are adhered.

TABLE 2

| | Example 1 | Example 2 | Example 3 | Example 4 | Example 5 | Example 6 | Example 7 | Example 8 |
|---|---|---|---|---|---|---|---|---|
| Synthesis Example 2 | 3.75 | 2.50 | 3.75 | 3.75 | 3.75 | 3.75 | 3.75 | 3.75 |
| Synthesis Example B1 | | | | | | | | |
| Synthesis Example B2 | | 1.63 | 0.82 | | | | | |
| Synthesis Example B9 | | | | | | | | |
| Emulsifier 1 | | | | | 0.001 | 0.002 | 0.005 | |
| Emulsifier 2 | | | | 0.003 | | | | 0.001 |
| Emulsifier 3 | | | | 0.001 | | | | |
| Emulsifier 4 | | | | | | | | |
| Emulsifier 5 | | | | | | | | |
| Emulsifier 6 | | | | | | | | |
| Emulsifier 7 | | | | | | | | |

TABLE 2-continued

| | | | | | | | | |
|---|---|---|---|---|---|---|---|---|
| Water | 1.25 | 5.87 | 0.43 | 1.25 | 1.25 | 1.25 | 1.25 | 1.25 |
| Falling speed [mm/s] | 263.6 | 190.6 | 232.7 | 225.1 | 261.4 | 264.9 | 243.9 | 273.7 |
| Fabric contact angle [°] | 146.5 | 142.7 | 143.8 | 151.2 | 147.4 | 151.5 | 148.4 | 148.7 |
| Water-repellency | — | — | — | — | — | — | — | — |
| Strong water-repellency | — | — | — | — | — | — | — | — |
| Water-repellency (after washing) | — | — | — | — | — | — | — | — |
| Strong water-repellency (after washing) | — | — | — | — | — | — | — | — |

| | Example 9 | Example 10 | Example 11 | Example 12 | Example 13 | Example 14 | Example 15 |
|---|---|---|---|---|---|---|---|
| Synthesis Example 2 | 3.75 | 3.75 | 3.75 | 3.75 | 4.17 | 1.39 | 4.17 |
| Synthesis Example B1 | | | | | | | 0.02 |
| Synthesis Example B2 | | | | | | | |
| Synthesis Example B9 | | | | | | | |
| Emulsifier 1 | | | | | | | |
| Emulsifier 2 | 0.002 | | | | | | |
| Emulsifier 3 | | 0.001 | 0.003 | 0.007 | | | |
| Emulsifier 4 | | | | | | | |
| Emulsifier 5 | | | | | | | |
| Emulsifier 6 | | | | | | | |
| Emulsifier 7 | | | | | | | |
| Water | 1.25 | 1.25 | 1.25 | 1.24 | 0.83 | 3.61 | 0.81 |
| Falling speed [mm/s] | 270.7 | 277.1 | 253.8 | 200.5 | 240.1 | 259.2 | 271.2 |
| Fabric contact angle [°] | 148.3 | 151.7 | 148.2 | 153.2 | 150.4 | 143.3 | 155.6 |
| Water-repellency | — | — | — | — | — | — | — |
| Strong water-repellency | — | — | — | — | — | — | — |
| Water-repellency (after washing) | — | — | — | — | — | — | — |
| Strong water-repellency (after washing) | — | — | — | — | — | — | — |

| | Example 16 | Example 17 | Example 18 | Example 19 | Example 20 | Example 21 | Example 22 | Example 23 |
|---|---|---|---|---|---|---|---|---|
| Synthesis Example 2 | 4.17 | 4.17 | 4.17 | 3.75 | 3.75 | 3.75 | 3.75 | 3.75 |
| Synthesis Example B1 | 0.07 | 0.15 | 0.29 | | | | | |
| Synthesis Example B2 | | | | | | | | |
| Synthesis Example B9 | | | | | | | | |
| Emulsifier 1 | | | | | | | | |
| Emulsifier 2 | | | | | | | | |
| Emulsifier 3 | | | | | | | | |
| Emulsifier 4 | | | | 0.02 | 0.04 | 0.08 | | |
| Emulsifier 5 | | | | | | | 0.02 | 0.04 |
| Emulsifier 6 | | | | | | | | |
| Emulsifier 7 | | | | | | | | |
| Water | 0.76 | 0.69 | 0.54 | 1.23 | 1.21 | 1.18 | 1.23 | 1.21 |
| Falling speed [mm/s] | 237.0 | 267.7 | 259.3 | 261.2 | 250.3 | 204.5 | 209.8 | 169.4 |
| Fabric contact angle [°] | 149.9 | 149.7 | 150.2 | 154.0 | 154.0 | 153.2 | 146.4 | 150.4 |
| Water-repellency | — | — | — | — | — | — | — | — |
| Strong water-repellency | — | — | — | — | — | — | — | — |
| Water-repellency (after washing) | — | — | — | — | — | — | — | — |
| Strong water-repellency (after washing) | | | | | | | | |

| | Example 24 | Example 25 | Example 26 | Example 27 | Example 28 | Example 29 | Example 30 |
|---|---|---|---|---|---|---|---|
| Synthesis Example 2 | 3.75 | 3.75 | 3.75 | 3.75 | 3.75 | 4.17 | 4.17 |
| Synthesis Example B1 | | | | | | | |
| Synthesis Example B2 | | | | | | | |
| Synthesis Example B9 | | | | | | 0.005 | 0.014 |
| Emulsifier 1 | | | | | | | |
| Emulsifier 2 | | | | | | | |
| Emulsifier 3 | | | | | | | |
| Emulsifier 4 | | | | | | | |
| Emulsifier 5 | | | | | | | |

TABLE 2-continued

| | | | | | | | |
|---|---|---|---|---|---|---|---|
| Emulsifier 6 | | | | 0.019 | 0.038 | | |
| Emulsifier 7 | 0.019 | 0.038 | 0.075 | | | | |
| Water | 1.23 | 1.21 | 1.18 | 1.23 | 1.21 | 0.83 | 0.82 |
| Falling speed [mm/s] | 265.1 | 270.2 | 274.8 | 224.3 | 158.7 | 265.1 | 254.7 |
| Fabric contact angle [°] | 150.1 | 144.3 | 150.2 | 147.5 | 151.5 | 149.6 | 151.6 |
| Water-repellency | — | — | — | — | — | 90 | 100– |
| Strong water-repellency | — | — | — | — | — | — | 3 |
| Water-repellency (after washing) | — | — | — | — | — | — | — |
| Strong water-repellency (after washing) | | | | | | | |

| | Example 31 | Example 32 | Example 33 | Example 34 | Example 35 | Example 36 | Example 37 | Example 38 |
|---|---|---|---|---|---|---|---|---|
| Synthesis Example 2 | 4.17 | 4.17 | 4.17 | 4.17 | 3.33 | 3.33 | 3.33 | 2.73 |
| Synthesis Example 8 | | | | | | | | |
| Synthesis Example B7 | | | | | | | | |
| Synthesis Example B8 | | | | | | | | |
| Synthesis Example B9 | 0.03 | | | | | | | |
| PDMS-A | | 0.004 | 0.011 | 0.022 | 0.036 | 0.071 | 0.142 | 0.243 |
| Crosslinking agent 1 | | | | | | | | |
| Water | 0.81 | 0.83 | 0.82 | 0.81 | 0.63 | 0.60 | 0.52 | 0.30 |
| Falling speed [mm/s] | 246.1 | 283.3 | 271.8 | 274.1 | 258.6 | 239.4 | 229.9 | 215.9 |
| Fabric contact angle [°] | 151.8 | 151.9 | 153.8 | 150.9 | 154.4 | 151.0 | 151.9 | 151.5 |
| Water-repellency | 90 | 90 | 100 | 100 | 100 | 100– | 100– | 100– |
| Strong water-repellency | 3 | | 3 | 3+ | 3+ | 3+ | 3 | 3 |
| Water-repellency (after washing) | — | — | — | — | — | — | — | — |
| Strong water-repellency (after washing) | — | — | — | — | — | — | — | — |

| | Example 39 | Example 40 | Example 41 | Example 42 | Example 43 | Example 44 | Example 45 |
|---|---|---|---|---|---|---|---|
| Synthesis Example 2 | | | | | | | |
| Synthesis Example 8 | 4.77 | 4.77 | 4.77 | 4.77 | 4.77 | 4.77 | 4.77 |
| Synthesis Example B7 | | | | | | | |
| Synthesis Example B8 | | | | | | | |
| Synthesis Example B9 | | | | | | | |
| PDMS-A | 0.004 | 0.011 | 0.022 | 0.044 | 0.004 | 0.011 | 0.022 |
| Crosslinking agent 1 | | | | | 0.24 | 0.24 | 0.24 |
| Water | 0.23 | 0.22 | 0.21 | 0.19 | 0.00 | 0.00 | 0.00 |
| Falling speed [mm/s] | 251.1 | 264.3 | 244.1 | 248.9 | 166.8 | 167.7 | 162.1 |
| Fabric contact angle [°] | 148.1 | 150.5 | 151.5 | 153.6 | 150.3 | 148.7 | 151.0 |
| Water-repellency | 3+ | 90 | 90 | 100– | 80 | 90 | 80 |
| Strong water-repellency | 3+ | 3+ | 3+ | — | — | — | — |
| Water-repellency (after washing) | — | — | — | — | — | — | — |
| Strong water-repellency (after washing) | — | — | — | — | — | — | — |

| | Example 46 | Example 47 | Example 48 | Example 49 | Example 50 | Example 51 | Example 52 | Example 53 |
|---|---|---|---|---|---|---|---|---|
| Synthesis Example 2 | | | | | | | | |
| Synthesis Example 8 | 4.77 | 4.77 | 4.77 | 4.77 | 4.77 | 4.77 | 4.77 | 4.77 |
| Synthesis Example B7 | | | | | | | | 0.004 |
| Synthesis Example B8 | | | | | | | | |
| Synthesis Example B9 | | 0.01 | 0.01 | 0.03 | 0.06 | 0.11 | 0.23 | |
| PDMS-A | 0.044 | | | | | | | |
| Crosslinking agent 1 | 0.24 | | | | | | | |
| Water | 0.00 | 0.23 | 0.22 | 0.21 | 0.18 | 0.12 | 0.00 | 0.23 |
| Falling speed [mm/s] | 181.9 | 218.0 | 226.7 | 201.0 | 197.5 | 187.2 | 170.6 | 220.4 |
| Fabric contact angle [°] | 147.3 | — | — | — | — | — | — | — |
| Water-repellency | 90 | 95 | 100– | 100– | 100 | 100 | 100 | 95 |
| Strong water-repellency | — | 3 | 3 | 3 | 3 | 3 | 3 | 3 |
| Water-repellency (after washing) | — | 80 | — | 80 | 90 | 90 | 95 | 80 |
| Strong water-repellency (after washing) | — | — | — | — | 2 to 3 | 2 to 3 | — | — |

TABLE 2-continued

| | Example 54 | Example 55 | Example 56 | Example 57 | Example 58 | Example 59 | Example 60 |
|---|---|---|---|---|---|---|---|
| Synthesis Example 2 | | | | | | | |
| Synthesis Example 8 | 4.77 | 4.77 | 4.77 | 4.77 | 4.77 | 4.77 | 4.77 |
| Synthesis Example B7 | 0.01 | 0.02 | 0.04 | 0.09 | 0.19 | | |
| Synthesis Example B8 | | | | | | 0.004 | 0.01 |
| Synthesis Example B9 | | | | | | | |
| PDMS-A | | | | | | | |
| Crosslinking agent 1 | | | | | | | |
| Water | 0.22 | 0.21 | 0.19 | 0.14 | 0.05 | 0.23 | 0.22 |
| Falling speed [mm/s] | 194.8 | 174.8 | 191.6 | 165.6 | 166.3 | 218.8 | 237.7 |
| Fabric contact angle [°] | — | — | — | — | — | — | — |
| Water-repellency | 90 | 90 | 95 | 90— | 90 | 100 | 100− |
| Strong water-repellency | 3- | 3 | 3 | 3 | 3 | 3 | 3 |
| Water-repellency (after washing) | 90 | 95 | 100− | 100− | 100− | 80 | 80 |
| Strong water-repellency (after washing) | 2 to 3 | 2 to 3 | 3 | 3+ | 3+ | — | — |

| | Example 61 | Example 62 | Example 63 | Example 64 | Example 65 | Example 66 | Example 67 | Example 68 |
|---|---|---|---|---|---|---|---|---|
| Synthesis Example 8 | 4.77 | 4.77 | 4.77 | 4.77 | | | | |
| Synthesis Example 11 | | | | | 10.04 | 10.04 | 10.04 | 10.04 |
| Synthesis Example 20 | | | | | | | | |
| Synthesis Example 40 | | | | | | | | |
| Synthesis Example 41 | | | | | | | | |
| Synthesis Example 42 | | | | | | | | |
| Synthesis Example 43 | | | | | | | | |
| Synthesis Example 21 | | | | | | | | |
| Synthesis Example B7 | | | | | | | | |
| Synthesis Example B8 | 0.02 | 0.05 | 0.09 | 0.19 | | | | |
| Emulsifier 1 | | | | | | | | |
| Emulsifier 2 | | | | | | | | |
| Emulsifier 4 | | | | | 0.0001 | 0.0002 | 0.0005 | 0.0014 |
| Crosslinking agent 2 | | | | | | | | |
| Water | 0.21 | 0.19 | 0.14 | 0.04 | 0.00 | 0.00 | 0.00 | 0.00 |
| Falling speed [mm/s] | 216.3 | 211.9 | 227.5 | 204.5 | 234 | 239.3 | 209.2 | 227.6 |
| Fabric contact angle [°] | — | — | — | — | — | — | — | — |
| Water-repellency | 100− | 100− | 100− | 100− | — | — | — | — |
| Strong water-repellency | 3 | 3 | 3 | 3 | — | — | — | — |
| Water-repellency (after washing) | 95 | 100− | 100 | 100 | — | — | — | — |
| Strong water-repellency (after washing) | — | — | — | 3+ | — | — | — | — |

| | Example 69 | Example 70 | Example 71 | Example 72 | Example 73 | Example 74 | Example 75 |
|---|---|---|---|---|---|---|---|
| Synthesis Example 8 | | | | | | | |
| Synthesis Example 11 | 10.04 | 10.04 | 10.04 | 10.04 | 10.04 | 10.04 | 10.04 |
| Synthesis Example 20 | | | | | | | |
| Synthesis Example 40 | | | | | | | |
| Synthesis Example 41 | | | | | | | |
| Synthesis Example 42 | | | | | | | |
| Synthesis Example 43 | | | | | | | |
| Synthesis Example 21 | | | | | | | |
| Synthesis Example B7 | | | | | | | |
| Synthesis Example B8 | | | | | | | |
| Emulsifier 1 | | | | 0.0001 | 0.0002 | 0.0005 | 0.0014 |
| Emulsifier 2 | 0.0001 | 0.0002 | 0.0005 | | | | |
| Emulsifier 4 | | | | | | | |
| Crosslinking agent 2 | | | | | | | |
| Water | 0.00 | 0.00 | 0.00 | 0.00 | 0.00 | 0.00 | 0.00 |
| Falling speed [mm/s] | 210.8 | 243.9 | 219.8 | 235.4 | 252.9 | 251.9 | 218.6 |
| Fabric contact angle [°] | — | — | — | — | — | — | — |
| Water-repellency | — | — | — | — | — | — | — |
| Strong water-repellency | — | — | — | — | — | — | — |
| Water-repellency (after washing) | — | — | — | — | — | — | — |
| Strong water-repellency (after washing) | — | — | — | — | — | — | — |

TABLE 2-continued

| | Example 76 | Example 77 | Example 78 | Example 79 | Example 80 | Example 81 | Example 82 | Example 83 |
|---|---|---|---|---|---|---|---|---|
| Synthesis Example 8 | | | | | | | | |
| Synthesis Example 11 | 10.04 | 3.33 | 3.33 | 3.33 | 3.33 | | | |
| Synthesis Example 20 | 10.00 | | | | | | | |
| Synthesis Example 40 | | | | | | 9.00 | | |
| Synthesis Example 41 | | | | | | | 9.00 | |
| Synthesis Example 42 | | | | | | | | 9.00 |
| Synthesis Example 43 | | | | | | | | |
| Synthesis Example 21 | | | | | | | | |
| Synthesis Example B7 | | | | | | 0.01 | 0.01 | 0.01 |
| Synthesis Example B8 | | | | | | | | |
| Emulsifier 1 | 0.0014 | 0.0007 | 0.0015 | | | | | |
| Emulsifier 2 | | | | 0.0007 | 0.0015 | | | |
| Emulsifier 4 | | | | | | | | |
| Crosslinking agent 2 | | | | | | | | |
| Water | 0.00 | 6.67 | 6.67 | 6.67 | 6.67 | 0.00 | 0.00 | 0.00 |
| Falling speed [mm/s] | 206.5 | 240.0 | 252.2 | 269.2 | 249.6 | 203.6 | 239.2 | 224.6 |
| Fabric contact angle [°] | — | — | — | — | — | — | — | — |
| Water-repellency | — | — | — | — | — | 100– | 100 | 100– |
| Strong water-repellency | — | — | — | — | — | 3 | 3 | 2 to 3 |
| Water-repellency (after washing) | — | — | — | — | — | — | — | — |
| Strong water-repellency (after washing) | — | — | — | — | — | — | — | — |

| | Example 84 | Example 85 | Example 86 | Example 87 | Example 88 | Example 89 | Example 90 |
|---|---|---|---|---|---|---|---|
| Synthesis Example 8 | | | | | | | |
| Synthesis Example 11 | | | | | | | |
| Synthesis Example 20 | | | | | | | |
| Synthesis Example 40 | | 9.00 | | | | | |
| Synthesis Example 41 | | | 9.00 | | | | |
| Synthesis Example 42 | | | | 9.00 | | | |
| Synthesis Example 43 | 9.00 | | | | 9.00 | | |
| Synthesis Example 21 | | | | | | 5.52 | 5.52 |
| Synthesis Example B7 | 0.01 | | | | | | |
| Synthesis Example B8 | | 0.02 | 0.02 | 0.02 | 0.02 | 0.001 | 0.002 |
| Emulsifier 1 | | | | | | | |
| Emulsifier 2 | | | | | | | |
| Emulsifier 4 | | | | | | | |
| Crosslinking agent 2 | | | | | | 0.02 | 0.02 |
| Water | 0.00 | 0.00 | 0.00 | 0.00 | 0.00 | 2.46 | 2.46 |
| Falling speed [mm/s] | 174.4 | 250.3 | 247.1 | 229.2 | 180.6 | 188.7 | 204.3 |
| Fabric contact angle [°] | — | — | — | — | — | 131.9 | 139.7 |
| Water-repellency | 100– | 100 | 100 | 100– | 100– | — | — |
| Strong water-repellency | 2 to 3 | 3 | 3 | 3 | 2 to 3 | — | — |
| Water-repellency (after washing) | — | — | — | — | — | 80 | — |
| Strong water-repellency (after washing) | — | — | — | — | — | — | — |

| | Example 91 | Example 92 | Example 93 | Example 94 | Example 95 | Example 96 | Example 97 | Example 98 |
|---|---|---|---|---|---|---|---|---|
| Synthesis Example 12 | | | | | | | | |
| Synthesis Example 21 | 5.52 | 5.52 | 5.52 | 5.52 | 5.52 | 5.52 | 5.52 | 5.52 |
| Synthesis Example B3 | | | | | | | | |
| Synthesis Example B7 | | | | 0.002 | 0.005 | 0.008 | 0.015 | |
| Synthesis Example B8 | 0.005 | 0.008 | 0.015 | | | | | |
| StOH | | | | | | | | 0.001 |
| Emulsifier 1 | | | | | | | | 0.000004 |
| Emulsifier 2 | | | | | | | | |
| Crosslinking agent 2 | 0.02 | 0.02 | 0.02 | 0.02 | 0.02 | 0.02 | 0.02 | 0.02 |
| Water | 2.48 | 2.48 | 2.47 | 2.48 | 2.48 | 2.48 | 2.47 | 2.48 |
| Falling speed [mm/s] | 205.6 | 191.9 | 179.5 | 178.2 | 175.4 | 206.3 | 217.7 | 194.4 |
| Fabric contact angle [°] | 153.3 | 155.2 | 150.5 | 138.6 | 138.4 | 154.8 | 153.4 | 151.3 |
| Water-repellency | 90 | 95 | 100– | 80 | 90 | 100– | 100– | — |
| Strong water-repellency | — | 3 | 3 | 2 to 3 | 2 to 3 | 2 to 3 | 3 | — |
| Water-repellency (after washing) | 80 | — | 100 | 90 | 95 | 100 | 100 | — |
| Strong water-repellency (after washing) | — | — | 3 | — | 3 | 3 | — | — |

TABLE 2-continued

| | Example 99 | Example 100 | Example 101 | Example 102 | Example 103 | Example 104 | Example 105 |
|---|---|---|---|---|---|---|---|
| Synthesis Example 12 | | | | 3.95 | 3.95 | 3.95 | 3.95 |
| Synthesis Example 21 | 5.52 | 5.52 | 5.52 | | | | |
| Synthesis Example B3 | | | | | | | |
| Synthesis Example B7 | | | | | | | |
| Synthesis Example B8 | | | | 0.002 | 0.007 | 0.011 | 0.023 |
| StOH | 0.005 | 0.001 | 0.002 | | | | |
| Emulsifier 1 | 0.000024 | | | | | | |
| Emulsifier 2 | | 0.000004 | 0.000008 | | | | |
| Crosslinking agent 2 | 0.02 | 0.02 | 0.02 | 0.03 | 0.03 | 0.03 | 0.03 |
| Water | 2.48 | 2.46 | 2.46 | 1.05 | 1.05 | 1.04 | 1.03 |
| Falling speed [mm/s] | 173.1 | 192.5 | 187.5 | 227.1 | 200.0 | 217.3 | 206.0 |
| Fabric contact angle [°] | 156 | 139.2 | 154.7 | — | — | — | — |
| Water-repellency | — | 90 | — | 90 | 100 | 100 | 100− |
| Strong water-repellency | — | — | — | 3 | 2 to 3 | 3 | 2 to 3 |
| Water-repellency (after washing) | — | — | — | — | 80 | 80 | 90 |
| Strong water-repellency (after washing) | — | — | — | — | — | 3 | 2 to 3 |

| | Example 106 | Example 107 | Example 108 | Example 109 | Example 110 | Example 111 | Example 112 | Example 113 |
|---|---|---|---|---|---|---|---|---|
| Synthesis Example 12 | 3.95 | 3.95 | 3.95 | 3.95 | 3.95 | 3.95 | 3.95 | 3.95 |
| Synthesis Example 21 | | | | | | | | |
| Synthesis Example B3 | | | | | | 0.002 | 0.007 | 0.011 |
| Synthesis Example B7 | | | | 0.002 | 0.007 | | | |
| Synthesis Example B8 | 0.007 | 0.011 | 0.023 | | | | | |
| StOH | | | | | | | | |
| Emulsifier 1 | | | | | | | | |
| Emulsifier 2 | | | | | | | | |
| Crosslinking agent 2 | 0.07 | 0.07 | 0.07 | 0.03 | 0.03 | 0.03 | 0.03 | 0.03 |
| Water | 1.05 | 1.04 | 1.03 | 1.05 | 1.05 | 1.05 | 1.05 | 1.04 |
| Falling speed [mm/s] | 186.6 | 197.6 | 165.1 | 225.2 | 159.8 | 235.6 | 247.0 | 247.7 |
| Fabric contact angle [°] | — | — | — | — | — | — | — | — |
| Water-repellency | 80 | 80 | 90 | 100 | 90 | 100− | 100− | 100− |
| Strong water-repellency | — | — | 2 to 3 | 3 | — | 3 | 3 | — |
| Water-repellency (after washing) | 80 | 80 | 90 | 80 | 80 | 80 | 80 | 80 |
| Strong water-repellency (after washing) | — | 2 to 3 | 3 | 2 to 3 | — | 2 to 3 | 3 | 2 to 3 |

| | Example 114 | Example 115 | Example 116 | Example 117 |
|---|---|---|---|---|
| Synthesis Example 12 | 3.95 | 3.95 | 3.95 | 3.95 |
| Synthesis Example 21 | | | | |
| Synthesis Example B3 | 0.023 | 0.007 | 0.011 | 0.023 |
| Synthesis Example B7 | | | | |
| Synthesis Example B8 | | | | |
| StOH | | | | |
| Emulsifier 1 | | | | |
| Emulsifier 2 | | | | |
| Crosslinking agent 2 | 0.03 | 0.07 | 0.07 | 0.07 |
| Water | 1.03 | 1.05 | 1.04 | 1.03 |
| Falling speed [mm/s] | 214.8 | 139.9 | 147.0 | 140.6 |
| Fabric contact angle [°] | — | — | — | — |
| Water-repellency | 100− | 80 | — | — |
| Strong water-repellency | — | — | — | — |
| Water-repellency (after washing) | 100− | — | — | — |
| Strong water-repellency (after washing) | 2 to 3 | — | — | — |

Synthesis Examples 45 to 82

The same procedure as in Synthesis Example 1 was repeated except that polymerization was performed using the monomers shown in Table 3, and the emulsifier shown in Table 3 was added in a predetermined amount shown in the table with respect to the total amount of the monomers.

Examples 118 to 155

A binder B3 having a solid content of 25 wt % was mixed with the particles obtained in Synthesis Examples 45 to 82, and the treatment liquid was adjusted so that the concentration of the particles was 2.25%. The treatment liquid was applied to a PET fabric, and the falling speed was measured, and the results are shown in Table 3 as the falling speed of each synthesis example. To the treatment liquid was added 1.1 g of the cross-linking agent 1, based on 1 g of the binder resin. In Synthesis Examples 45 to 82, the retention rate of the particle diameter before and after heating at 170° C. for 1 minute was 85% or more. In Synthesis Example 46, the particle size of the particles on the fabric was 198 nm.

Synthesis Example 83

In a nitrogen-substituted reaction vessel, 10 ml of an aqueous dispersion of crosslinked fine particles of polymethyl methacrylate (PMMA) having a solid content of 20 wt % and a particle size of 300 nm, 400 mg of polyethylene glycol monooleyl ether, 100 mg of sorbitan stearate, and 1 g of StA were added, and the mixture was stirred at 45° C. After 3 hours, 16 mg of 2,2'-azobis(2-methylpropionamidine) dihydrochloride was added, and the mixture was heated and stirred at 65° C. for 8 hours to obtain an aqueous dispersion of PMMA/StA fine particles. The obtained aqueous dispersion was applied to a glass substrate and heated at 150° C. for 1 minute, and then the contact angle of water was 105 degrees. The retention rate of the particle diameter before and after heating at 170° C. for 1 minute was 90%.

Synthesis Example 84

Polymerization was carried out in the same manner as in Synthesis Example 83, except that the amount of added StA was 100 wt %, based on the solid content of PMMA and 16 mg of 2,2'-azobis(2-methylpropionamidine) dihydrochloride was added after 25 hours, to obtain an aqueous dispersion of PMMA/StA fine particles. The obtained aqueous dispersion was applied to a glass substrate and heated at 150° C. for 1 minute, and then the contact angle of water was 111 degrees. The retention rate of the particle diameter before and after heating at 170° C. for 1 minute was 90%.

Synthesis Example 85

Polymerization was carried out in the same manner as in Synthesis Example 83, except that the amount of added StA was 30 wt %, based on the solid content of PMMA and 16 mg of 2,2'-azobis(2-methylpropionamidine) dihydrochloride was added after 25 hours, to obtain an aqueous dispersion of PMMA/StA fine particles. The obtained aqueous dispersion was applied to a glass substrate and heated at 150° C. for 1 minute, and then the contact angle of water was 111 degrees. The retention rate of the particle diameter before and after heating at 170° C. for 1 minute was 90%.

Synthesis Example 86

Polymerization was carried out in the same manner as in Synthesis Example 83, except that the amount of added StA was 10 wt %, based on the solid content of PMMA, the total amount of emulsifiers used was reduced to ⅕, and 16 mg of 2,2'-azobis(2-methylpropionamidine) dihydrochloride was added after 18 hours, to obtain an aqueous dispersion of PMMA/StA fine particles. The obtained aqueous dispersion was applied to a glass substrate and heated at 150° C. for 1 minute, and then the contact angle of water was 126 degrees. The retention rate of the particle diameter before and after heating at 170° C. for 1 minute was 90%.

Synthesis Example 87

Polymerization was carried out in the same manner as in Synthesis Example 86 except that an aqueous dispersion of PMMA crosslinked fine particles having a diameter of 70 nm was used to obtain an aqueous dispersion of PMMA/StA fine particles. The obtained aqueous dispersion was applied to a glass substrate and heated at 150° C. for 1 minute, and then the contact angle of water was 142 degrees. The retention rate of the particle diameter before and after heating at 170° C. for 1 minute was 90%.

Synthesis Example 88

In a nitrogen-substituted reaction vessel, 1.5 g of Sty, 38 mg of DVB, 86 mg of glyceryl stearate, 219 mg of polyethylene glycol monooleyl ether, and 10 g of pure water were added, emulsified, and then 40 mg of 2,2'-azobis(2-methylpropionamidine) dihydrochloride was added and heated and stirred at 65° C. After 28 hours, an emulsified liquid obtained by emulsifying 0.2 g of StA with 28 mg of glyceryl stearate, 95 mg of polyethylene glycol monooleyl ether and 1 g of pure water was added and further heated and stirred for 8 hours to obtain an aqueous dispersion of PSty/StA crosslinked fine particles. The obtained aqueous dispersion was applied to a glass substrate and heated at 150° C. for 1 minute, and then the contact angle of water was 115 degrees. The retention rate of the particle diameter before and after heating at 170° C. for 1 minute was 85%.

Synthesis Example 89

Polymerization was carried out in the same manner as in Synthesis Example 88, except that 56 mg of the glyceryl stearate and 144 mg of polyethylene glycol monooleyl ether were used as the first emulsifier, to obtain an aqueous dispersion of PSty/StA crosslinked fine particles. The obtained aqueous dispersion was applied to a glass substrate and heated at 150° C. for 1 minute, and then the contact angle of water was 118 degrees. The retention rate of the particle diameter before and after heating at 170° C. for 1 minute was 90%.

Synthesis Example 90

Polymerization was carried out in the same manner as in Synthesis Example 88, except that 56 mg of the glyceryl stearate and 144 mg of polyethylene glycol monooleyl ether were used as the first emulsifier, to obtain an aqueous dispersion of PSty/StA crosslinked fine particles. The obtained aqueous dispersion was applied to a glass substrate and heated at 150° C. for 1 minute, and then the contact angle of water was 118 degrees. The retention rate of the particle diameter before and after heating at 170° C. for 1 minute was 90%.

Synthesis Example 91

In a nitrogen-substituted reaction vessel, as initial monomers, 0.32 g of tBuSty, 0.38 g of GMA, 17 mg of DVB, 0.015 g of stearyltrimonium chloride, and 19 g of pure water were added and emulsified, 18 mg of 2,2'-azobis(2-methylpropionamidine) dihydrochloride was added, and the mixture was heated and stirred at 65° C. After 30 minutes from the addition of 2,2'-azobis(2-methylpropionamidine) dihydrochloride, 0.32 g of tBuSty, and 17 mg of DVB were added as additional monomers, and the mixture was heated and stirred for 8 hours to obtain an aqueous dispersion of crosslinked fine particles. A binder B8 having a solid content of 25 wt % was mixed with the particles of the obtained aqueous dispersion, and the treatment liquid was adjusted so that the concentration of the particles was 2.25%. When the treatment liquid was applied to a PET fabric and the water-repellency was evaluated, the water-repellency was 90 points. The contact angle of the fabric was 140 degrees. The retention rate of the particle diameter before and after heating at 170° C. for 1 minute was 90%.

Synthesis Examples 92 to 110

The same procedure as in Synthesis Example 91 was repeated except that monomers and amounts used as initial monomers and additional monomers, and emulsifiers and amounts used were as shown in Table 4. In Synthesis Example 109, the additional monomer was emulsified with 1.5% of an emulsifier, based on the monomer and added. In Synthesis Example 110, instead of 2,2'-azobis(2-methylpropionamidine) dihydrochloride, tBu hydroperoxide and L ascorbic acid were each added in an amount of 1 mol %, based on the monomer synthesis, and the synthesis was carried out at a temperature of 75° C.

Examples 156 to 174

Table 4 shows the contact angles of water measured after applying the aqueous dispersion of the obtained particles to a glass substrate and heating at 150° C. for 1 minute with respect to Synthesis Examples 92 to 110.

A binder B8 having a solid content of 25 wt % was mixed with the particles obtained in Synthesis Examples 92 to 96, and the treatment liquid was adjusted so that the concentration of the particles was 2.25%. A binder B3 having a solid content of 25 wt % was mixed with the particles obtained in Synthesis Examples 97 to 110, and the treatment liquid was adjusted so that the concentration of the particles was 2.25%. The treatment liquid was applied to a PET fabric, the falling speed was measured and the water-repellency and strong water-repellency test were carried out, and the results are shown in Table 4 as the falling speed, water-repellency, and strong water-repellency of each synthesis example. To the treatment liquid was added 1.1 g of the cross-linking agent 1, based on 1 g of the binder resin. In Synthesis Examples 92 to 110, the retention rate of the particle diameter before and after heating at 170° C. for 1 minute was 85% or more.

Figure 2:
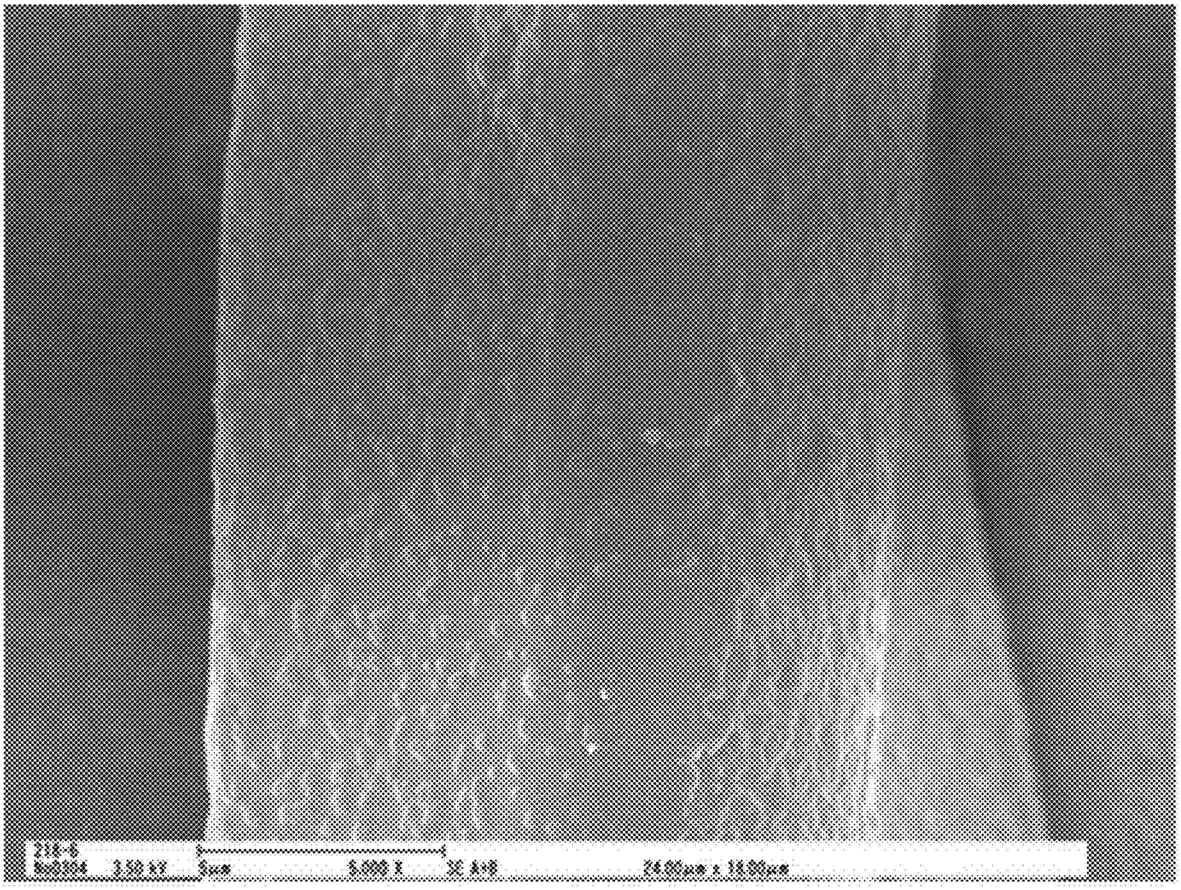
FIG. 2 is a scanning electron microscope (SEM) photograph of a PET fabric (Example 157) to which organic fine particles of Synthesis Example 93, a binder B8, and a cross-linking agent 1 are adhered.

FIG. 2 shows a scanning electron microscope (SEM) photograph of a PET fabric (Example 157) to which organic fine particles of Synthesis Example 93, a binder B8, and a cross-linking agent 1 are adhered.

TABLE 3

| | | | | Emulsifier | | | |
|---|---|---|---|---|---|---|---|
| | | Composition | Ratio mol % | type | weight wt % (based on particles) | Particle size [nm] | Falling speed [mm/s] |
| Example 118 | Synthesis Example 45 | tBuSty/DHMA/DVB | 92/8/10 | Emulsifier 8 | 5 | 199 | 207.2 |
| Example 119 | Synthesis Example 46 | tBuSty/DHMA/DVB | 92/8/10 | Emulsifier 3, 7 | 5 | 205 | 210.0 |
| Example 120 | Synthesis Example 47 | tBuSty/DHMA/DVB | 92/8/10 | Emulsifier 9 | 3 | 269 | 246.0 |
| Example 121 | Synthesis Example 48 | tBuSty/DHMA/DVB | 92/8/10 | Emulsifier 3, 9 | 4 | 250 | 233.3 |
| Example 122 | Synthesis Example 49 | tBuSty/DHMA/DVB | 92/8/10 | Emulsifier 9, 11 | 4 | 252 | 226.2 |
| Example 123 | Synthesis Example 50 | tBuSty/DVB | 100/10 | Emulsifier 9, 11 | 4 | 347 | 194.5 |
| Example 124 | Synthesis Example 51 | tBuSty/iBMA/DVB | 50/50/2 | Emulsifier 1, 3 | 5 | — | 149.7 |
| Example 125 | Synthesis Example 52 | tBuSty/MMA/DVB | 92/8/10 | Emulsifier 1, 3 | 5.4 | — | 236.3 |
| Example 126 | Synthesis Example 53 | tBuSty/DHMA/DVB | 92/8/10 | Emulsifier 1, 12 | 5 | — | 220.0 |
| Example 127 | Synthesis Example 54 | tBuSty/PEGMA/DVB | 98/2/10 | Emulsifier 1, 3 | 5 | — | 238.7 |
| Example 128 | Synthesis Example 55 | tBuSty/DHMA/DVB | 92/8/10 | Emulsifier 1, 3 | 5 | — | 241.4 |
| Example 129 | Synthesis Example 56 | tBuSty/DHMA/HBA/DVB | 92/7/1/10 | Emulsifier 1, 3 | 4 | — | 243.9 |
| Example 130 | Synthesis Example 57 | tBuSty/DHMA/DVB | 92/8/10 | Emulsifier 1, 3 | 6 | 600 | 222.4 |
| Example 131 | Synthesis Example 58 | tBuSty/DHMA/DVB | 92/8/10 | Emulsifier 1, 11 | 5 | 415 | 229.5 |
| Example 132 | Synthesis Example 59 | tBuSty/DHMA/DVB | 92/8/10 | Emulsifier 1, 10 | 5 | 266 | 236.6 |
| Example 133 | Synthesis Example 60 | tBuSty/iBMA/DHMA/DVB | 92/8/10 | Emulsifier 1, 3 | 5 | 233 | 119.2 |
| Example 134 | Synthesis Example 61 | tBuSty/DHMA/DVB | 92/8/10 | Emulsifier 2, 3 | 6.5 | 196 | 234.0 |
| Example 135 | Synthesis Example 62 | tBuSty/HBA/DVB | 92/8/10 | Emulsifier 2, 3 | 5 | 267 | 218.0 |
| Example 136 | Synthesis Example 63 | tBuSty/HBA/DVB | 92/8/10 | Emulsifier 2, 3 | 3 | 256 | 216.5 |
| Example 137 | Synthesis Example 64 | tBuSty/MMA/DVB | 60/40/2 | Emulsifier 1, 3 | 5 | — | 170.3 |
| Example 138 | Synthesis Example 65 | StA/tBuSty/DHMA/DVB | 3/92/8/10 | Emulsifier 1 | 4.3 | 285 | 240.6 |
| Example 139 | Synthesis Example 66 | StA/tBuSty/DHMA/DVB | 13/92/8/10 | Emulsifier 1 | 3.7 | 270 | 220.9 |
| Example 140 | Synthesis Example 67 | DMSAAm/tBuSty/DHMA/DVB | 1/92/8/10 | Emulsifier 1 | 4.5 | 199 | 197.3 |
| Example 141 | Synthesis Example 68 | DMS-MA/tBuSty/DHMA/DVB | 0.87/92/8/10 | Emulsifier 1 | 3.8 | 225 | 245.2 |
| Example 142 | Synthesis Example 69 | StMA/tBuSty/DHMA/DVB | 8/92/8/10 | Emulsifier 1 | 4.3 | 245 | 182.0 |
| Example 143 | Synthesis Example 70 | StA/tBuSty/DHMA/DVB | 1/92/8/10 | Emulsifier 1 | 5.6 | 228 | 209.8 |
| Example 144 | Synthesis Example 71 | C17AEA/tBuSty/DHMA/DVB | 3/92/8/10 | Emulsifier 1 | 5.3 | 274 | 181.0 |
| Example 145 | Synthesis Example 72 | StMA/tBuSty/DHMA/DVB | 3/92/8/10 | Emulsifier 1 | 4.3 | 246 | 210.5 |
| Example 146 | Synthesis Example 73 | iBMA/DHMA/DVB | 90/10/10 | Emulsifier 1 | 5 | — | 188.7 |
| Example 147 | Synthesis Example 74 | DMS-MA/tBuSty/DHMA/DVB | 3.5/92/8/10 | Emulsifier 1 | 4.4 | 303 | 228.0 |
| Example 148 | Synthesis Example 75 | StMA/tBuSty/DHMA/DVB | 1/92/8/10 | Emulsifier 1 | 5.5 | 256 | 188.2 |
| Example 149 | Synthesis Example 76 | DMS-MA1/tBuSty/DHMA/DVB | 1.1/92/8/10 | Emulsifier 1 | 5.2 | 222 | 203.6 |
| Example 150 | Synthesis Example 77 | DMS-MA1/tBuSty/DHMA/DVB | 1.5/92/8/10 | Emulsifier 1 | 4 | 280 | 207.3 |
| Example 151 | Synthesis Example 78 | DMS-MA2/tBuSty/DHMA/DVB | 0.5/92/8/10 | Emulsifier 1 | 6 | 261 | 207.6 |

TABLE 3-continued

| | | Composition | Ratio mol % | Emulsifier type | Emulsifier weight wt % (based on particles) | Particle size [nm] | Falling speed [mm/s] |
|---|---|---|---|---|---|---|---|
| Example 152 | Synthesis Example 79 | DMS-MA3/tBuSty/DHMA/DVB | 0.17/92/8/10 | Emulsifier 1 | 4.2 | 248 | 214.8 |
| Example 153 | Synthesis Example 80 | DMS-MA/tBuSty/DHMA/DVB | 0.11/92/8/10 | Emulsifier 1 | 4 | 315 | 249.7 |
| Example 154 | Synthesis Example 81 | DMS-MA2/tBuSty/DHMA/DVB | 1.1/92/8/10 | Emulsifier 1 | 4.1 | — | 220.1 |
| Example 155 | Synthesis Example 82 | DMS-MA2/tBuSty/DHMA/DVB | 2.4/92/8/10 | Emulsifier 1 | 4 | — | 218.4 |

—: Unmeasured

TABLE 4

| | | Composition | Ratio mol % total | Ratio mol % initial | Ratio mol % additional | Timing for addition | Emulsifier type |
|---|---|---|---|---|---|---|---|
| Example 156 | Synthesis Example 92 | tBuSty/GMA/DVB | 60/40/4 | 30/40/2 | 30/0/2 | 30 min | Emulsifier 6 |
| Example 157 | Synthesis Example 93 | tBuSty/DVB | 100/2 | 100/2 | — | — | Emulsifier 1 |
| Example 158 | Synthesis Example 94 | tBuSty/EGDMA | 100/2 | 100/2 | — | — | Emulsifier 1 |
| Example 159 | Synthesis Example 95 | tBuSty/GMA/DVB/DMS-MA | 60/40/4/0.22 | 30/40/2/0 | 30/0/2/0.22 | 30 min | Emulsifier 6 |
| Example 160 | Synthesis Example 96 | tBuSty/GMA/DVB/StA | 60/40/4/3 | 30/40/2/0 | 30/0/2/3 | 30 min | Emulsifier 6 |
| Example 161 | Synthesis Example 97 | tBuSty/GMA/DVB | 80/20/8 | 24/20/2.4 | 56/0/5.6 | 30 min | Emulsifier 6 |
| Example 162 | Synthesis Example 98 | tBuSty/GMA/DVB | 80/20/8 | 40/20/4 | 40/0/4 | 30 min | Emulsifier 6 |
| Example 163 | Synthesis Example 99 | tBuSty/GMA/DVB | 80/20/8 | 56/20/5.6 | 24/0/2.4 | 30 min | Emulsifier 6 |
| Example 164 | Synthesis Example 100 | tBuSty/GMA/DVB | 80/20/8 | 80/20/8 | — | — | Emulsifier 6 |
| Example 165 | Synthesis Example 101 | tBuSty/GMA/DVB | 80/20/8 | 72/20/7.2 | 8/0/0.8 | 30 min | Emulsifier 6 |
| Example 166 | Synthesis Example 102 | tBuSty/GMA/DVB | 80/20/8 | 8/20/0.8 | 72/0/7.2 | 30 min | Emulsifier 6 |
| Example 167 | Synthesis Example 103 | tBuSty/GMA/DVB | 60/40/2 | 60/40/2 | — | — | Emulsifier 6 |
| Example 168 | Synthesis Example 104 | tBuSty/GMA/DVB | 60/40/2 | 54/40/1.8 | 6/0/0.2 | 5 min | Emulsifier 6 |
| Example 169 | Synthesis Example 105 | tBuSty/GMA/DVB | 60/40/2 | 42/40/1.4 | 18/0/0.6 | 5 min | Emulsifier 6 |
| Example 170 | Synthesis Example 106 | tBuSty/GMA/DVB | 60/40/2 | 30/40/1 | 30/0/1 | 5 min | Emulsifier 6 |
| Example 171 | Synthesis Example 107 | tBuSty/GMA/DVB | 60/40/2 | 18/40/0.6 | 42/0/1.4 | 5 min | Emulsifier 6 |
| Example 172 | Synthesis Example 108 | tBuSty/GMA/DVB | 60/40/2 | 0/40/0 | 60/0/2 | 5 min | Emulsifier 6 |
| Example 173 | Synthesis Example 109 | tBuSty/GMA/DVB | 60/40/2 | 30/40/1 | 30/0/1 | 5 min | Emulsifier 6 |
| Example 174 | Synthesis Example 110 | tBuSty/GMA/DVB | 60/40/2 | 30/40/1 | 30/0/1 | 5 min | Emulsifier 6 |

| | | Emulsifier weight wt % (based on particles) | Particle size [nm] | Falling speed [mm/s] | Water-repellency | Strong water-repellency | Contact angle glass substrate [°] |
|---|---|---|---|---|---|---|---|
| Example 156 | Synthesis Example 92 | 1.5 | 70.0 | 117.0 | 90 | 3− | — |
| Example 157 | Synthesis Example 93 | 5 | 150.0 | 145.0 | 100− | 3+ | — |
| Example 158 | Synthesis Example 94 | 5 | 150.0 | 197.0 | 100− | 3 to 3+ | — |
| Example 159 | Synthesis Example 95 | 1.5 | 160.8 | 142.0 | 90− | 3 | — |
| Example 160 | Synthesis Example 96 | 1.5 | 230.9 | — | 85 | 3 | 115 |
| Example 161 | Synthesis Example 97 | 1.5 | 65.6 | — | 90 | — | 113 |
| Example 162 | Synthesis Example 98 | 1.5 | 65.8 | — | 90 | — | 112 |
| Example 163 | Synthesis Example 99 | 1.5 | — | 154.0 | 90 | — | — |
| Example 164 | Synthesis Example 100 | 1.5 | — | 121.0 | 90 | — | — |
| Example 165 | Synthesis Example 101 | 1.5 | — | 113.0 | 90 | — | — |
| Example 166 | Synthesis Example 102 | 1.5 | 92.3 | 138.0 | 90 | — | — |
| Example 167 | Synthesis Example 103 | 1.5 | — | — | 100 | 3 | 114 |
| Example 168 | Synthesis Example 104 | 1.5 | 78.1 | — | 80+ | — | 113 |
| Example 169 | Synthesis Example 105 | 1.5 | 74.9 | — | 90 | — | 110 |
| Example 170 | Synthesis Example 106 | 1.5 | 75.1 | 100.4 | 100− to 95 | 3 | 120 |
| Example 171 | Synthesis Example 107 | 1.5 | 75.1 | — | 95 | 3 | 116 |
| Example 172 | Synthesis Example 108 | 1.5 | 109.0 | — | 90− | — | 118 |
| Example 173 | Synthesis Example 109 | 1.5 | 87.4 | — | 90 | 3 to 2 | 110 |
| Example 174 | Synthesis Example 110 | 0.75 | 133.1 | 136.0 | 100− | 3 | — |

—: Unmeasured

Synthesis Example 111

In a reaction vessel, 1.00 g of t-butylstyrene (tBuSty), 0.049 g of divinylbenzene (DVB), 52 ml of the emulsifier 1, and 19 ml of the pure water were added and dispersed. After nitrogen substitution, 16.9 mg of 2,2'-azobis(2-methylpropionamidine) dihydrochloride was added, and the mixture was heated and stirred at 65° C. for 8 hours to obtain an aqueous dispersion of organic fine particles. The solid content was 4.54%. The particle size (average particle size) of the aqueous dispersion was 234 nm. The organic fine particles and the aqueous dispersion of Synthesis Example B8 were diluted with pure water so that the solid contents were 0.6% and 0.4%, respectively, for a total of 1 wt %, to obtain a treatment liquid. After immersing the PET fabric in this treatment liquid, the fabric was passed through a mangle, and the water-repellency of the heat-treated test fabric was evaluated, and as a result, the falling speed was 209 mm/s, the water-repellency was 100 points, and the strong water-repellency was 3++ points. The retention rate of the particle diameter before and after heating at 170° C. for 1 minute was 80%.

Synthesis Example 112

In a reaction vessel, 0.39 g of tBuMA, 0.37 g of iBMA, 0.16 g of GMA, 0.072 g of DVB, 55 mg of emulsifier 1, and 19 ml of pure water were added and dispersed. After nitrogen substitution, 15.1 mg of 2,2'-azobis(2-methylpropionamidine) dihydrochloride was added, and the mixture was heated and stirred at 65° C. for 8 hours to obtain an aqueous dispersion of organic fine particles. The solid content was 4.80%. The particle size (average particle size) of the aqueous dispersion was 302 nm. The organic fine particles and the aqueous dispersion of Synthesis Example B8 were diluted with pure water so that the solid contents were 0.8% and 0.2%, respectively, for a total of 1 wt %, to obtain a treatment liquid. After immersing the PET fabric in this treatment liquid, the fabric was passed through a mangle, and the water-repellency of the heat-treated test fabric was evaluated, and as a result, the falling speed was 179 mm/s, the water-repellency was 100 points, and the strong water-repellency was 3 points. The retention rate of the particle diameter before and after heating at 170° C. for 1 minute was 85%.

Synthesis Example 113

In a reaction vessel, 0.90 g of iBMA, 0.052 g of DVB, 0.083 g of StA, 22 mg of emulsifier 1, 65 mg of a 23% aqueous solution of emulsifier 6, and 19 ml of pure water were added and dispersed. After nitrogen substitution, 12.1 mg of 2,2'-azobis(2-methylpropionamidine) dihydrochloride was added, and the mixture was heated and stirred at 65° C. for 8 hours to obtain an aqueous dispersion of organic fine particles. The solid content was 3.28%. The particle size (average particle size) of the aqueous dispersion was 137 nm. The organic fine particles and the aqueous dispersion of Synthesis Example B8 were diluted with pure water so that the solid contents were 0.8% and 0.2%, respectively, for a total of 1 wt %, to obtain a treatment liquid. After immersing the PET fabric in this treatment liquid, the fabric was passed through a mangle, and the water-repellency of the heat-treated test fabric was evaluated, and as a result, the falling speed was 183 mm/s, the water-repellency was 95 points, and the strong water-repellency was 3 points. The retention rate of the particle diameter before and after heating at 170° C. for 1 minute was 85%.

Examples 175 to 178

The treatment liquid was prepared at the proportion shown in Table 5, applied to the fabric of PET Q15 (weight: −88 $g/m^2$, 70 denier, grey) and PET R 964 (weight: 40 $g/m^2$, black), and various measurements (water-repellency test, deep color ΔL value measurement) were performed. The results are shown in Table 5.

TABLE 5

| *wt % | Example 175 | Example 176 | Example 177 | Example 178 |
|---|---|---|---|---|
| Synthesis Example 2* | 1.0 | | | |
| Synthesis Example 13* | | | 1.0 | |
| Synthesis Example 92* | | 1.0 | | |
| Synthesis Example 111* | | | | 1.0 |
| Synthesis Example B8* | 2.0 | 1.5 | 2.0 | 2.0 |
| Water-repellency (PET Q15) | 90 | 90+ | 90 | 95− |
| ΔL (PET R964) | −1.8 | −1.7 | −1.0 | −2.4 |

Although conventional color deepening agents tend to reduce the water-repellency, Table 5 shows that the particles of the present disclosure can exhibit the color deepening effect without impairing the water-repellency.

INDUSTRIAL APPLICABILITY

The organic fine particles of the present disclosure can be used as an oil-repellent, a soil resistant agent, a soil release agent, a release agent, or a mold release agent.

Other embodiments of the present disclosure are as follows:

[1]

An organic fine particle comprising a polymer comprising a repeating unit formed from:

(1) a hydrophobic monomer having one ethylenically unsaturated double bond and at least one hydrocarbon group having 3 to 30 carbon atoms;

(3) a reactive or hydrophilic monomer having one ethylenically unsaturated double bond and at least one reactive group and/or hydrophilic group; and (4) a crosslinkable monomer having at least two ethylenically unsaturated double bonds.

[2]

The organic fine particle according to [1], wherein the polymer further comprises a repeating unit formed from (5) a high glass transition point monomer of which a homopolymer has a glass transition point of 100° C. or more.

[3]

The organic fine particle according to [1] or [2], wherein a static contact angle of a homopolymer of the hydrophobic monomer (1) is 70 to 120 degrees.

[4]

The organic fine particle according to any one of [2] or [3], wherein the hydrophobic monomer (1) is a monomer represented by the formula:

$$CH_2{=}C(-R^{12})-C(=O)-Y^{11}(R^{11})_k$$

or $$CH_2{=}C(-R^{22})-Y^{21}(H)_{5-l}(R^{21})_l$$

wherein $R^{11}$ and $R^{21}$ are each independently a hydrocarbon group having 3 to 40 carbon atoms;

$R^{12}$ and $R^{22}$ are a hydrogen atom, a monovalent organic group, or a halogen atom;

$Y^{11}$ is a divalent to tetravalent group composed of at least one selected from a divalent to tetravalent hydrocarbon group having 1 carbon atom, $-C_6H_4-$, $-O-$, $-C(=O)-$, $-S(=O)_2-$, or $-NR'-$, wherein R' is H or a hydrocarbon group having 1 to 4 carbon atoms, except for the case of only a divalent hydrocarbon group;

$Y^{21}$ is a benzene ring;

H is a hydrogen atom;

H and $R^{21}$ are each directly bonded to $Y^{21}$; and k and l are each 1 to 3, the reactive or hydrophilic monomer (3) is a monomer represented by the formula:

$$CH_2{=}C(-R^{32})-C(=O)-Y^{31}-(R^{33})_o(R^{31})_m$$

or $$CH_2{=}C(-R^{42})-Y^{41}(H)_{5-n}(R^{41})_n$$

wherein $R^{31}$ and $R^{41}$ are each independently a reactive group or a hydrophilic group;

$R^{32}$ and $R^{42}$ are a hydrogen atom, a monovalent organic group, or a halogen atom;

$Y^{31}$ is a direct bond, $-O-$, or $-NR'-$, wherein R' is H or a hydrocarbon group having 1 to 4 carbon atoms;

$R^{33}$ is a divalent to tetravalent hydrocarbon group having 1 to 10 carbon atoms;

$Y^{41}$ is a benzene ring;

H is a hydrogen atom;

H and $R^{41}$ are each directly bonded to $Y^{41}$;

m and n are each 1 to 3; and o is 0 or 1, the crosslinkable monomer (4) is a monomer represented by the formula:

[Formula 16]

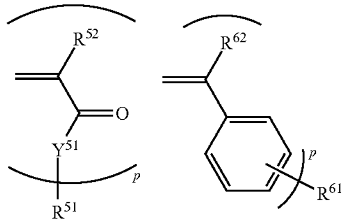

or

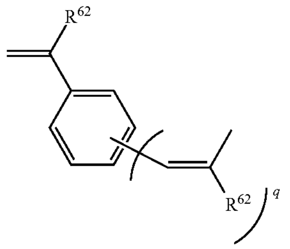

wherein $R^{51}$ and $R^{61}$ are each independently a direct bond or a divalent to tetravalent group composed of at least one selected from a hydrocarbon group having 1 to 20 carbon atoms, $-(CH_2CH_2O)_r-$, wherein r is an integer of 1 to 10, $-C_6H_4-$, $-O-$, or $-NR'-$, wherein R' is, H, or a hydrocarbon group having 1 to 4 carbon atoms;

$R^{52}$ and $R^{62}$ are each independently a hydrogen atom, a monovalent organic group, or a halogen atom;

$Y^{51}$ is $-O-$, or $-NR'-$, wherein R' is H or a hydrocarbon group having 1 to 4 carbon atoms;

p is 2 to 4; and q is 1 to 5, and the high glass transition point monomer (5) is a monomer represented by the formula:

[Formula 17]

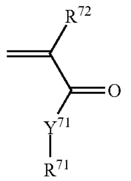

or

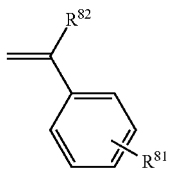

wherein $R^{71}$ and $R^{81}$ are a group composed of at least one selected from a hydrocarbon group having 1 to 30 carbon atoms, $-C_6H_4-$, $-O-$, or $-NR'-$, wherein R' is, H, or a hydrocarbon group having 1 to 4 carbon atoms;

$R^{72}$ and $R^{82}$ are a hydrogen atom, a monovalent organic group, or a halogen atom; and $Y^{71}$ is —O—, or —NR'—, wherein R' is H or a hydrocarbon group having 1 to 4 carbon atoms.

[5]

The organic fine particle according to any one of [1] to [4], wherein in the reactive monomer (3), the reactive group is an epoxy group, a chloromethyl group, a bromomethyl group, an iodomethyl group, or a blocked isocyanate group, and the hydrophilic group is at least one group selected from the group consisting of a hydroxyl group, an amino group, a carboxylic acid group, a sulfonic acid group, a phosphoric acid group, an alkali metal or alkaline earth metal salt group of a carboxylic acid, a sulfonic acid, or a phosphoric acid, and an ammonium salt group with a chlorine, bromine or iodine ion as a counter anion.

[6]

The organic fine particle according to any one of claims [1] to [5], wherein the hydrophobic monomer (1) is at least one monomer selected from the group consisting of t-butyl (meth)acrylate, N-t-butyl (meth)acrylamide, t-butylstyrene, stearyl (meth)acrylate, isopropyl (meth)acrylate, 2,6,8-trimethylnonan-4-yl acrylate, 2,4-di-t-butylstyrene, 2,4,6-trimethylstyrene, stearic acid amidoethyl (meth)acrylate, and $CH_2{=}CHC({=}O)OC_2H_4NHSO_2C_{18}H_{37}$, the reactive or hydrophilic monomer (3) is at least one monomer selected from the group consisting of glycidyl (meth)acrylate, glycerol (meth)acrylate, hydroxymethyl (meth)acrylate, hydroxyethyl (meth) acrylate, 3-hydroxypropyl (meth)acrylate, 2-hydroxypropyl (meth)acrylate, 2,3-dihydroxypropyl (meth) acrylate, 3-chloro-2-hydroxypropyl (meth)acrylate, 3-hydroxybutyl (meth)acrylate, 4-hydroxybutyl (meth) acrylate, 2-hydroxybutyl (meth)acrylate, 2-acetoacetoxyethyl (meth)acrylate, 4-hydroxybutyl acrylate glycidyl ether, acrylic acid, methacrylic acid, trimethylsilyl (meth)acrylate, 2-(trimethylsilyloxy) ethyl (meth)acrylate, 2-(dimethylamino) ethyl (meth)acrylate, 2-(tert-butylamino) ethyl (meth)acrylate, dimethylaminoethyl methacrylate quaternary compound, and tetrahydrofurfuryl (meth)acrylate, the crosslinkable monomer (4) is at least one monomer selected from the group consisting of divinylbenzene, 1,4-butanediol di(meth)acrylate, 1,6-hexanediol di(meth)acrylate, 1,9-nonanediol di(meth)acrylate, neopentyl glycol di(meth)acrylate, polyethylene glycol di(meth) acrylate, triethylene glycol di(meth)acrylate, ethylene glycol di(meth)acrylate, methylene glycol di(meth) acrylate, polytetramethylene glycol di(meth)acrylate, dimethyloltricyclodecane di(meth)acrylate, trimethylolpropane tri(meth)acrylate, adamantyl di(meth)acrylate, glycerin di(meth)acrylate, tricyclodecane dimethanol di(meth)acrylate, dicyclopentanyl di(meth) acrylate, and 5-hydroxy-1,3-adamantane di(meth) acrylate, and the high glass transition point monomer (5) is at least one monomer selected from the group consisting of isobornyl (meth)acrylate, bornyl (meth)acrylate, adamantyl (meth)acrylate, dicyclopentanyl (meth)acrylate, dicyclopentenyl (meth)acrylate, phenyl (meth)acrylate, naphthyl acrylate, and benzyl acrylate.

[7]

The organic fine particle according to any one of [2] to [6], wherein a molar ratio of the hydrophobic monomer (1)/the reactive or hydrophilic monomer (3)/the high glass transition point monomer (5) is 20 to 99.9/0.1 to 50/0 to 70, the crosslinkable monomer (4) is 0.1 to 30 parts by mole, based on 100 parts by mole of a total of the hydrophobic monomer (1) and the reactive or hydrophilic monomer (3).

[8]

The organic fine particle according to any one of [1] to [7], having a falling speed of 150 mm/second or more when treated on a fabric.

[9]

The organic fine particle according to any one of [1] to [8], having an average particle size of 30 nm to 1000 nm.

[10]

A water-repellent composition which is an aqueous dispersion of an organic fine particle, the composition comprising:

(A) the organic fine particle according to any one of [1] to [9]; and (B) an aqueous medium.

[11]

The water-repellent composition according to [11], further comprising one or both of (C) a binder resin and (D) a surfactant.

[12]

The water-repellent composition according to [11], wherein the binder resin (C) is at least one polymer selected from a fluorine-free polymer having a hydrocarbon group having 3 to 40 carbon atoms in a side chain and a fluorine-containing polymer having a fluoroalkyl group having 1 to 20 carbon atoms in a side chain.

[13]

The water-repellent composition according to [12] or [13], wherein an amount of the surfactant (D) is 15 parts by weight or less, based on 100 parts by weight of the organic fine particle (A).

[14]

The water-repellent composition according to any one of [11] to [13], wherein the binder resin (C) is an acrylic polymer, a urethane polymer, a polyolefin, a polyester, a polyether, a polyamide, a polyimide, a polystyrene, a silicone polymer, or a combination thereof.

[15]

The water-repellent composition according to any one of [10] to [14], which is capable of preventing frost formation.

[16]

A method for producing the water-repellent composition according to any one of [10] to [15], the method comprising:

polymerizing monomers (1) to (4) and optionally monomer (5) in an aqueous medium in the presence of a surfactant in an amount of 15 parts by weight or less, based on 100 parts by weight of the monomers to obtain an aqueous dispersion of organic fine particle (A).

[17]

The production method according to [16], further comprising:

adding an aqueous dispersion of the binder resin (C) to an aqueous dispersion of the organic fine particle (A), or polymerizing a monomer for the binder resin in the aqueous dispersion of the organic fine particle (A) to obtain the binder resin (C), or polymerizing a monomer for the organic fine particles in the aqueous dispersion of the binder resin to obtain the aqueous dispersion in which the organic fine particle (A) and the binder resin (C) are dispersed.

[18]

A method for treating a textile product comprising:

applying a treatment liquid containing the water-repellent composition according to any one of [10] to [15] to the textile product.

[19]

A textile product comprising the organic fine particles and/or the binder resin in the water-repellent composition according to any one of [10] to [15] adhered a surface thereof.

[20]

A textile product comprising the organic fine particles and/or the binder resin in the water-repellent composition according to any one of [10] to [15] adhered a surface thereof and having a falling speed of 200 mm/sec or more.

What is claimed is:

1. A water-repellent composition which is an aqueous dispersion, the composition comprising an organic fine particle (A) which is:

(A1) an organic fine particle capable of adhering to a substrate under a state having a particle shape, wherein the organic fine particle, when adhered to a substrate, exhibits water-repellency on the substrate, and the organic fine particle (A1) is formed of a fluorine-free polymer wherein the fluorine-free polymer does not comprise a repeating unit formed from styrene; or (A2) an organic fine particle comprising a polymer comprising a repeating unit formed from:

(1) a hydrophobic monomer having one ethylenically unsaturated double bond and at least one hydrocarbon group having 3 to 40 carbon atoms; or (2) a (meth)acrylic monomer having a polydimethylsiloxane group, wherein the polymer further comprises a repeating unit formed from:

(4) a crosslinkable monomer having at least two ethylenically unsaturated double bonds; and (3) a reactive or hydrophilic monomer having one ethylenically unsaturated double bond and at least one reactive group and/or hydrophilic group, and wherein the polymer does not comprise a repeating unit formed from styrene; and (B) an aqueous medium, wherein an average particle size of the organic fine particle (A) is 30 to 1000 nm.

2. The water-repellent composition according to claim 1, further comprising any one or more of (C) a binder resin, (D) a surfactant, and (E) a cross-linking agent.

3. The water-repellent composition according to claim 2, wherein the binder resin (C) is at least one polymer selected from a fluorine-free polymer having a hydrocarbon group having 3 to 40 carbon atoms in a side chain and a fluorine-containing polymer having a fluoroalkyl group having 1 to 20 carbon atoms in a side chain.

4. A method for producing the water-repellent composition according to claim 1, the method comprising:

polymerizing a monomer in an aqueous medium in the presence of a surfactant in an amount of 15 parts by weight or less, based on 100 parts by weight of the monomer, to obtain the aqueous dispersion.

5. The production method according to claim 4, further comprising:

adding an aqueous dispersion of the binder resin (C) to an aqueous dispersion of the organic fine particle (A), or polymerizing a monomer for the binder resin in the aqueous dispersion of the organic fine particle (A) to obtain the binder resin (C), or polymerizing a monomer for the organic fine particle (A) in the aqueous dispersion of the binder resin to obtain the aqueous dispersion in which the organic fine particle (A) and the binder resin (C) are dispersed.

6. A method for treating a textile product comprising:

applying a treatment liquid containing the water-repellent composition according to claim 1 to the textile product.

7. A textile product comprising the organic fine particle (A) in the water-repellent composition according to claim 1 adhered a surface thereof.

8. A textile product comprising the organic fine particle (A) in the water-repellent composition according to claim 1 adhered a surface thereof, wherein the textile product satisfies at least one of a static contact angle of water on a fabric of 120 degrees or more, or a falling speed of water on the fabric of 200 mm/sec or more.

9. The water-repellent composition according to claim 1, wherein the organic fine particle (A) is the organic fine particle (A2) comprising the polymer comprising a repeating unit formed from:

(1) a hydrophobic monomer having one ethylenically unsaturated double bond and at least one hydrocarbon group having 3 to 40 carbon atoms; or (2) a (meth)acrylic monomer having a polydimethylsiloxane group, wherein the polymer further comprises a repeating unit formed from:

(4) a crosslinkable monomer having at least two ethylenically unsaturated double bonds.

10. The water-repellent composition according to claim 1, wherein each of the fluorine-free polymer and the polymer comprises a repeating unit formed from at least one monomer selected from the group consisting of a monomer having a t-butyl group and a high glass transition point monomer of which a homopolymer has a glass transition point of 50° C. or more (excluding styrene).

11. The water-repellent composition according to claim 1, satisfying at least any one of:

(i) when the organic fine particle (A) is adhered to a glass substrate, a static contact angle of water on the glass substrate is 100 degrees or more;

(ii) when the organic fine particle (A) is adhered to a fabric, a static contact angle of water on the fabric is 120 degrees or more; and (iii) when the organic fine particle (A) is adhered to a fabric, a falling speed of water on the fabric is 100 mm/s or more.

12. The water-repellent composition according to claim 1, wherein when a heat treatment is performed at 170° C. for 1 minute after the organic fine particle (A) is adhered to a substrate, an average diameter of the organic fine particle (A) after the heat treatment is 50% or more of an average diameter of the organic fine particle (A) before the heat treatment, or an average diameter of the organic fine particle (A) observable on the fabric is 50 to 700 nm.

13. The water-repellent composition according to claim 1, wherein each of the fluorine-free polymer and the polymer comprises a repeating unit formed from at least one monomer selected from the group consisting of:

(1) a hydrophobic monomer having one ethylenically unsaturated double bond and at least one t-butyl group and (5) a high glass transition point monomer of which a homopolymer has a glass transition point of 50° C. or more (excluding styrene);

and further a repeating unit formed from:

(4) the crosslinkable monomer.

14. The water-repellent composition according to claim 13, wherein each of the fluorine-free polymer and the polymer comprises a repeating unit formed from (3) the reactive or hydrophilic monomer, and wherein each of the fluorine-free polymer and the polymer optionally comprises a repeating unit formed from (2) the (meth)acrylic monomer having a polydimethylsiloxane group, wherein the homopolymer of the monomer (5) has a glass transition point of 100° C. or more.

15. The water-repellent composition according to claim 1, which is obtained by polymerizing a monomer containing the crosslinkable monomer (4) and then polymerizing a monomer free from the crosslinkable monomer (4), and in which a part of the particle is meltable.

16. The water-repellent composition according to claim 1, wherein a static contact angle of water on a silicon substrate treated with a homopolymer of the hydrophobic monomer (1) is 70 to 120 degrees.

17. The water-repellent composition according to claim 13, wherein the hydrophobic monomer (1) is a monomer represented by the formula:

$$CH_2{=}C(-R^{12})-C({=}O)-Y^{11}(R^{11})_k$$

or $$CH_2{=}C(-R^{22})-Y^{21}(H)_{5-l}(R^{21})_l$$

wherein $R^{11}$ and $R^{21}$ are each independently a hydrocarbon group having 3 to 40 carbon atoms;

$R^{12}$ and $R^{22}$ are a hydrogen atom, a monovalent organic group, or a halogen atom;

$Y^{11}$ is a divalent to tetravalent group composed of at least one selected from a divalent to tetravalent hydrocarbon group having 1 carbon atom, $-C_6H_4-$, $-O-$, $-C({=}O)-$, $-S({=}O)_2-$, or $-NR'-$, wherein R' is H or a hydrocarbon group having 1 to 4 carbon atoms, provided that the case of only a divalent hydrocarbon group is excluded;

$Y^{21}$ is a benzene ring;

H is a hydrogen atom;

H and $R^{21}$ are each directly bonded to $Y^{21}$; and k and l are each 1 to 3, the (meth)acrylic monomer (2) is a monomer represented by the formula:

$$CH_2{=}C(-R^{92})-C({=}O)-Y^{91}-R^{91}$$

wherein $R^{91}$ is a group having a polydimethylsiloxane group;

$R^{92}$ is a hydrogen atom, a monovalent organic group, or a halogen atom; and $Y^{91}$ is a divalent to tetravalent group composed of at least one selected from a divalent to tetravalent hydrocarbon group having 1 carbon atom, $-C_6H_4-$, $-O-$, $-C({=}O)-$, $-S({=}O)_2-$, or $-NR'-$, wherein R' is H or a hydrocarbon group having 1 to 4 carbon atoms, the reactive or hydrophilic monomer (3) is a monomer represented by the formula:

$$CH_2{=}C(-R^{32})-C({=}O)-Y^{31}-(R^{33})_o(R^{31})_m$$

or $$CH_2{=}C(-R^{42})-Y^{41}(H)_{5-n}(R^{41})_n$$

wherein $R^{31}$ and $R^{41}$ are each independently a reactive group or a hydrophilic group;

$R^{32}$ and $R^{42}$ are a hydrogen atom, a monovalent organic group, or a halogen atom;

$Y^{31}$ is a direct bond, $-O-$, or $-NR'-$, wherein R' is H or a hydrocarbon group having 1 to 4 carbon atoms;

$R^{33}$ is a divalent to tetravalent hydrocarbon group having 1 to 10 carbon atoms;

$Y^{41}$ is a benzene ring;

H is a hydrogen atom;

H and $R^{41}$ are each directly bonded to $Y^{41}$;

m and n are each 1 to 3; and o is 0 or 1, the crosslinkable monomer (4) is a monomer represented by the formula:

[Formula 1]

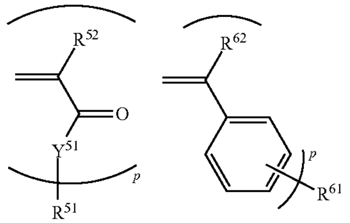

or

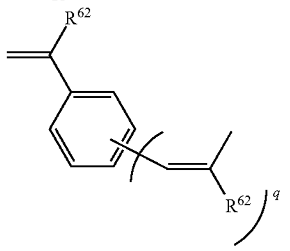

wherein $R^{51}$ and $R^{61}$ are each independently a direct bond or a divalent to tetravalent group composed of at least one selected from a hydrocarbon group having 1 to 20 carbon atoms, $(CH_2CH_2O)_r-$, wherein r is an integer of 1 to 10, $-C_6H_4-$, $-O-$, or $-NR'-$, wherein R' is H or a hydrocarbon group having 1 to 4 carbon atoms;

$R^{52}$ and $R^{62}$ are each independently a hydrogen atom, a monovalent organic group, or a halogen atom;

$Y^{51}$ is $-O-$, or $-NR'-$, wherein R' is H or a hydrocarbon group having 1 to 4 carbon atoms;

p is 2 to 4; and q is 1 to 5, and the high glass transition point monomer (5) is a monomer represented by the formula:

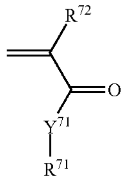

or

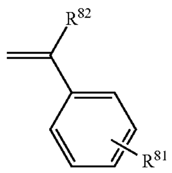

wherein $R^{71}$ and $R^{81}$ are a group composed of at least one selected from a hydrocarbon group having 1 to 30 carbon atoms, $-C_6H_4-$, $-O-$, or $-NR'-$, wherein R' is H or a hydrocarbon group having 1 to 4 carbon atoms;

$R^{72}$ and $R^{82}$ are a hydrogen atom, a monovalent organic group, or a halogen atom; and $Y^{71}$ is $-O-$, or $-NR'-$, wherein R' is H or a hydrocarbon group having 1 to 4 carbon atoms.

18. The water-repellent composition according to claim 1, wherein the organic fine particle (A) has a falling speed of 150 mm/second or more, when treated on a fabric.

19. A method for producing the water-repellent composition according to claim 1, the method comprising obtaining the organic fine particle (A) by polymerizing a monomer containing the crosslinkable monomer (4) and then polymerizing a monomer free from the crosslinkable monomer (4).

20. The water-repellent composition according to claim 1, wherein the fluorine-free polymer comprises a repeating unit formed from the crosslinkable monomer (4).

21. The water-repellent composition according to claim 1, wherein each of the fluorine-free polymer and the polymer is a random polymer.

22. The water-repellent composition according to claim 1, wherein each of the fluorine-free polymer and the polymer comprises a repeating unit formed from a monomer having a t-butyl group.

23. The water-repellent composition according to claim 1, wherein each of the fluorine-free polymer and the polymer comprises a repeating unit formed from the hydrophobic monomer (1).

* * * * *